US012677107B2

(12) United States Patent
Lando et al.

(10) Patent No.: US 12,677,107 B2
(45) Date of Patent: Jul. 7, 2026

(54) PROGRESSIVE CALCULATION AND APPLICATION OF RENDERING CONFIGURATIONS FOR DYNAMIC APPLICATIONS

(71) Applicant: DOLBY LABORATORIES LICENSING CORPORATION, San Francisco, CA (US)

(72) Inventors: Joshua B. Lando, Mill Valley, CA (US); Alan J. Seefeldt, Alameda, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 489 days.

(21) Appl. No.: 18/255,582

(22) PCT Filed: Dec. 2, 2021

(86) PCT No.: PCT/US2021/061669
§ 371 (c)(1),
(2) Date: Jun. 1, 2023

(87) PCT Pub. No.: WO2022/120091
PCT Pub. Date: Jun. 9, 2022

(65) Prior Publication Data
US 2024/0114309 A1 Apr. 4, 2024

Related U.S. Application Data

(60) Provisional application No. 63/202,003, filed on May 21, 2021, provisional application No. 63/121,108, filed on Dec. 3, 2020.

(51) Int. Cl.
*H04S 7/00* (2006.01)

(52) U.S. Cl.
CPC .......... *H04S 7/303* (2013.01); *H04S 2400/03* (2013.01); *H04S 2400/13* (2013.01)

(58) Field of Classification Search
CPC ................................ H04S 7/302; H04S 7/303
See application file for complete search history.

(56) References Cited

U.S. PATENT DOCUMENTS

| | | | |
|---|---|---|---|
| 7,664,558 | B2 | 2/2010 | Lindahl |
| 10,321,233 | B2 | 6/2019 | Lan |

(Continued)

FOREIGN PATENT DOCUMENTS

| | | | |
|---|---|---|---|
| CN | 110677801 | A | 2/2021 |
| EP | 3046341 | A1 | 3/2019 |

(Continued)

OTHER PUBLICATIONS

Zhou, D., Dynamic Margin Softmax Loss for Speaker Verification, Oct. 2020, 5 pages, Interspeech 2020, 21st Annual Conference of the International Speech Communication Association, Virtual Event, Shanghai, China.

*Primary Examiner* — Ping Lee

(57) ABSTRACT

Some examples involve rendering received audio data by determining a first relative activation of a set of loudspeakers in an environment according to a first rendering configuration corresponding to a first set of speaker activations, receiving a first rendering transition indication indicating a transition from the first rendering configuration to a second rendering configuration and determining a second set of speaker activations corresponding to a simplified version of the second rendering configuration. Some examples involve performing a first transition from the first set of speaker activations to the second set of speaker activations, determining a third set of speaker activations corresponding to a complete version of the second rendering configuration and (Continued)

performing a second transition to the third set of speaker activations without requiring completion of the first transition.

25 Claims, 49 Drawing Sheets

(56) References Cited

U.S. PATENT DOCUMENTS

| | | | |
|---|---|---|---|
| 10,629,223 B2 | 4/2020 | Jain | |
| 10,771,742 B1 | 9/2020 | Pance | |
| 2004/0170284 A1 | 9/2004 | Janse | |
| 2011/0002487 A1 | 1/2011 | Panther | |
| 2014/0044286 A1 | 2/2014 | Coles | |
| 2019/0037333 A1 | 1/2019 | Seefeldt | |
| 2020/0019290 A1 | 1/2020 | Goldhor | |
| 2020/0053312 A1 | 2/2020 | Mukherjee | |
| 2020/0092515 A1 | 3/2020 | Stern | |
| 2020/0105288 A1 | 4/2020 | Cheung | |
| 2020/0107116 A1 | 4/2020 | Frank | |
| 2020/0213725 A1 | 7/2020 | Lang | |
| 2020/0221155 A1 | 7/2020 | Hansen | |
| 2020/0243114 A1 | 7/2020 | Gilson | |
| 2020/0351606 A1 | 11/2020 | Seefeldt | |
| 2021/0168508 A1* | 6/2021 | Walther | H04R 5/027 |
| 2022/0272454 A1 | 8/2022 | Seefeldt | |
| 2022/0322010 A1 | 10/2022 | Seefedlt | |

FOREIGN PATENT DOCUMENTS

| | | | | |
|---|---|---|---|---|
| JP | 2018505587 A | 2/2018 | | |
| WO | WO-2019089322 A1 * | 5/2019 | | H04S 7/302 |
| WO | 2020030769 A1 | 2/2020 | | |

* cited by examiner

280

MATCHING READ OFFSETS FOR
A-D (3 ACTIVE CONFIGS MAX)

MATCHING READ
OFFSETS FOR A & B, C & D
(3 ACTIVE CONFIGS MAX)

3200

PROGRESSIVE CALCULATION AND APPLICATION OF RENDERING CONFIGURATIONS FOR DYNAMIC APPLICATIONS

CROSS-REFERENCE TO RELATED APPLICATION

This application is a U.S. National Stage application under U.S.C. 371 of International Application No. PCT/US2021/061669, filed on 2 Dec. 2021, which claims priority of the following applications: U.S. provisional application 63/121,108, filed 3 Dec. 2020 and U.S. provisional application 63/202,003, filed 21 May 2021, each of which is incorporated by reference in its entirety.

TECHNICAL FIELD

The disclosure pertains to systems and methods for rendering audio for playback by some or all speakers (for example, each activated speaker) of a set of speakers.

BACKGROUND

Audio devices, including but not limited to smart audio devices, have been widely deployed and are becoming common features of many homes. Although existing systems and methods for controlling audio devices provide benefits, improved systems and methods would be desirable.

NOTATION AND NOMENCLATURE

Throughout this disclosure, including in the claims, the terms “speaker,” “loudspeaker” and “audio reproduction transducer” are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation “on” a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression “system” is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term “processor” is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term “couples” or “coupled” is used to mean either a direct or indirect connection. Thus, if a first device couples to a second device, that connection may be through a direct connection, or through an indirect connection via other devices and connections.

As used herein, a “smart device” is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term “smart device” may also refer to a device that exhibits some properties of ubiquitous computing, such as artificial intelligence.

Herein, we use the expression “smart audio device” to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a “virtual assistant.” A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via methods. Some such methods may involve audio processing. For example, some methods may involve receiving, by a control system and via an interface system, audio data. The audio data may include one or more audio signals and associated spatial data. The spatial data may indicate an intended perceived spatial position corresponding to an audio signal. In some examples, the spatial data may be, or may include, positional metadata. According to some examples, the spatial data may be, may include or may correspond with channels of a channel-based audio format.

In some examples, the method may involve rendering, by the control system, the audio data for reproduction via a set of loudspeakers of an environment, to produce first rendered audio signals. In some such examples, rendering the audio data for reproduction may involve determining a first relative activation of a set of loudspeakers in the environment according to a first rendering configuration. The first rendering configuration may correspond to a first set of speaker activations. In some examples, the method may involve providing, via the interface system, the first rendered audio signals to at least some loudspeakers of the set of loudspeakers of the environment.

According to some examples, the method may involve receiving, by the control system and via the interface system, a first rendering transition indication. The first rendering transition indication may, for example, indicate a transition from the first rendering configuration to a second rendering configuration.

In some examples, the method may involve determining, by the control system, a second set of speaker activations. According to this example, the second set of speaker activations corresponds to a simplified version of the second rendering configuration. However, in other examples the second set of speaker activations may correspond to a complete, full-fidelity version of the second rendering configuration.

According to some examples, the method may involve performing, by the control system, a first transition from the first set of speaker activations to the second set of speaker activations. In some examples, the method may involve determining, by the control system, a third set of speaker activations. According to this example, the third set of speaker activations corresponds to a complete version of the second rendering configuration. In some examples, the method may involve performing, by the control system, a second transition to the third set of speaker activations without requiring completion of the first transition. In some examples, a single renderer instance may render the audio data for reproduction.

In some examples, the first set of speaker activations, the second set of speaker activations and the third set of speaker activations may be frequency-dependent speaker activations. According to some such examples, the frequency-dependent speaker activations may correspond with and/or be produced by applying, in at least a first frequency band, a model of perceived spatial position that produces a binaural response corresponding to an audio object position at the left and right ears of a listener.

In some examples, the frequency-dependent speaker activations may correspond with and/or be produced by applying, in at least a second frequency band, a model of perceived spatial position that places a perceived spatial position of an audio signal playing from a set of loudspeakers at a center of mass of the set of loudspeakers' positions weighted by the loudspeaker's associated activating gains.

According to some examples, the first set of speaker activations, the second set of speaker activations and/or the third set of speaker activations may be based, at least in part, on a cost function. In some such examples, the first set of speaker activations, the second set of speaker activations and/or the third set of speaker activations may be a result of optimizing a cost that is a function of the following: a model of perceived spatial position of the audio signal played when played back over the set of loudspeakers in the environment; a measure of proximity of the intended perceived spatial position of the audio signal to a position of each loudspeaker of the set of loudspeakers; and/or one or more additional dynamically configurable functions. In some such examples, the one or more additional dynamically configurable functions may be based on one or more of the following: the proximity of loudspeakers to one or more listeners; the proximity of loudspeakers to an attracting force position (wherein an attracting force may be a factor that favors relatively higher activation of loudspeakers in closer proximity to the attracting force position); the proximity of loudspeakers to a repelling force position (wherein a repelling force may be a factor that favors relatively lower activation of loudspeakers in closer proximity to the repelling force position); the capabilities of each loudspeaker relative to other loudspeakers in the environment; synchronization of the loudspeakers with respect to other loudspeakers; wakeword performance; and/or echo canceller performance.

According to some examples, the method may involve receiving, by the control system and via the interface system, a second rendering transition indication. According to some such examples, the second rendering transition indication may indicate a transition to a third rendering configuration. In some such examples, the method may involve determining, by the control system, a fourth set of speaker activations corresponding to the third rendering configuration. In some such examples, the method may involve performing, by the control system, a third transition to the fourth set of speaker activations without requiring completion of the first transition or the second transition. In some examples, the method may involve receiving, by the control system and via the interface system, a third rendering transition indication. In some such examples, the third rendering transition indication may indicate a transition to a fourth rendering configuration. In some such examples, the method may involve determining, by the control system, a fifth set of speaker activations corresponding to the fourth rendering configuration. In some such examples, the method may involve performing, by the control system, a fourth transition to the fifth set of speaker activations without requiring completion of the first transition, the second transition or the third transition.

In some examples, the method may involve receiving, by the control system and via the interface system and sequentially, second through $(N)^{th}$ rendering transition indications. In some such examples, the method may involve determining, by the control system, fourth through $(N+2)^{th}$ sets of speaker activations corresponding to the second through $(N)^{th}$ rendering transition indications. In some such examples, the method may involve performing, by the control system and sequentially, third through $(N)^{th}$ transitions from the fourth set of speaker activations to a $(N+1)^{th}$ set of speaker activations. In some such examples, the method may involve performing, by the control system, an $(N+1)^{th}$ transition to the $(N+2)^{th}$ set of speaker activations without requiring completion of any of the first through $(N)^{th}$ transitions.

According to some examples, the method may involve receiving, by the control system and via the interface system, a second rendering transition indication. In some instances, the second rendering transition indication may indicate a transition to a third rendering configuration. In some such examples, the method may involve determining, by the control system, a fourth set of speaker activations corresponding to a simplified version of the third rendering configuration. In some such examples, the method may involve performing, by the control system, a third transition from the third set of speaker activations to the fourth set of speaker activations. In some such examples, the method may involve determining, by the control system, a fifth set of speaker activations corresponding to a complete version of the third rendering configuration. In some such examples, the method may involve performing, by the control system, a fourth transition to the fifth set of speaker activations without requiring completion of the first transition, the second transition or the third transition.

In some examples, the method may involve receiving, by the control system and via the interface system and sequentially, second through $(N)^{th}$ rendering transition indications. In some such examples, the method may involve determining, by the control system, a first set of speaker activations and a second set of speaker activations for each of the second through $(N)^{th}$ rendering transition indications. In some such examples, the first set of speaker activations may correspond to a simplified version of a rendering configuration and the second set of speaker activations may correspond to a complete version of a rendering configuration for each of the second through $(N)^{th}$ rendering transition indications. In some such examples, the method may involve performing, by the control system and sequentially, third through $(2N-1)^{th}$ transitions from a fourth set of speaker activations to a $(2N)^{th}$ set of speaker activations. In some such examples, the method may involve performing, by the control system, a $(2N)^{th}$ transition to a $(2N+1)^{th}$ set of speaker activations without requiring completion of any of the first through $(2N)^{th}$ transitions.

According to some examples, rendering the audio data for reproduction may involve determining a single set of interpolated activations from the rendering configurations and applying the single set of interpolated activations to produce a single set of rendered audio signals. In some such examples, the single set of rendered audio signals may be fed into a set of loudspeaker delay lines. In some such examples, the set of loudspeaker delay lines may include one loudspeaker delay line for each loudspeaker of a plurality of loudspeakers.

In some examples, rendering of the audio data for reproduction may be performed in the frequency domain. In some such examples, rendering the audio data for reproduction may involve determining and implementing loudspeaker delays in the frequency domain. In some such examples, determining and implementing speaker delays in the frequency domain may involve determining and implementing a combination of transform block delays and sub-block delays applied by frequency domain filter coefficients. In some such examples, the sub-block delays may be residual phase terms that allow for delays that are not exact multiples of a frequency domain transform block size. In some examples, rendering the audio data for reproduction may involve implementing a set of transform block delay lines with separate read offsets.

In some examples, rendering the audio data for reproduction may involve implementing sub-block delay filtering. In some such examples, implementing the sub-block delay filtering may involve implementing multi-tap filters across blocks of the frequency domain transform.

According to some examples, rendering the audio data for reproduction may involve determining and applying interpolated speaker activations and crossfade windows for each rendering configuration. In some such examples, rendering the audio data for reproduction may involve implementing a set of transform block delay lines with separate delay line read offsets. In some such examples, crossfade window selection may be based, at least in part, on the delay line read offsets. In some such examples, the crossfade windows may be designed to have a unity power sum if the delay line read offsets are not identical.

In some examples, the first set of speaker activations may be for each of a corresponding plurality of positions in a three-dimensional space. However, according to some examples, the first set of speaker activations may correspond to a channel-based audio format. In some such examples, the intended perceived spatial position may correspond with a channel of the channel-based audio format.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some examples, the apparatus may be one of the above-referenced audio devices. However, in some implementations the apparatus may be another type of device, such as a mobile device, a laptop, a server, etc.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION OF EMBODIMENTS

Figure 1A:
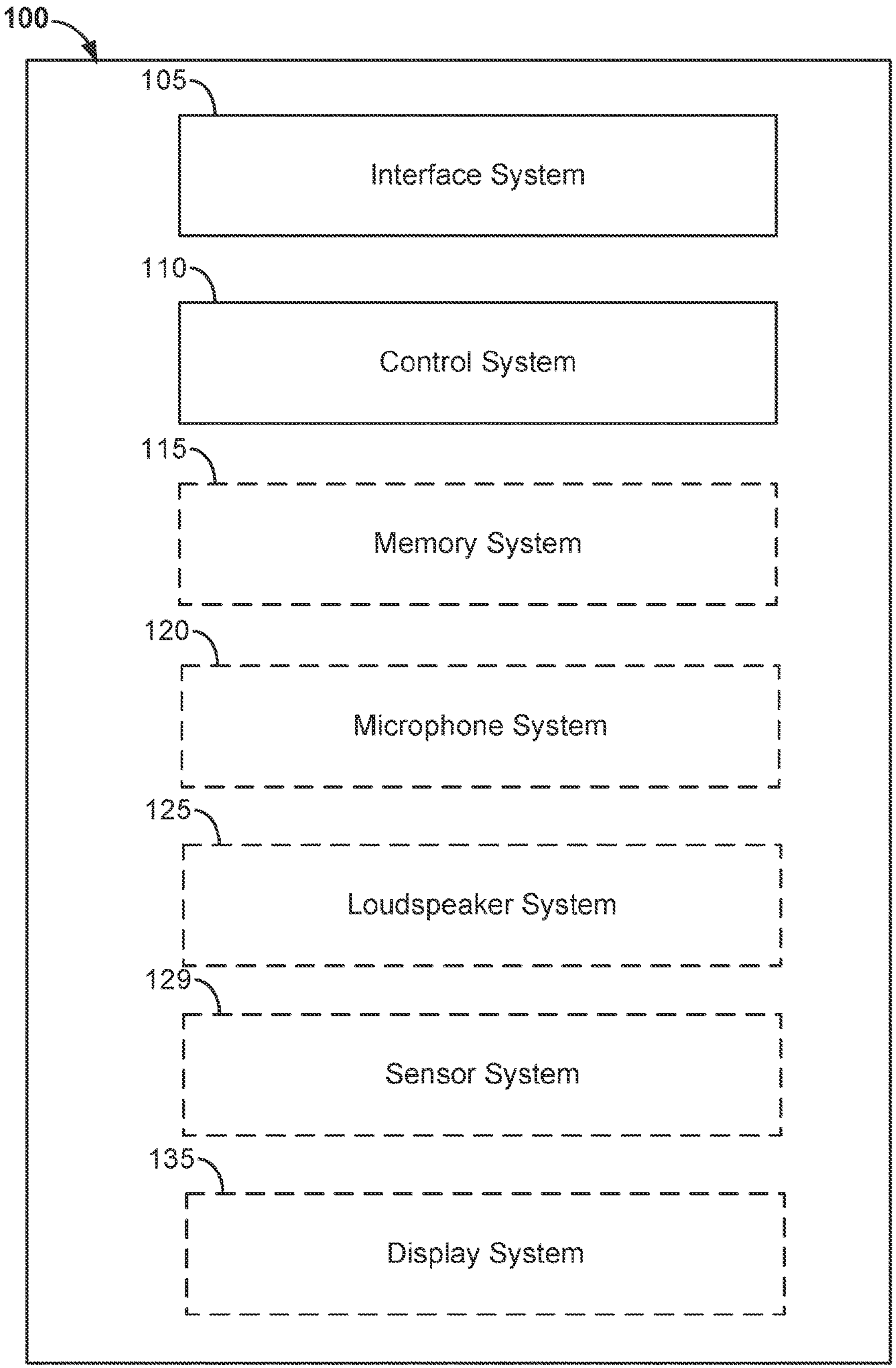
FIG. 1A is a block diagram that shows examples of components of an apparatus capable of implementing various aspects of this disclosure.

Flexible rendering is a technique for rendering spatial audio over an arbitrary number of arbitrarily placed speakers. With the widespread deployment of smart audio devices (e.g., smart speakers) in the home, there is need for realizing flexible rendering technology which allows consumers to perform flexible rendering of audio, and playback of the so-rendered audio, using smart audio devices.

Several technologies have been developed to implement flexible rendering, including: Center of Mass Amplitude Panning (CMAP), and Flexible Virtualization (FV). Both of these technologies cast the rendering problem as one of cost function minimization, where the cost function consists of two terms: a first term that models the desired spatial impression that the renderer is trying to achieve, and a second term that assigns a cost to activating speakers. To date this second term has focused on creating a sparse solution where only speakers in close proximity to the desired spatial position of the audio being rendered are activated.

Some embodiments of the present disclosure are methods for managing playback of multiple streams of audio by at least one (e.g., all or some) of the smart audio devices of a set of smart audio devices (or by at least one (e.g., all or some) of the speakers another set of speakers).

A class of embodiments involves methods for managing playback by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some (i.e., by speaker(s) of all or some) of the smart audio devices.

Orchestrating smart audio devices (e.g., in the home to handle a variety of simultaneous use cases) may involve the simultaneous playback of one or more audio program streams over an interconnected set of speakers. For example, a user might be listening to a cinematic Atmos soundtrack (or other object-based audio program) over the set of speakers, but then the user may utter a command to an associated smart assistant (or other smart audio device). In this case, the audio playback by the system may by modified (in accordance with some embodiments) to warp the spatial presentation of the Atmos mix away from the location of the talker (the talking user) and away from the nearest smart audio device, while simultaneously warping the playback of the smart audio device's (voice assistant's) corresponding response towards the location of the talker. This may provide important benefits in comparison to merely reducing volume of playback of the audio program content in response to detection of the command (or a corresponding wakeword). Similarly, a user might want to use the speakers to get cooking tips in the kitchen while the same Atmos sound track is playing in an adjacent open living space. In this case, in accordance with some examples, the Atmos soundtrack can be warped away from the kitchen and/or the loudness of one or more rendered signals of the Atmos soundtrack can be modified in response to the loudness of one or more rendered signals of the cooking tips sound track. Additionally, in some implementations the cooking tips playing in the kitchen can be dynamically adjusted to be heard by a person in the kitchen above any of the Atmos sound track that might be bleeding in from the living space.

Some embodiments involve multi-stream rendering systems configured to implement the example use cases set forth above as well as numerous others being contemplated. In a class of embodiments, an audio rendering system may be configured to play simultaneously a plurality of audio program streams over a plurality of arbitrarily placed loudspeakers, wherein at least one of said program streams is a spatial mix and the rendering of said spatial mix is dynamically modified in response to (or in connection with) the simultaneous playback of one or more additional program streams.

In some embodiments, a multi-stream renderer may be configured for implementing the scenario laid out above as well as numerous other cases where the simultaneous playback of multiple audio program streams must be managed. Some implementations of the multi-stream rendering system may be configured to perform one or more of the following operations:

- Simultaneously rendering and playing back a plurality of audio programs streams over a plurality of arbitrarily placed loudspeakers, wherein at least one of said program streams is a spatial mix.
  - The term program stream refers to a collection of one or more audio signals that are meant to be heard together as a whole. Examples include a selection of music, a movie soundtrack, a pod-cast, a live voice call, a synthesized voice response from a smart assistant, etc.
  - A spatial mix is a program stream that is intended to deliver different signals at the left and right ears of the listener (more than mono). Examples of audio formats for a spatial mix include stereo, 5.1 and 7.1 surround sound, object audio formats such as Dolby Atmos, and Ambisonics.
  - Rendering a program stream refers to the process of actively distributing the associated one or more audio signals across the plurality of loudspeakers to achieve a particular perceptual impression.
- Dynamically modifying the rendering of the at least one spatial mix as a function of the rendering of one or more of the additional program streams. Examples of such modifications to the rendering of the spatial mix include, but are not limited to
  - Modifying the relative activation of the plurality of loudspeakers as a function of the relative activation of loudspeakers associated with the rendering of at least one of the one or more additional program streams.
  - Warping the intended spatial balance of the spatial mix as a function of the spatial properties of the rendering of at least one of the one or more additional program streams.
  - Modifying the loudness or audibility of the spatial mix as a function of the loudness or audibility of at least one of the one or more additional program streams.

FIG. 1A is a block diagram that shows examples of components of an apparatus capable of implementing various aspects of this disclosure. According to some examples, the apparatus 100 may be, or may include, a smart audio device that is configured for performing at least some of the methods disclosed herein. In other implementations, the apparatus 100 may be, or may include, another device that is configured for performing at least some of the methods disclosed herein, such as a laptop computer, a cellular telephone, a tablet device, a smart home hub, etc. In some such implementations the apparatus 100 may be, or may include, a server. In some implementations the apparatus 100 may be configured to implement what may be referred to herein as an "audio session manager."

In this example, the apparatus 100 includes an interface system 105 and a control system 110. The interface system 105 may, in some implementations, be configured for communication with one or more devices that are executing, or configured for executing, software applications. Such software applications may sometimes be referred to herein as "applications" or simply "apps." The interface system 105 may, in some implementations, be configured for exchanging control information and associated data pertaining to the applications. The interface system 105 may, in some implementations, be configured for communication with one or more other devices of an audio environment. The audio environment may, in some examples, be a home audio environment. The interface system 105 may, in some implementations, be configured for exchanging control information and associated data with audio devices of the audio environment. The control information and associated data may, in some examples, pertain to one or more applications with which the apparatus 100 is configured for communication.

The interface system 105 may, in some implementations, be configured for receiving audio program streams. The audio program streams may include audio signals that are scheduled to be reproduced by at least some speakers of the environment. The audio program streams may include spatial data, such as channel data and/or spatial metadata. The interface system 105 may, in some implementations, be configured for receiving input from one or more microphones in an environment.

The interface system 105 may include one or more network interfaces and/or one or more external device interfaces (such as one or more universal serial bus (USB) interfaces). According to some implementations, the interface system 105 may include one or more wireless interfaces. The interface system 105 may include one or more devices for implementing a user interface, such as one or more microphones, one or more speakers, a display system, a touch sensor system and/or a gesture sensor system. In some examples, the interface system 105 may include one or more interfaces between the control system 110 and a memory system, such as the optional memory system 115 shown in FIG. 1A. However, the control system 110 may include a memory system in some instances.

The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 110 may reside in more than one device. For example, a portion of the control system 110 may reside in a device within one of the environments depicted herein and another portion of the control system 110 may reside in a device that is outside the environment, such as a server, a mobile device (e.g., a smartphone or a tablet computer), etc. In other examples, a portion of the control system 110 may reside in a device within one of the environments depicted herein and another portion of the control system 110 may reside in one or more other devices of the environment. For example, control system functionality may be distributed across multiple smart audio devices of an environment, or may be shared by an orchestrating device (such as what may be referred to herein as a smart home hub) and one or more other devices of the environment. The interface system 105 also may, in some such examples, reside in more than one device.

In some implementations, the control system 110 may be configured for performing, at least in part, the methods disclosed herein. According to some examples, the control system 110 may be configured for implementing methods of managing playback of multiple streams of audio over multiple speakers.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 115 shown in FIG. 1A and/or in the control system 110. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 110 of FIG. 1A.

In some examples, the apparatus 100 may include the optional microphone system 120 shown in FIG. 1A. The optional microphone system 120 may include one or more microphones. In some implementations, one or more of the microphones may be part of, or associated with, another device, such as a speaker of the speaker system, a smart audio device, etc. In some examples, the apparatus 100 may not include a microphone system 120. However, in some such implementations the apparatus 100 may nonetheless be configured to receive microphone data for one or more microphones in an audio environment via the interface system 110.

According to some implementations, the apparatus 100 may include the optional loudspeaker system 125 shown in FIG. 1A. The optional loudspeaker system 125 may include one or more loudspeakers, which also may be referred to herein as "speakers." In some examples, at least some loudspeakers of the optional loudspeaker system 125 may be arbitrarily located. For example, at least some speakers of the optional loudspeaker system 125 may be placed in locations that do not correspond to any standard prescribed loudspeaker layout, such as Dolby 5.1, Dolby 5.1.2, Dolby 7.1, Dolby 7.1.4, Dolby 9.1, Hamasaki 22.2, etc. In some such examples, at least some loudspeakers of the optional speaker system 125 may be placed in locations that are convenient to the space (e.g., in locations where there is space to accommodate the loudspeakers), but not in any standard prescribed loudspeaker layout. In some examples, the apparatus 100 may not include a loudspeaker system 125.

In some implementations, the apparatus 100 may include the optional sensor system 129 shown in FIG. 1A. The optional sensor system 129 may include one or more cameras, touch sensors, gesture sensors, motion detectors, etc. According to some implementations, the optional sensor system 129 may include one or more cameras. In some implementations, the cameras may be free-standing cameras. In some examples, one or more cameras of the optional sensor system 129 may reside in a smart audio device, which may be a single purpose audio device or a virtual assistant. In some such examples, one or more cameras of the optional sensor system 129 may reside in a TV, a mobile phone or a smart speaker. In some examples, the apparatus 100 may not include a sensor system 129. However, in some such implementations the apparatus 100 may nonetheless be configured to receive sensor data for one or more sensors in an audio environment via the interface system 110.

In some implementations, the apparatus 100 may include the optional display system 135 shown in FIG. 1A. The optional display system 135 may include one or more displays, such as one or more light-emitting diode (LED) displays. In some instances, the optional display system 135 may include one or more organic light-emitting diode (OLED) displays. In some examples wherein the apparatus 100 includes the display system 135, the sensor system 129 may include a touch sensor system and/or a gesture sensor system proximate one or more displays of the display system 135. According to some such implementations, the control system 110 may be configured for controlling the display system 135 to present one or more graphical user interfaces (GUIs).

According to some such examples the apparatus 100 may be, or may include, a smart audio device. In some such implementations the apparatus 100 may be, or may include, a wakeword detector. For example, the apparatus 100 may be, or may include, a virtual assistant.

Figure 1B:
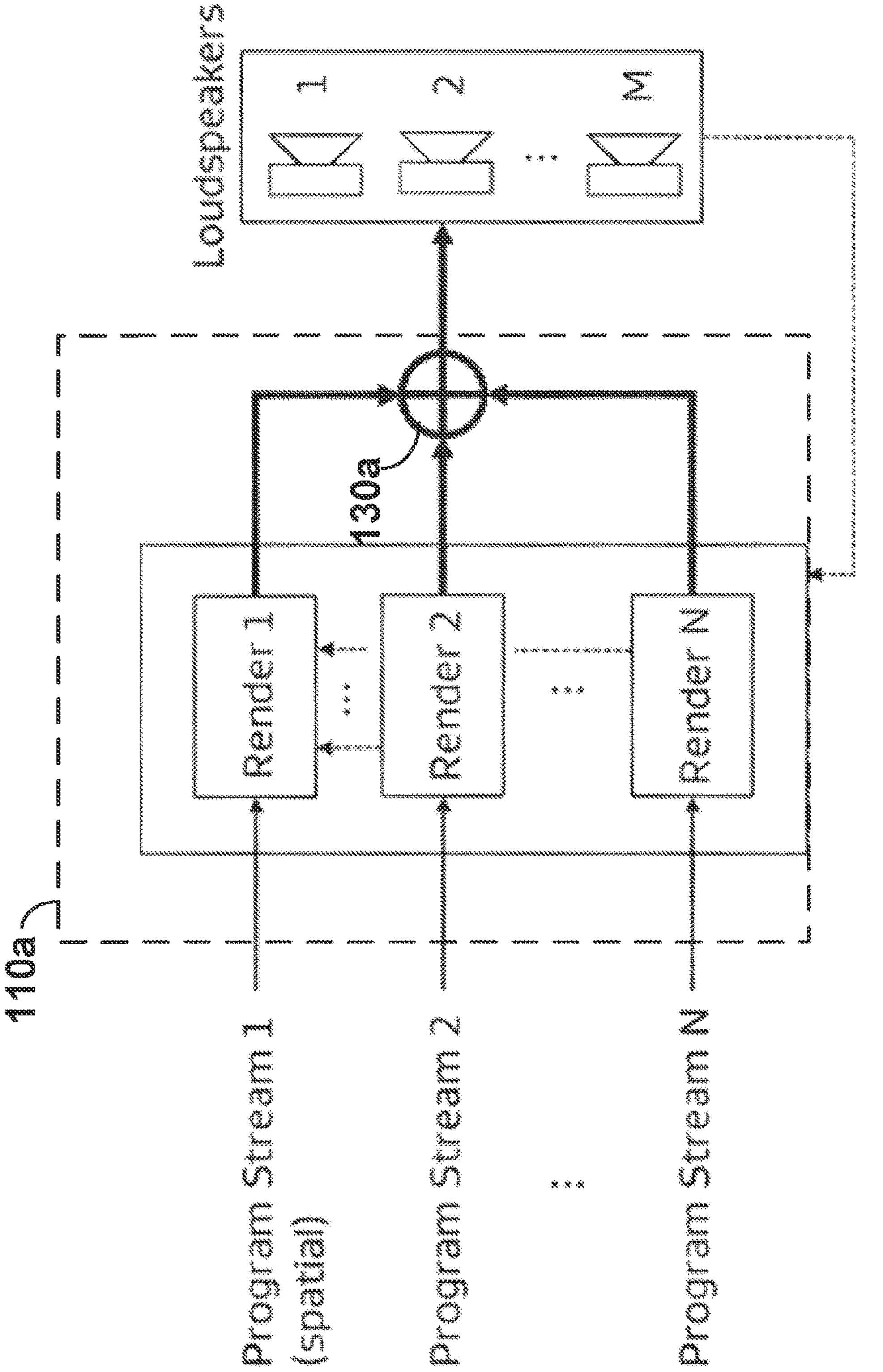
FIG. 1B is a block diagram of a minimal version of an embodiment.

FIG. 1B is a block diagram of a minimal version of an embodiment. Depicted are N program streams (N≥2), with the first explicitly labeled as being spatial, whose corresponding collection of audio signals feed through corresponding renderers that are each individually configured for playback of its corresponding program stream over a common set of M arbitrarily spaced loudspeakers (M≥2). The renderers also may be referred to herein as "rendering modules." The rendering modules and the mixer 130*a* may be implemented via software, hardware, firmware or some combination thereof. In this example, the rendering modules and the mixer 130*a* are implemented via control system 110*a*, which is an instance of the control system 110 that is described above with reference to FIG. 1A. Each of the N renderers output a set of M loudspeaker feeds which are summed across all N renderers for simultaneous playback over the M loudspeakers. According to this implementation, information about the layout of the M loudspeakers within the listening environment is provided to all the renderers, indicated by the dashed line feeding back from the loudspeaker block, so that the renderers may be properly configured for playback over the speakers. This layout information may or may not be sent from one or more of the speakers themselves, depending on the particular implementation. According to some examples, layout information may be provided by one or more smart speakers configured for determining the relative positions of each of the M loudspeakers in the listening environment. Some such auto-location methods may be based on direction of arrival (DOA) methods or time of arrival (TOA) methods. In other examples, this layout information may be determined by another device and/or input by a user. In some examples, loudspeaker specification information about the capabilities of at least some of the M loudspeakers within the listening environment may be provided to all the renderers. Such loudspeaker specification information may include impedance, frequency response, sensitivity, power rating, number and location of individual drivers, etc. According to this example, information from the rendering of one or more of the additional program streams is fed into the renderer of the primary spatial stream such that said rendering may be dynamically modified as a function of said information. This information is represented by the dashed lines passing from render blocks 2 through N back up to render block 1.

Figure 2A:
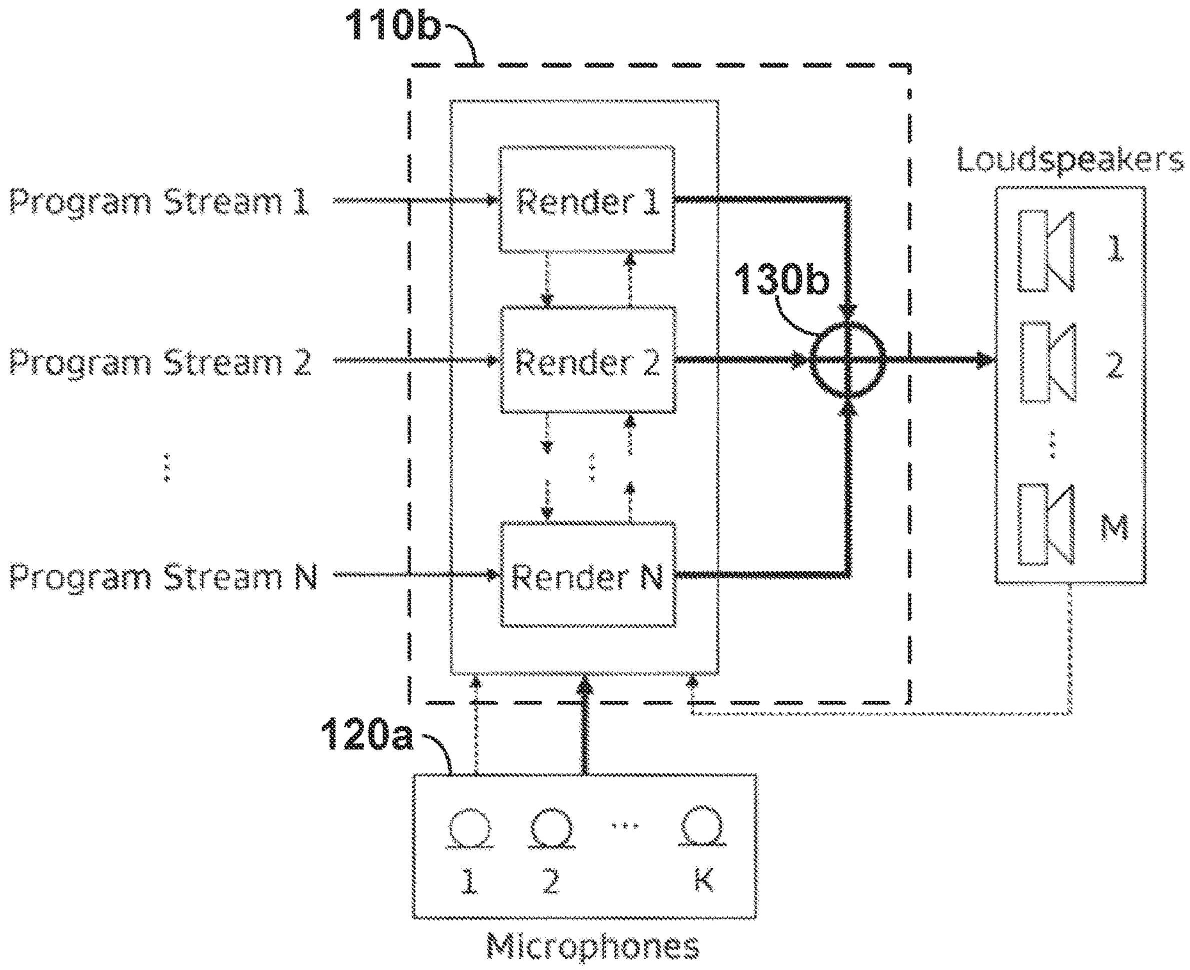
FIG. 2A depicts another (more capable) embodiment with additional features.

FIG. 2A depicts another (more capable) embodiment with additional features. In this example, the rendering modules and the mixer 130*b* are implemented via control system 110*b*, which is an instance of the control system 110 that is described above with reference to FIG. 1A. In this version, dashed lines travelling up and down between all N renderers represent the idea that any one of the N renderers may contribute to the dynamic modification of any of the remaining N−1 renderers. In other words, the rendering of any one of the N program streams may be dynamically modified as a function of a combination of one or more renderings of any of the remaining N−1 program streams. Additionally, any one or more of the program streams may be a spatial mix, and the rendering of any program stream, regardless of whether it is spatial or not, may be dynamically modified as a function of any of the other program streams. Loudspeaker layout information may be provided to the N renderers, e.g. as noted above. In some examples, loudspeaker specification information may be provided to the N renderers. In some implementations, a microphone system 120*a* may include a set of K microphones, (K≥1), within the listening environment. In some examples, the microphone(s) may be attached to, or associated with, the one or more of the loudspeakers. These microphones may feed both their captured audio signals, represented by the solid line, and additional configuration information (their location, for example), represented by the dashed line, back into the set of N renderers. Any of the N renderers may then be dynamically modified as a function of this additional microphone input. Various examples are provided herein.

Examples of information derived from the microphone inputs and subsequently used to dynamically modify any of the N renderers include but are not limited to:

- Detection of the utterance of a particular word or phrase by a user of the system.
- An estimate of the location of one or more users of the system.
- An estimate of the loudness of any of combination of the N programs streams at a particular location in the listening space.
- An estimate of the loudness of other environmental sounds, such as background noise, in the listening environment.

Figure 2B:
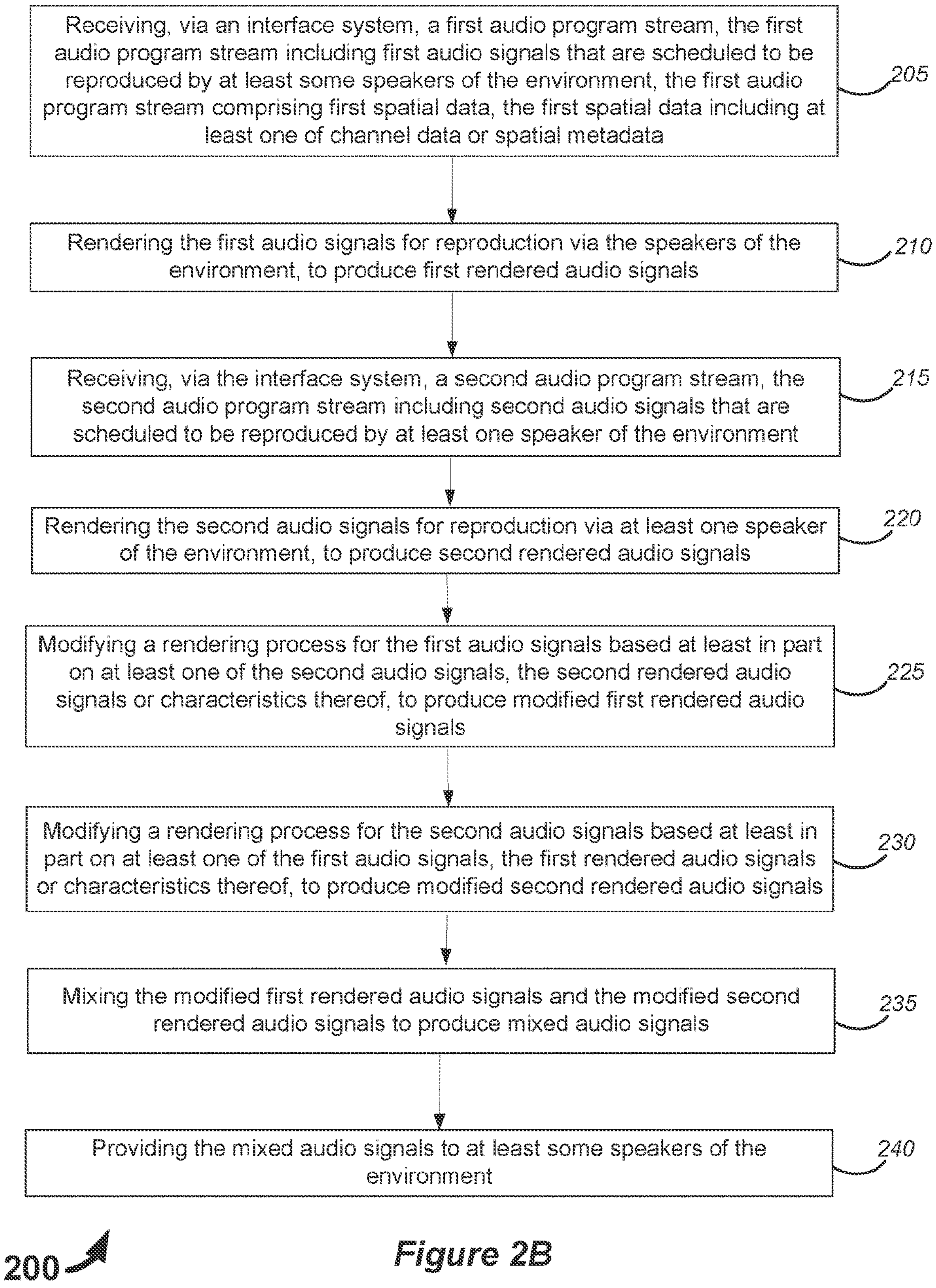
FIG. 2B is a flow diagram that outlines one example of a method that may be performed by an apparatus or system such as those shown in FIG. 1A, FIG. 1B or FIG. 2A.

FIG. 2B is a flow diagram that outlines one example of a method that may be performed by an apparatus or system such as those shown in FIG. 1A, FIG. 1B or FIG. 2A. The blocks of method 200, like other methods described herein, are not necessarily performed in the order indicated. Moreover, such methods may include more or fewer blocks than shown and/or described. The blocks of method 200 may be performed by one or more devices, which may be (or may include) a control system such as the control system 110, the control system 110*a* or the control system 110*b* that are shown in FIGS. 1A, 1B and 2A, and described above, or one of the other disclosed control system examples.

In this implementation, block 205 involves receiving, via an interface system, a first audio program stream. In this example, the first audio program stream includes first audio signals that are scheduled to be reproduced by at least some speakers of the environment. Here, the first audio program stream includes first spatial data. According to this example, the first spatial data includes channel data and/or spatial metadata. In some examples, block 205 involves a first rendering module of a control system receiving, via an interface system, the first audio program stream.

According to this example, block 210 involves rendering the first audio signals for reproduction via the speakers of the environment, to produce first rendered audio signals. Some examples of the method 200 involve receiving loudspeaker layout information, e.g., as noted above. Some examples of the method 200 involve receiving loudspeaker specification information, e.g., as noted above. In some examples, the first rendering module may produce the first rendered audio signals based, at least in part, on the loudspeaker layout information and/or the loudspeaker specification information.

In this example, block 215 involves receiving, via the interface system, a second audio program stream. In this implementation, the second audio program stream includes second audio signals that are scheduled to be reproduced by at least some speakers of the environment. According to this example, the second audio program stream includes second spatial data. The second spatial data includes channel data and/or spatial metadata. In some examples, block 215 involves a second rendering module of a control system receiving, via the interface system, the second audio program stream.

According to this implementation, block 220 involves rendering the second audio signals for reproduction via the speakers of the environment, to produce second rendered audio signals. In some examples, the second rendering module may produce the second rendered audio signals based, at least in part, on received loudspeaker layout information and/or received loudspeaker specification information.

In some instances, some or all speakers of the environment may be arbitrarily located. For example, at least some speakers of the environment may be placed in locations that do not correspond to any standard prescribed speaker layout, such as Dolby 5.1, Dolby 7.1, Hamasaki 22.2, etc. In some such examples, at least some speakers of the environment may be placed in locations that are convenient with respect to the furniture, walls, etc., of the environment (e.g., in locations where there is space to accommodate the speakers), but not in any standard prescribed speaker layout.

Accordingly, some implementations block 210 or block 220 may involve flexible rendering to arbitrarily located speakers. Some such implementations may involve Center of Mass Amplitude Panning (CMAP), Flexible Virtualization (FV) or a combination of both. From a high level, both these techniques render a set of one or more audio signals, each with an associated desired perceived spatial position, for playback over a set of two or more speakers, where the relative activation of speakers of the set is a function of a model of perceived spatial position of said audio signals played back over the speakers and a proximity of the desired perceived spatial position of the audio signals to the positions of the speakers. The model ensures that the audio signal is heard by the listener near its intended spatial position, and the proximity term controls which speakers are used to achieve this spatial impression. In particular, the proximity term favors the activation of speakers that are near the desired perceived spatial position of the audio signal. For both CMAP and FV, this functional relationship may be conveniently derived from a cost function written as the sum of two terms, one for the spatial aspect and one for proximity:

$$C(g) = C_{spatial}(g, \vec{o}, \{\vec{s}_i\}) + C_{proximity}(g, \vec{o}, \{\vec{s}_i\}) \quad (1)$$

Here, the set $\{\vec{s}_i\}$ denotes the positions of a set of M loudspeakers, $\vec{o}$ denotes the desired perceived spatial position of the audio signal, and g denotes an M dimensional vector of speaker activations. For CMAP, each speaker activation in the vector represents a gain per speaker, while for FV each speaker activation represents a filter (in this second case g can equivalently be considered a vector of complex values at a particular frequency and a different g is computed across a plurality of frequencies to form the filter). The optimal vector of speaker activations may be found by minimizing the cost function across activations:

$$g_{opt} = \min_g C(g, \vec{o}, \{\vec{s}_i\}) \quad (2a)$$

With certain definitions of the cost function, it can be difficult to control the absolute level of the optimal activations resulting from the above minimization, though the relative level between the components of $g_{opt}$ is appropriate. To deal with this problem, a subsequent normalization of $g_{opt}$ may be performed so that the absolute level of the activations is controlled. For example, normalization of the vector to have unit length may be desirable, which is in line with commonly used constant power panning rules:

$$\bar{g}_{opt} = \frac{g_{opt}}{\|g_{opt}\|} \quad (2b)$$

In some examples, the exact behavior of the flexible rendering algorithm may be dictated by the particular construction of the two terms of the cost function, $C_{spatial}$ and $C_{proximity}$. For CMAP, $C_{spatial}$ can be derived from a model that places the perceived spatial position of an audio signal playing from a set of loudspeakers at the center of mass of those loudspeakers' positions weighted by their associated activating gains $g_i$ (elements of the vector g):

$$\vec{o} = \frac{\sum_{i=1}^{M} g_i \vec{s}_i}{\sum_{i=1}^{M} g_i} \quad (3)$$

Equation 3 may then be manipulated into a spatial cost representing the squared error between the desired audio position and that produced by the activated loudspeakers, e.g., as follows:

$$C_{spatial}(g, \vec{o}, \{\vec{s}_i\}) = \left\| \left(\sum_{i=1}^{M} g_i\right)\vec{o} - \sum_{i=1}^{M} g_i \vec{s}_i \right\|^2 = \left\| \sum_{i=1}^{M} g_i (\vec{o} - s_i) \right\|^2 \quad (4)$$

With FV, the spatial term of the cost function is defined differently. There the goal is to produce a binaural response b corresponding to the audio object position oat the left and right ears of the listener. Conceptually, b is a 2×1 vector of filters (one filter for each ear) but is more conveniently treated as a 2×1 vector of complex values at a particular frequency. Proceeding with this representation at a particular frequency, the desired binaural response may be retrieved from a set of HRTFs index by object position:

$$b = HRTF\{\vec{o}\} \quad (5)$$

At the same time, the 2×1 binaural response e produced at the listener's ears by the loudspeakers may be modelled as a 2×M acoustic transmission matrix H multiplied with the M×1 vector g of complex speaker activation values:

$$e = Hg \tag{6}$$

The acoustic transmission matrix H may be modelled based on the set of loudspeaker positions $\{\vec{s}_i\}$ with respect to the listener position. Finally, the spatial component of the cost function can be defined as the squared error between the desired binaural response (Equation 5) and that produced by the loudspeakers (Equation 6):

$$C_{spatial}(g, \vec{o}, \{\vec{s}_i\}) = (b - Hg)^*(b - Hg) \tag{7}$$

Conveniently, the spatial term of the cost function for CMAP and FV defined in Equations 4 and 7 can both be rearranged into a matrix quadratic as a function of speaker activations g:

$$C_{spatial}(g, \vec{o}, \{\vec{s}_i\}) = g^*Ag + Bg + C \tag{8}$$

where A represents an M×M square matrix, B represents a 1×M vector, and C represents a scalar. In this example, the matrix A is of rank 2, and therefore when M>2 there exist an infinite number of speaker activations g for which the spatial error term equals zero. Introducing the second term of the cost function, $C_{proximity}$, removes this indeterminacy and results in a particular solution with perceptually beneficial properties in comparison to the other possible solutions. For both CMAP and FV, $C_{proximity}$ may be constructed such that activation of speakers whose position $\hat{s}_i$ is distant from the desired audio signal position $\vec{o}$ is penalized more than activation of speakers whose position is close to the desired position. This construction yields an optimal set of speaker activations that is sparse, where only speakers in close proximity to the desired audio signal's position are significantly activated, and practically results in a spatial reproduction of the audio signal that can be perceptually more robust to listener movement around the set of speakers.

To this end, the second term of the cost function, $C_{proximity}$, may be defined as a distance-weighted sum of the absolute values squared of speaker activations. This can be represented compactly in matrix form as:

$$C_{proximity}(g, \vec{o}, \{\vec{s}_i\}) = g^*Dg \tag{9a}$$

where D represents a diagonal matrix of distance penalties between the desired audio position and each speaker:

$$D = \begin{bmatrix} d_1 & \dots & 0 \\ \vdots & \ddots & \vdots \\ 0 & \dots & d_M \end{bmatrix}, d_i = \text{distance}(\vec{o}, \vec{s}_i) \tag{9b}$$

The distance penalty function can take on many forms, but the following is a useful parameterization:

$$\text{distance}(\vec{o}, \vec{s}_i) = \alpha d_0^2 \left( \frac{\|\vec{o} - \vec{s}_i\|}{d_0} \right)^{\beta} \tag{9c}$$

where $\|\vec{o} - \vec{s}_i\|$ represents the Euclidean distance between the desired audio position and speaker position and α and β represent tunable parameters. The parameter α indicates the global strength of the penalty; $d_0$ corresponds to the spatial extent of the distance penalty (loudspeakers at a distance around $d_0$ or futher away will be penalized), and β accounts for the abruptness of the onset of the penalty at distance $d_0$.

Combining the two terms of the cost function defined in Equations 8 and 9a yields the overall cost function:

$$C(g) = g^*Ag + Bg + C + g^*Dg = g^*(A + D)g + Bg + C \tag{10}$$

Setting the derivative of this cost function with respect to g equal to zero and solving for g yields the optimal speaker activation solution for this example:

$$g_{opt} = \frac{1}{2}(A + D)^{-1}B \tag{11}$$

In general, the optimal solution in Equation 11 may yield speaker activations that are negative in value. For the CMAP construction of the flexible renderer, such negative activations may not be desirable, and thus in some examples Equation (11) may be minimized subject to all activations remaining positive.

Figure 2C:
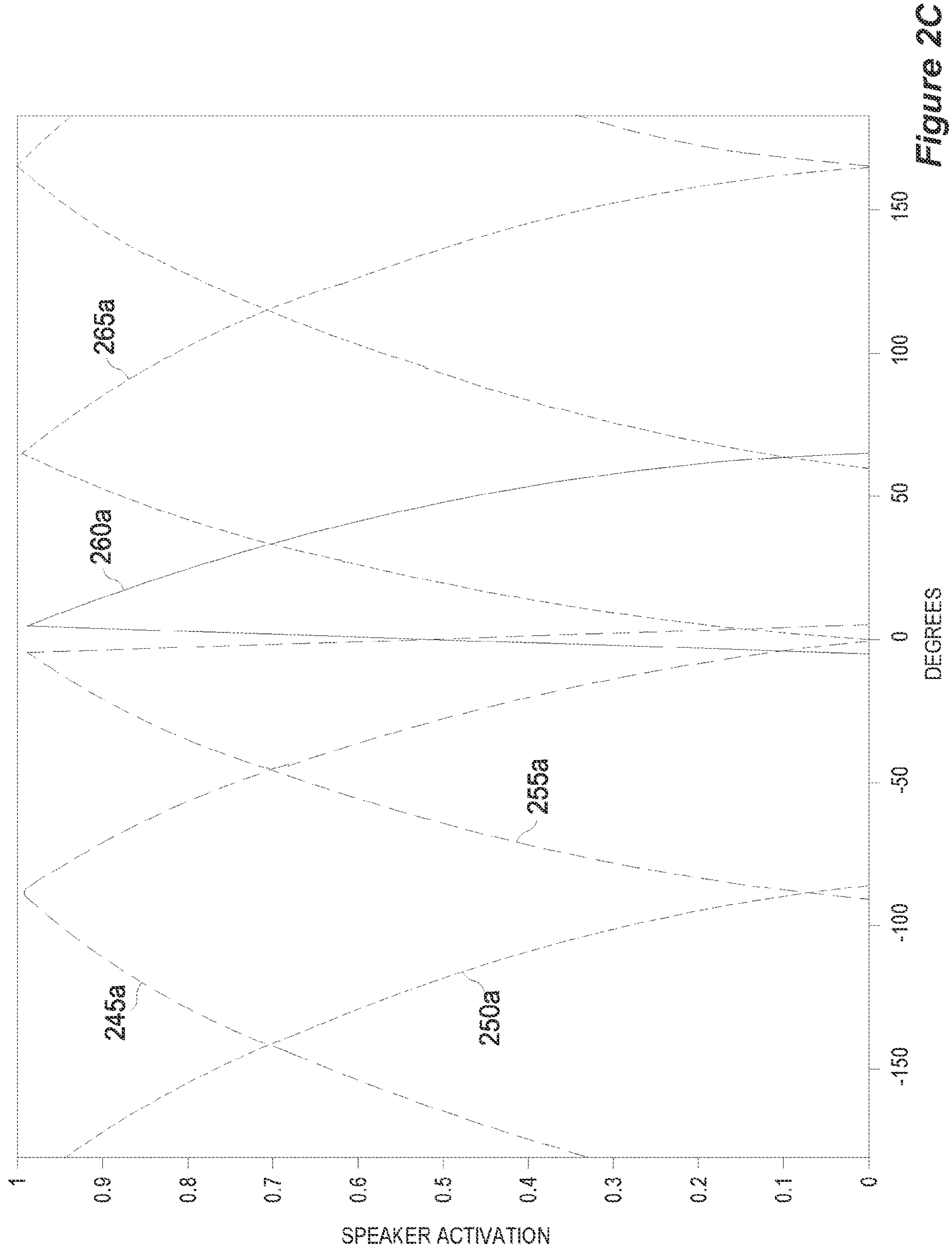
FIGS. 2C and 2D are diagrams which illustrate an example set of speaker activations and object rendering positions.
Figure 2D:
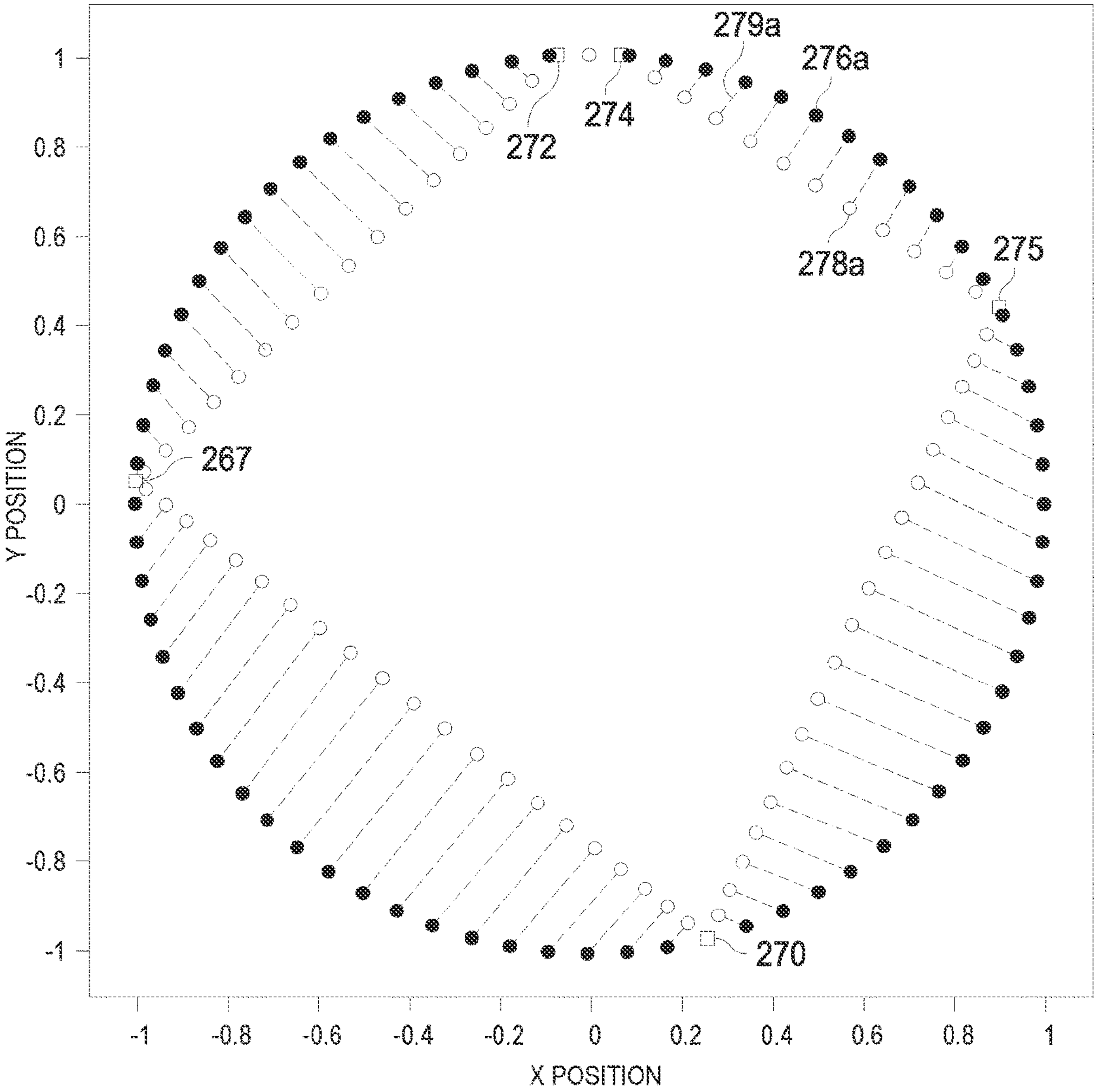

FIGS. 2C and 2D are diagrams which illustrate an example set of speaker activations and object rendering positions. In these examples, the speaker activations and object rendering positions correspond to speaker positions of 4, 64, 165, −87, and −4 degrees. FIG. 2C shows the speaker activations 245*a*, 250*a*, 255*a*, 260*a* and 265*a*, which comprise the optimal solution to Equation 11 for these particular speaker positions. FIG. 2D plots the individual speaker positions as squares 267, 270, 272, 274 and 275, which correspond to speaker activations 245*a*, 250*a*, 255*a*, 260*a* and 265*a*, respectively. FIG. 2D also shows ideal object positions (in other words, positions at which audio objects are to be rendered) for a multitude of possible object angles as dots 276*a* and the corresponding actual rendering positions for those objects as dots 278*a*, connected to the ideal object positions by dotted lines 279*a*.

A class of embodiments involves methods for rendering audio for playback by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering (in accordance with an embodiment) of audio for playback by all or some (i.e., by speaker(s) of all or some) of the smart audio devices. Many interactions with the system are contemplated which require dynamic modifications to the rendering. Such modifications may be, but are not necessarily, focused on spatial fidelity.

Some embodiments are methods for rendering of audio for playback by at least one (e.g., all or some) of the smart audio devices of a set of smart audio devices (or for playback by at least one (e.g., all or some) of the speakers of another set of speakers). The rendering may include minimization of a cost function, where the cost function includes at least one dynamic speaker activation term. Examples of such a dynamic speaker activation term may include (but are not limited to):

Proximity of speakers to one or more listeners;

Proximity of speakers to an attracting or repelling force;

Audibility of the speakers with respect to some location (e.g., listener position, or baby room);

Capability of the speakers (e.g., frequency response and distortion);

Synchronization of the speakers with respect to other speakers;

Wakeword performance; and

Echo canceller performance.

The dynamic speaker activation term(s) may enable at least one of a variety of behaviors, including warping the spatial presentation of the audio away from a particular smart audio device so that its microphone can better hear a talker or so that a secondary audio stream may be better heard from speaker(s) of the smart audio device.

Some embodiments implement rendering for playback by speaker(s) of a plurality of smart audio devices that are coordinated (orchestrated). Other embodiments implement rendering for playback by speaker(s) of another set of speakers.

Pairing flexible rendering methods (implemented in accordance with some embodiments) with a set of wireless smart speakers (or other smart audio devices) can yield an extremely capable and easy-to-use spatial audio rendering system. In contemplating interactions with such a system it becomes evident that dynamic modifications to the spatial rendering may be desirable in order to optimize for other objectives that may arise during the system's use. To achieve this goal, a class of embodiments augment existing flexible rendering algorithms (in which speaker activation is a function of the previously disclosed spatial and proximity terms), with one or more additional dynamically configurable functions dependent on one or more properties of the audio signals being rendered, the set of speakers, and/or other external inputs. In accordance with some embodiments, the cost function of the existing flexible rendering given in Equation 1 may be augmented with these one or more additional dependencies, e.g., according to the following equation:

$$C(g) = C_{spatial}(g, \vec{o}, \{\vec{s}_i\}) + C_{proximity}(g, \vec{o}, \{\vec{s}_i\}) + \sum_j C_j(g, \{\{\hat{o}\}, \{\hat{s}_i\}, \{\hat{e}\}\}_j) \quad (12)$$

In Equation 12, the terms $C_j$ $(g, \{\{\hat{o}\},\{\hat{s}_i\},\{\hat{e}\}\}_j)$ represent additional cost terms, with $\{\hat{o}\}$ representing a set of one or more properties of the audio signals (e.g., of an object-based audio program) being rendered, $\{\hat{s}_i\}$ representing a set of one or more properties of the speakers over which the audio is being rendered, and $\{\hat{e}\}$ representing one or more additional external inputs. Each term $C_1$ $(g,\{\{\hat{o}\},\{\hat{s}_i\},\{\hat{e}\}\}_j)$ returns a cost as a function of activations g in relation to a combination of one or more properties of the audio signals, speakers, and/or external inputs, represented generically by the set $\{\{\hat{o}\},\{\hat{s}_i\},\{\hat{e}\}\}_j$. It should be appreciated that in this example the set $\{\{\hat{o}\},\{\hat{s}_i\},\{\hat{e}\}\}_j$. contains at a minimum only one element from any of $\{\hat{o}\}$, $\{\hat{s}_i\}$, or $\{\hat{e}\}$.

Examples of $\{\hat{o}\}$ include but are not limited to:

Desired perceived spatial position of the audio signal;

Level (possible time-varying) of the audio signal; and/or

Spectrum (possibly time-varying) of the audio signal.

Examples of $\{\hat{s}_i\}$ include but are not limited to:

Locations of the loudspeakers in the listening space;

Frequency response of the loudspeakers;

Playback level limits of the loudspeakers;

Parameters of dynamics processing algorithms within the speakers, such as limiter gains;

A measurement or estimate of acoustic transmission from each speaker to the others;

A measure of echo canceller performance on the speakers; and/or

Relative synchronization of the speakers with respect to each other.

Examples of $\{\hat{e}\}$ include but are not limited to:

Locations of one or more listeners or talkers in the playback space;

A measurement or estimate of acoustic transmission from each loudspeaker to the listening location;

A measurement or estimate of the acoustic transmission from a talker to the set of loudspeakers;

Location of some other landmark in the playback space; and/or

A measurement or estimate of acoustic transmission from each speaker to some other landmark in the playback space;

With the new cost function defined in Equation 12, an optimal set of activations may be found through minimization with respect to g and possible post-normalization as previously specified in Equations 2a and 2b.

Figure 2E:
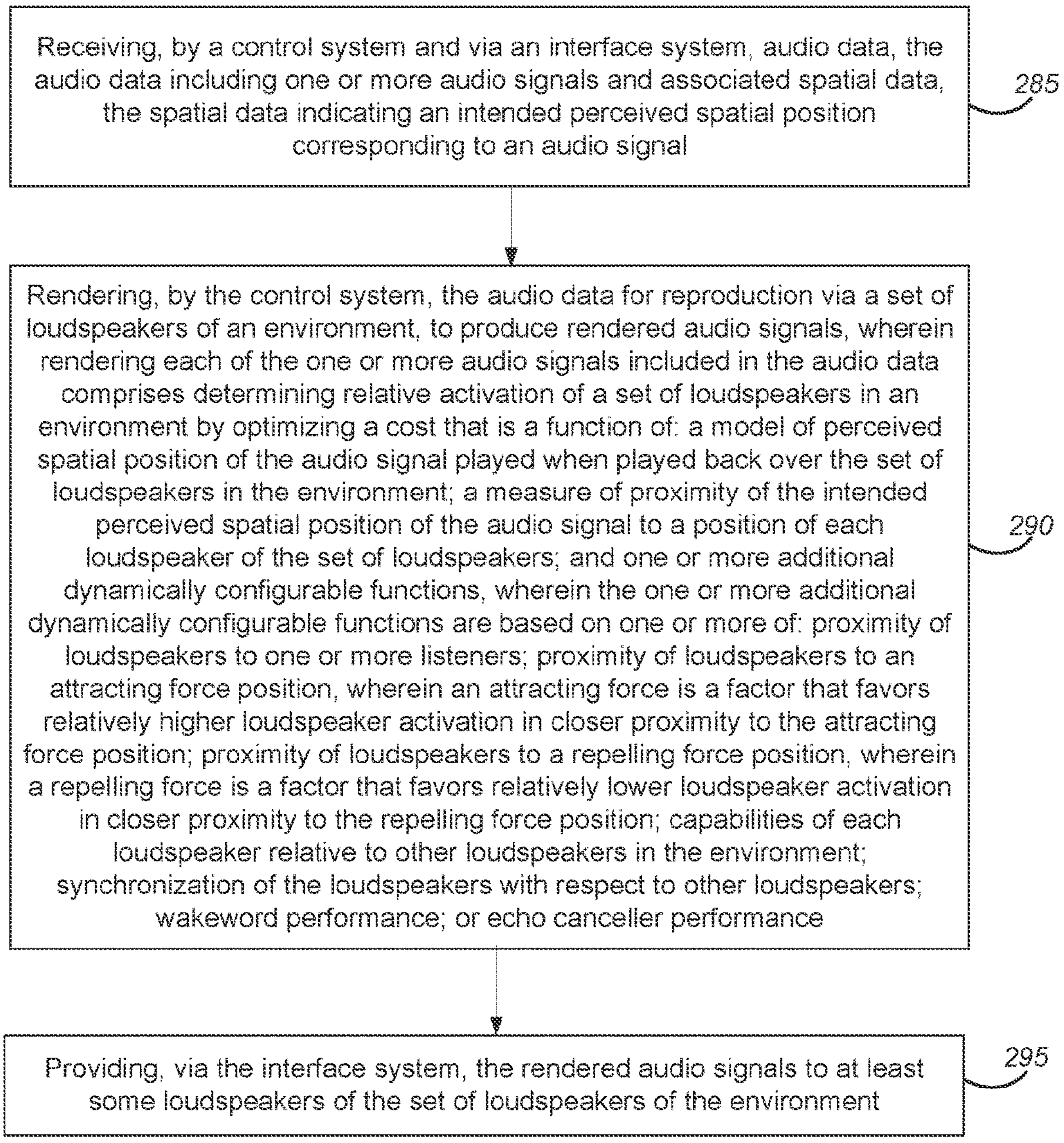
FIG. 2E is a flow diagram that outlines one example of a method that may be performed by an apparatus or system such as that shown in FIG. 1A.

FIG. 2E is a flow diagram that outlines one example of a method that may be performed by an apparatus or system such as that shown in FIG. 1A. The blocks of method 280, like other methods described herein, are not necessarily performed in the order indicated. Moreover, such methods may include more or fewer blocks than shown and/or described. The blocks of method 280 may be performed by one or more devices, which may be (or may include) a control system such as the control system 110 shown in FIG. 1A.

In this implementation, block 285 involves receiving, by a control system and via an interface system, audio data. In this example, the audio data includes one or more audio signals and associated spatial data. According to this implementation, the spatial data indicates an intended perceived spatial position corresponding to an audio signal. In some instances, the intended perceived spatial position may be explicit, e.g., as indicated by positional metadata such as Dolby Atmos positional metadata. In other instances, the intended perceived spatial position may be implicit, e.g., the intended perceived spatial position may be an assumed location associated with a channel according to Dolby 5.1, Dolby 7.1, or another channel-based audio format. In some examples, block 285 involves a rendering module of a control system receiving, via an interface system, the audio data.

According to this example, block 290 involves rendering, by the control system, the audio data for reproduction via a set of loudspeakers of an environment, to produce rendered audio signals. In this example, rendering each of the one or more audio signals included in the audio data involves determining relative activation of a set of loudspeakers in an environment by optimizing a cost function. According to this example, the cost is a function of a model of perceived spatial position of the audio signal when played back over the set of loudspeakers in the environment. In this example, the cost is also a function of a measure of proximity of the intended perceived spatial position of the audio signal to a position of each loudspeaker of the set of loudspeakers. In this implementation, the cost is also a function of one or more additional dynamically configurable functions. In this example, the dynamically configurable functions are based on one or more of the following: proximity of loudspeakers to one or more listeners; proximity of loudspeakers to an attracting force position, wherein an attracting force is a factor that favors relatively higher loudspeaker activation in closer proximity to the attracting force position; proximity of loudspeakers to a repelling force position, wherein a repelling force is a factor that favors relatively lower loudspeaker activation in closer proximity to the repelling force position; capabilities of each loudspeaker relative to other loudspeakers in the environment; synchronization of the loudspeakers with respect to other loudspeakers; wakeword performance; or echo canceller performance.

In this example, block 295 involves providing, via the interface system, the rendered audio signals to at least some loudspeakers of the set of loudspeakers of the environment.

According to some examples, the model of perceived spatial position may produce a binaural response corresponding to an audio object position at the left and right ears of a listener. Alternatively, or additionally, the model of perceived spatial position may place the perceived spatial position of an audio signal playing from a set of loudspeakers at a center of mass of the set of loudspeakers' positions weighted by the loudspeaker's associated activating gains.

In some examples, the one or more additional dynamically configurable functions may be based, at least in part, on a level of the one or more audio signals. In some instances, the one or more additional dynamically configurable functions may be based, at least in part, on a spectrum of the one or more audio signals.

Some examples of the method 280 involve receiving loudspeaker layout information. In some examples, the one or more additional dynamically configurable functions may be based, at least in part, on a location of each of the loudspeakers in the environment.

Some examples of the method 280 involve receiving loudspeaker specification information. In some examples, the one or more additional dynamically configurable functions may be based, at least in part, on the capabilities of each loudspeaker, which may include one or more of frequency response, playback level limits or parameters of one or more loudspeaker dynamics processing algorithms.

According to some examples, the one or more additional dynamically configurable functions may be based, at least in part, on a measurement or estimate of acoustic transmission from each loudspeaker to the other loudspeakers. Alternatively, or additionally, the one or more additional dynamically configurable functions may be based, at least in part, on a listener or speaker location of one or more people in the environment. Alternatively, or additionally, the one or more additional dynamically configurable functions may be based, at least in part, on a measurement or estimate of acoustic transmission from each loudspeaker to the listener or speaker location. An estimate of acoustic transmission may, for example be based at least in part on walls, furniture or other objects that may reside between each loudspeaker and the listener or speaker location.

Alternatively, or additionally, the one or more additional dynamically configurable functions may be based, at least in part, on an object location of one or more non-loudspeaker objects or landmarks in the environment. In some such implementations, the one or more additional dynamically configurable functions may be based, at least in part, on a measurement or estimate of acoustic transmission from each loudspeaker to the object location or landmark location.

Numerous new and useful behaviors may be achieved by employing one or more appropriately defined additional cost terms to implement flexible rendering. All example behaviors listed below are cast in terms of penalizing certain loudspeakers under certain conditions deemed undesirable. The end result is that these loudspeakers are activated less in the spatial rendering of the set of audio signals. In many of these cases, one might contemplate simply turning down the undesirable loudspeakers independently of any modification to the spatial rendering, but such a strategy may significantly degrade the overall balance of the audio content. Certain components of the mix may become completely inaudible, for example. With the disclosed embodiments, on the other hand, integration of these penalizations into the core optimization of the rendering allows the rendering to adapt and perform the best possible spatial rendering with the remaining less-penalized speakers.

This is a much more elegant, adaptable, and effective solution.

Example use cases include, but are not limited to:

- Providing a more balanced spatial presentation around the listening area
  - It has been found that spatial audio is best presented across loudspeakers that are roughly the same distance from the intended listening area. A cost may be constructed such that loudspeakers that are significantly closer or further away than the mean distance of loudspeakers to the listening area are penalized, thus reducing their activation;
- Moving audio away from or towards a listener or talker
  - If a user of the system is attempting to speak to a smart voice assistant of or associated with the system, it may be beneficial to create a cost which penalizes loudspeakers closer to the talker. This way, these loudspeakers are activated less, allowing their associated microphones to better hear the talker;
  - To provide a more intimate experience for a single listener that minimizes playback levels for others in the listening space, speakers far from the listener's location may be penalized heavily so that only speakers closest to the listener are activated most significantly;
- Moving audio away from or towards a landmark, zone or area
  - Certain locations in the vicinity of the listening space may be considered sensitive, such as a baby's room, a baby's bed, an office, a reading area, a study area, etc. In such a case, a cost may be constructed the penalizes the use of speakers close to this location, zone or area;
  - Alternatively, for the same case above (or similar cases), the system of speakers may have generated measurements of acoustic transmission from each speaker into the baby's room, particularly if one of the speakers (with an attached or associated microphone) resides within the baby's room itself. In this case, rather than using physical proximity of the speakers to the baby's room, a cost may be constructed that penalizes the use of speakers whose measured acoustic transmission into the room is high; and/or Optimal use of the speakers' capabilities The capabilities of different loudspeakers can vary significantly. For example, one popular smart speaker contains only a single 1.6" full range driver with limited low frequency capability. On the other hand, another smart speaker contains a much more capable 3" woofer. These capabilities are generally reflected in the frequency response of a speaker, and as such, the set of responses associated with the speakers may be utilized in a cost term. At a particular frequency, speakers that are less capable relative to the others, as measured by their frequency response, are penalized and therefore activated to a lesser degree. In some implementations, such frequency response values may be stored with a smart loudspeaker and then reported to the computational unit responsible for optimizing the flexible rendering;

Many speakers contain more than one driver, each responsible for playing a different frequency range. For example, one popular smart speaker is a two-way design containing a woofer for lower frequencies and a tweeter for higher frequencies. Typically, such a speaker contains a crossover circuit to divide the full-range playback audio signal into the appropriate frequency ranges and send to the respective drivers. Alternatively, such a speaker may provide the flexible renderer playback access to each individual driver as well as information about the capabilities of each individual driver, such as frequency response. By applying a cost term such as that described just above, in some examples the flexible renderer may automatically build a crossover between the two drivers based on their relative capabilities at different frequencies;

The above-described example uses of frequency response focus on the inherent capabilities of the speakers but may not accurately reflect the capability of the speakers as placed in the listening environment. In certain cases, the frequencies responses of the speakers as measured in the intended listening position may be available through some calibration procedure. Such measurements may be used instead of precomputed responses to better optimize use of the speakers. For example, a certain speaker may be inherently very capable at a particular frequency, but because of its placement (behind a wall or a piece of furniture for example) might produce a very limited response at the intended listening position. A measurement that captures this response and is fed into an appropriate cost term can prevent significant activation of such a speaker;

Frequency response is only one aspect of a loudspeaker's playback capabilities. Many smaller loudspeakers start to distort and then hit their excursion limit as playback level increases, particularly for lower frequencies. To reduce such distortion many loudspeakers implement dynamics processing which constrains the playback level below some limit thresholds that may be variable across frequency. In cases where a speaker is near or at these thresholds, while others participating in flexible rendering are not, it makes sense to reduce signal level in the limiting speaker and divert this energy to other less taxed speakers. Such behavior can be automatically achieved in accordance with some embodiments by properly configuring an associated cost term. Such a cost term may involve one or more of the following:

Monitoring a global playback volume in relation to the limit thresholds of the loudspeakers. For example, a loudspeaker for which the volume level is closer to its limit threshold may be penalized more;

Monitoring dynamic signals levels, possibly varying across frequency, in relationship to loudspeaker limit thresholds, also possibly varying across frequency. For example, a loudspeaker for which the monitored signal level is closer to its limit thresholds may be penalized more;

Monitoring parameters of the loudspeakers' dynamics processing directly, such as limiting gains. In some such examples, a loudspeaker for which the parameters indicate more limiting may be penalized more; and/or Monitoring the actual instantaneous voltage, current, and power being delivered by an amplifier to a loudspeaker to determine if the loudspeaker is operating in a linear range. For example, a loudspeaker which is operating less linearly may be penalized more;

Smart speakers with integrated microphones and an interactive voice assistant typically employ some type of echo cancellation to reduce the level of audio signal playing out of the speaker as picked up by the recording microphone. The greater this reduction, the better chance the speaker has of hearing and understanding a talker in the space. If the residual of the echo canceller is consistently high, this may be an indication that the speaker is being driven into a non-linear region where prediction of the echo path becomes challenging. In such a case it may make sense to divert signal energy away from the speaker, and as such, a cost term taking into account echo canceller performance may be beneficial. Such a cost term may assign a high cost to a speaker for which its associated echo canceller is performing poorly;

In order to achieve predictable imaging when rendering spatial audio over multiple loudspeakers, it is generally required that playback over the set of loudspeakers be reasonably synchronized across time. For wired loudspeakers this is a given, but with a multitude of wireless loudspeakers synchronization may be challenging and the end-result variable. In such a case it may be possible for each loudspeaker to report its relative degree of synchronization with a target, and this degree may then feed into a synchronization cost term.

In some such examples, loudspeakers with a lower degree of synchronization may be penalized more and therefore excluded from rendering. Additionally, tight synchronization may not be required for certain types of audio signals, for example components of the audio mix intended to be diffuse or non-directional. In some implementations, components may be tagged as such with metadata and a synchronization cost term may be modified such that the penalization is reduced.

We next describe examples of embodiments.

Similar to the proximity cost defined in Equations 9a and 9b, it is also convenient to express each of the new cost function terms $C_j$ $(g,\{\{\hat{o}\},\{\hat{s}_i\},\{\hat{e}\}\}_j)$ as a weighted sum of the absolute values squared of speaker activations:

$$C_j(g, \{\{\hat{o}\}, \{\hat{s}_i\}, \{\hat{e}\}\}_j) = g * W_j(\{\{\hat{o}\}, \{\hat{s}_i\}, \{\hat{e}\}\}_j)g, \tag{13a}$$

where $W_j$ represents a diagonal matrix of weights $w_{ij}=w_{ij}$ $(\{\{\hat{o}\},\{\hat{s}_i\},\{\hat{e}\}\}_j)$ describing the cost associated with activating speaker i for the term j:

$$w_j = \begin{bmatrix} w_{1j} & \dots & 0 \\ \vdots & \ddots & \vdots \\ 0 & \dots & w_{Mj} \end{bmatrix} \tag{13b}$$

Combining Equations 13a and b with the matrix quadratic version of the CMAP and FV cost functions given in Equation 10 yields a potentially beneficial implementation of the general expanded cost function (of some embodiments) given in Equation 12:

$$C(g) = g*Ag + Bg + C + g*Dg + \sum_j g*W_jg = g*\left(A + D + \sum_j W_j\right)g + Bg + C \tag{14}$$

With this definition of the new cost function terms, the overall cost function remains a matrix quadratic, and the optimal set of activations $g_{opt}$ can be found through differentiation of Equation 14 to yield $$g_{opt} = \frac{1}{2}\left(A + D + \sum_j W_j\right)^{-1} B \tag{15}$$

It is useful to consider each one of the weight terms $w_{ij}$ as functions of a given continuous penalty value $p_{ij}=p_{ij}$ $(\{\{\hat{o}\},\{\hat{s}_i\},\{\hat{e}\}\}_j)$ for each one of the loudspeakers. In one example embodiment, this penalty value is the distance from the object (to be rendered) to the loudspeaker considered. In another example embodiment, this penalty value represents the inability of the given loudspeaker to reproduce some frequencies. Based on this penalty value, the weight terms $w_{ij}$ can be parametrized as:

$$w_{ij} = \alpha_j f_j\left(\frac{p_{ij}}{\tau_j}\right) \tag{16}$$

where $\alpha_j$ represents a pre-factor (which takes into account the global intensity of the weight term), where $\tau_j$ represents a penalty threshold (around or beyond which the weight term becomes significant), and where $f_j(x)$ represents a monotonically increasing function. For example, with $f_j(x)=x^{\beta_j}$ the weight term has the form:

$$w_{ij} = \alpha_j\left(\frac{p_{ij}}{\tau_j}\right)^{\beta_j} \tag{17}$$

where $\alpha_j$, $\beta_j$, $\beta_j$ are tunable parameters which respectively indicate the global strength of the penalty, the abruptness of the onset of the penalty and the extent of the penalty. Care should be taken in setting these tunable values so that the relative effect of the cost term $C_j$ with respect any other additional cost terms as well as $C_{spatial}$ and $C_{proximity}$ is appropriate for achieving the desired outcome. For example, as a rule of thumb, if one desires a particular penalty to clearly dominate the others then setting its intensity $\alpha_j$ roughly ten times larger than the next largest penalty intensity may be appropriate.

In case all loudspeakers are penalized, it is often convenient to subtract the minimum penalty from all weight terms in post-processing so that at least one of the speakers is not penalized:

$$w_{ij} \rightarrow w'_{ij} = w_{ij} - \min_i(w_{ij}) \tag{18}$$

As stated above, there are many possible use cases that can be realized using the new cost function terms described herein (and similar new cost function terms employed in accordance with other embodiments). Next, we describe more concrete details with three examples: moving audio towards a listener or talker, moving audio away from a listener or talker, and moving audio away from a landmark.

In the first example, what will be referred to herein as an "attracting force" is used to pull audio towards a position, which in some examples may be the position of a listener or a talker a landmark position, a furniture position, etc. The position may be referred to herein as an "attracting force position" or an "attractor location." As used herein an "attracting force" is a factor that favors relatively higher loudspeaker activation in closer proximity to an attracting force position. According to this example, the weight $w_{ij}$ takes the form of equation 17 with the continuous penalty value $p_{ij}$ given by the distance of the ith speaker from a fixed attractor location $\vec{l}_j$ and the threshold value $\tau_j$ given by the maximum of these distances across all speakers:

$$p_{ij} = \left\|\vec{l}_j - \vec{s}_i\right\|, \text{ and} \tag{19a}$$

$$\tau_j = \max_i\left\|\vec{l}_j - \vec{s}_i\right\| \tag{19b}$$

To illustrate the use case of "pulling" audio towards a listener or talker, we specifically set $\alpha_j=20$, $\beta_j=3$, and $\vec{l}_j$ to a vector corresponding to a listener/talker position of 180 degrees. These values of $\alpha_j$, $\beta_j$, and $\vec{l}_j$ are merely examples. In other implementations, $\alpha_j$ may be in the range of 1 to 100 and $\beta_j$ may be in the range of 1 to 25.

Figure 2F:
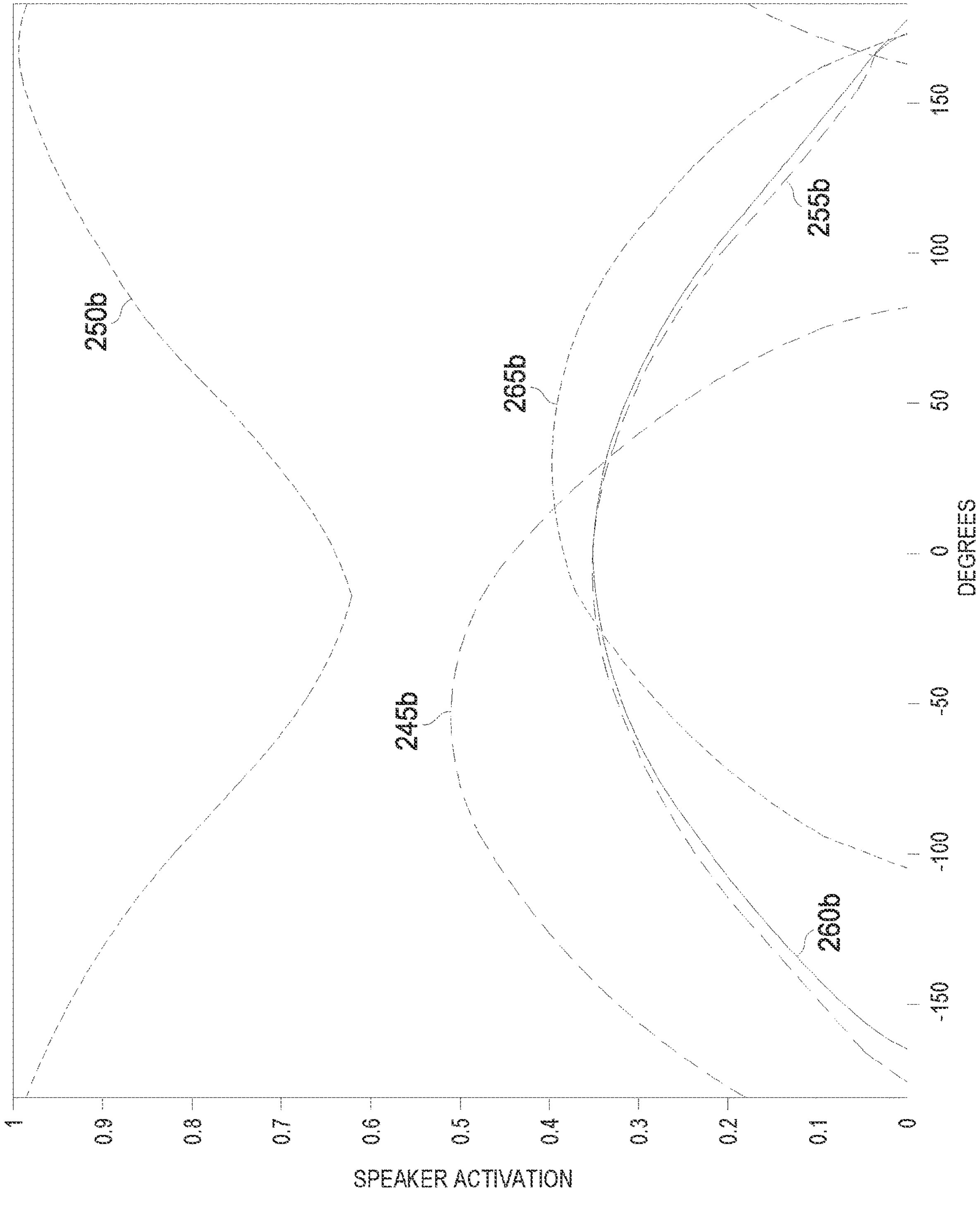
FIG. 2F is a graph of speaker activations in an example embodiment.
Figure 2G:
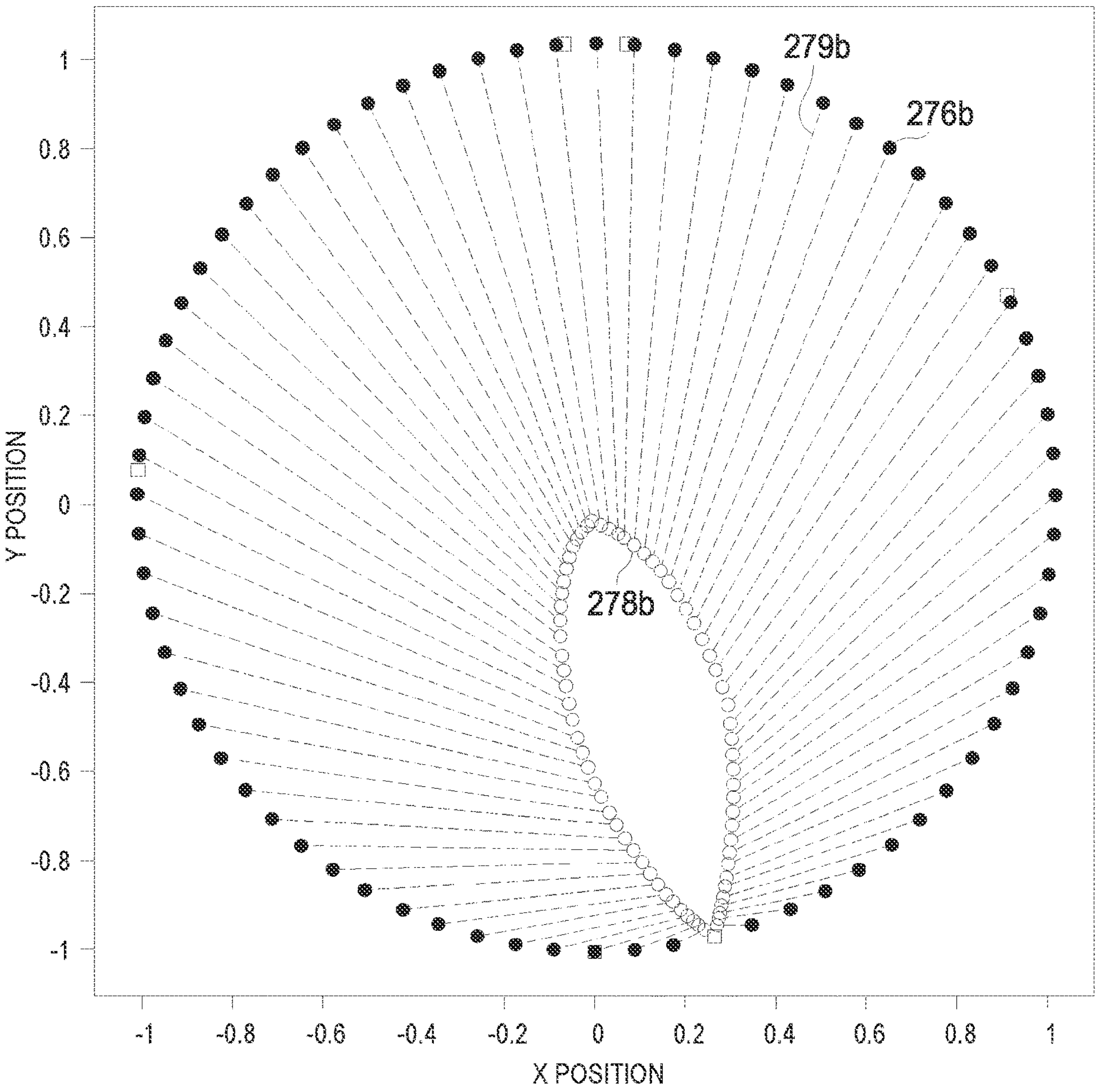
FIG. 2G is a graph of object rendering positions in an example embodiment.

FIG. 2F is a graph of speaker activations in an example embodiment. In this example, FIG. 2F shows the speaker activations 245*b*, 250*b*, 255*b*, 260*b* and 265*b*, which comprise the optimal solution to the cost function for the same speaker positions from FIGS. 1 and 2 with the addition of the attracting force represented by $w_{ij}$. FIG. 2G is a graph of object rendering positions in an example embodiment. In this example, FIG. 2G shows the corresponding ideal object positions 276*b* for a multitude of possible object angles and the corresponding actual rendering positions 278*b* for those objects, connected to the ideal object positions 276*b* by dotted lines 279*b*. The skewed orientation of the actual rendering positions 278*b* towards the fixed position $\vec{l}_j$ illustrates the impact of the attractor weightings on the optimal solution to the cost function.

In the second and third examples, a "repelling force" is used to "push" audio away from a position, which may be a listener position, a talker position or another position, such as a landmark position, a furniture position, etc. In some examples, a repelling force may be used to push audio away from an area or zone of a listening environment, such as an office area, a reading area, a bed or bedroom area (e.g., a baby's bed or bedroom), etc. According to some such examples, a particular position may be used as representative of a zone or area. For example, a position that represents a baby's bed may be an estimated position of the baby's head, an estimated sound source location corresponding to the baby, etc. The position may be referred to herein as a "repelling force position" or a "repelling location." As used herein an "repelling force" is a factor that favors relatively lower loudspeaker activation in closer proximity to the repelling force position. According to this example, we define $p_{ij}$ and $\tau_j$ with respect to a fixed repelling location $\vec{l}_j$ similarly to the attracting force in Equation 19:

$$p_{ij} = \max_i \left\| \vec{l}_j - \vec{s}_i \right\| - \left\| \vec{l}_j - \vec{s}_i \right\|, \text{ and} \tag{19c}$$

$$\tau_j = \max_i \left\| \vec{l}_j - \vec{s}_i \right\| \tag{19d}$$

Figure 2H:
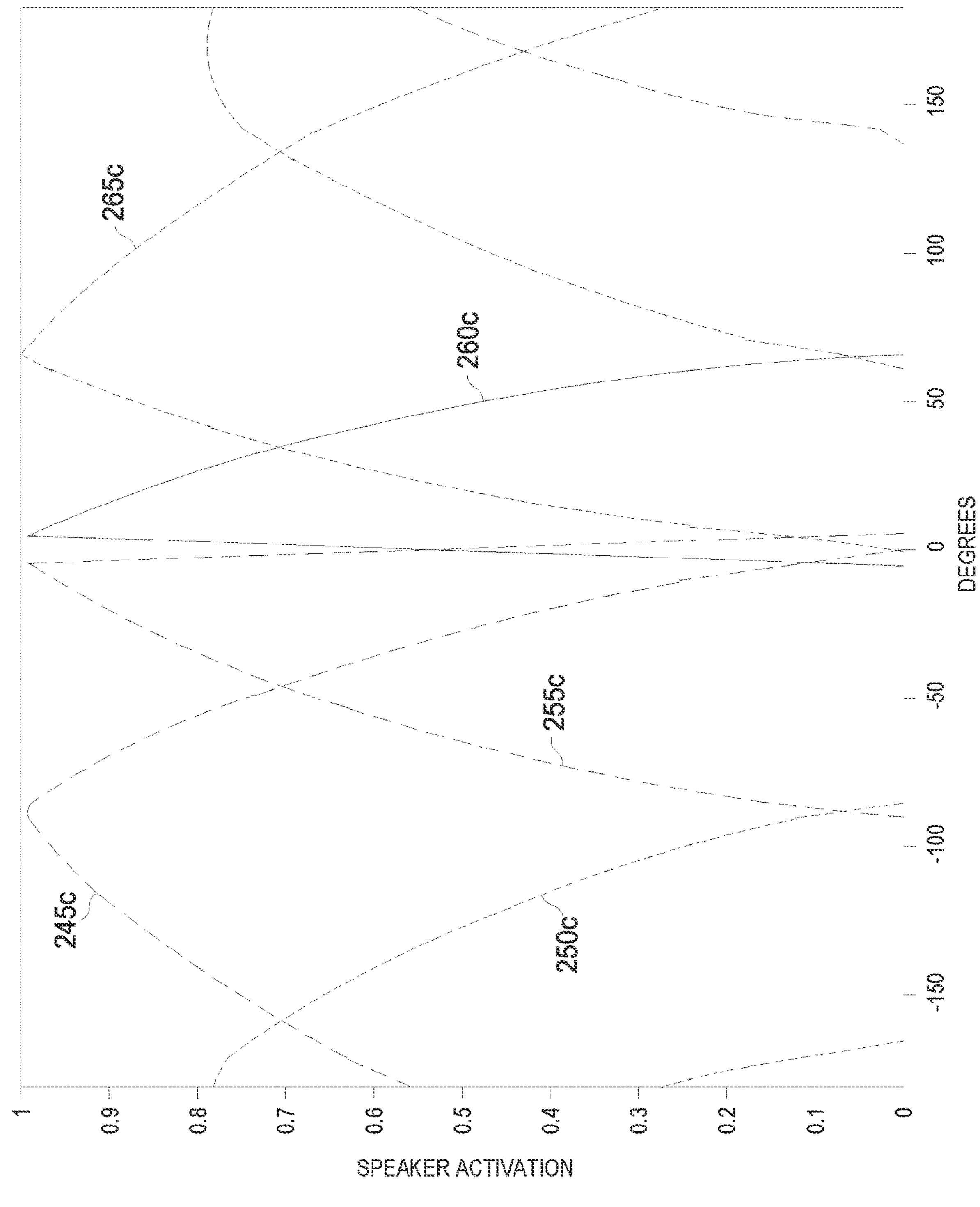
FIG. 2H is a graph of speaker activations in an example embodiment.
Figure 2I:
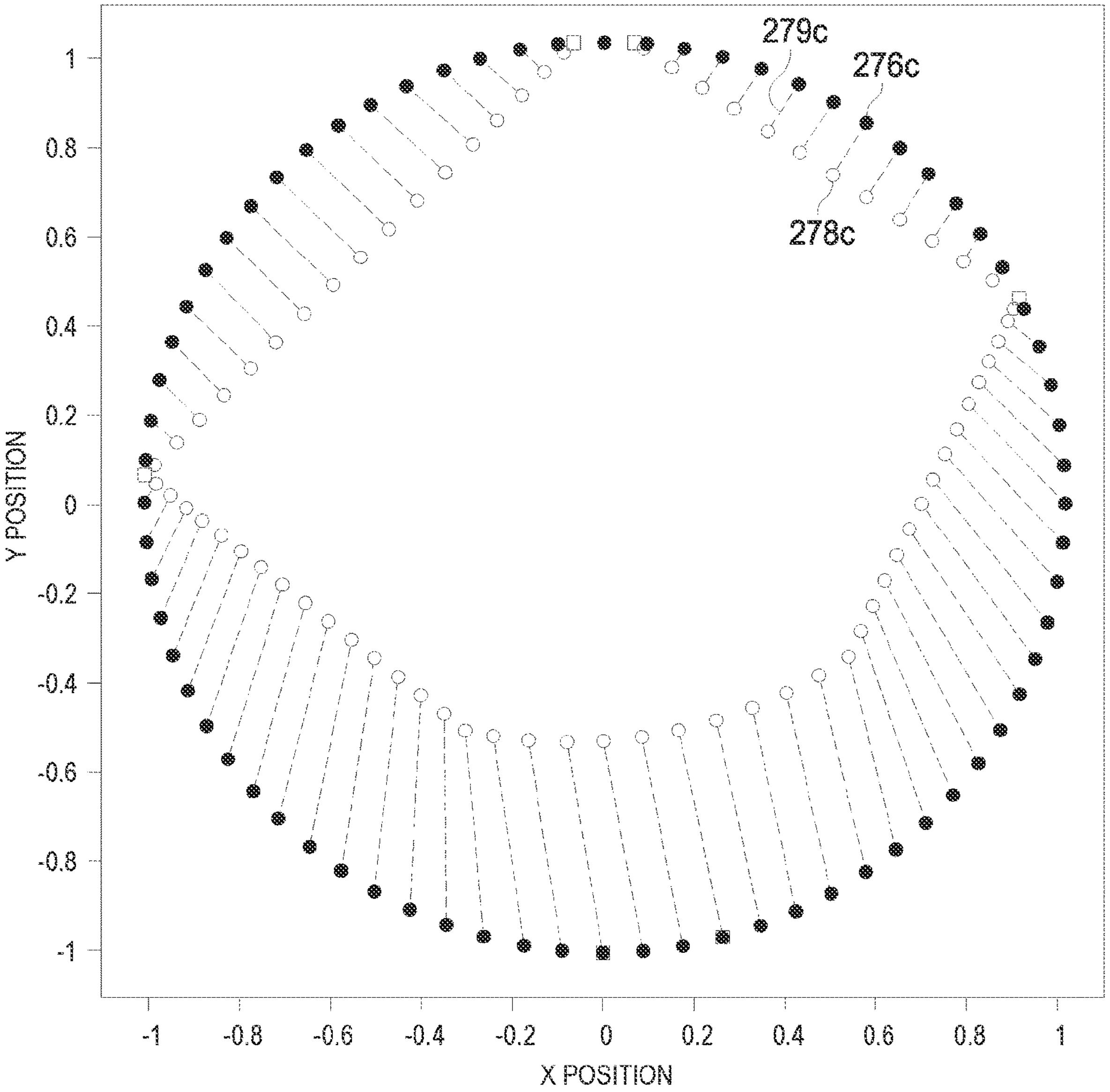
FIG. 2I is a graph of object rendering positions in an example embodiment.

To illustrate the use case of pushing audio away from a listener or talker, we specifically set $\alpha_j=5$, $\beta_j=2$, and $\vec{l}_j$ to a vector corresponding to a listener/talker position of 180 degrees. These values of $\alpha_j$, $\beta_j$, and $\vec{l}_j$ are merely examples. As noted above, in some examples $\alpha_j$ may be in the range of 1 to 100 and $\beta_j$ may be in the range of 1 to 25. FIG. 2H is a graph of speaker activations in an example embodiment. According to this example, FIG. 2H shows the speaker activations 245*c*, 250*c*, 255*c*, 260*c* and 265*c*, which comprise the optimal solution to the cost function for the same speaker positions as previous figures, with the addition of the repelling force represented by $w_{ij}$. FIG. 2I is a graph of object rendering positions in an example embodiment. In this example, FIG. 2I shows the ideal object positions 276*c* for a multitude of possible object angles and the corresponding actual rendering positions 278*c* for those objects, connected to the ideal object positions 276*c* by dotted lines 279*c*. The skewed orientation of the actual rendering positions 278*c* away from the fixed position $\vec{l}_j$ illustrates the impact of the repeller weightings on the optimal solution to the cost function.

Figure 2J:
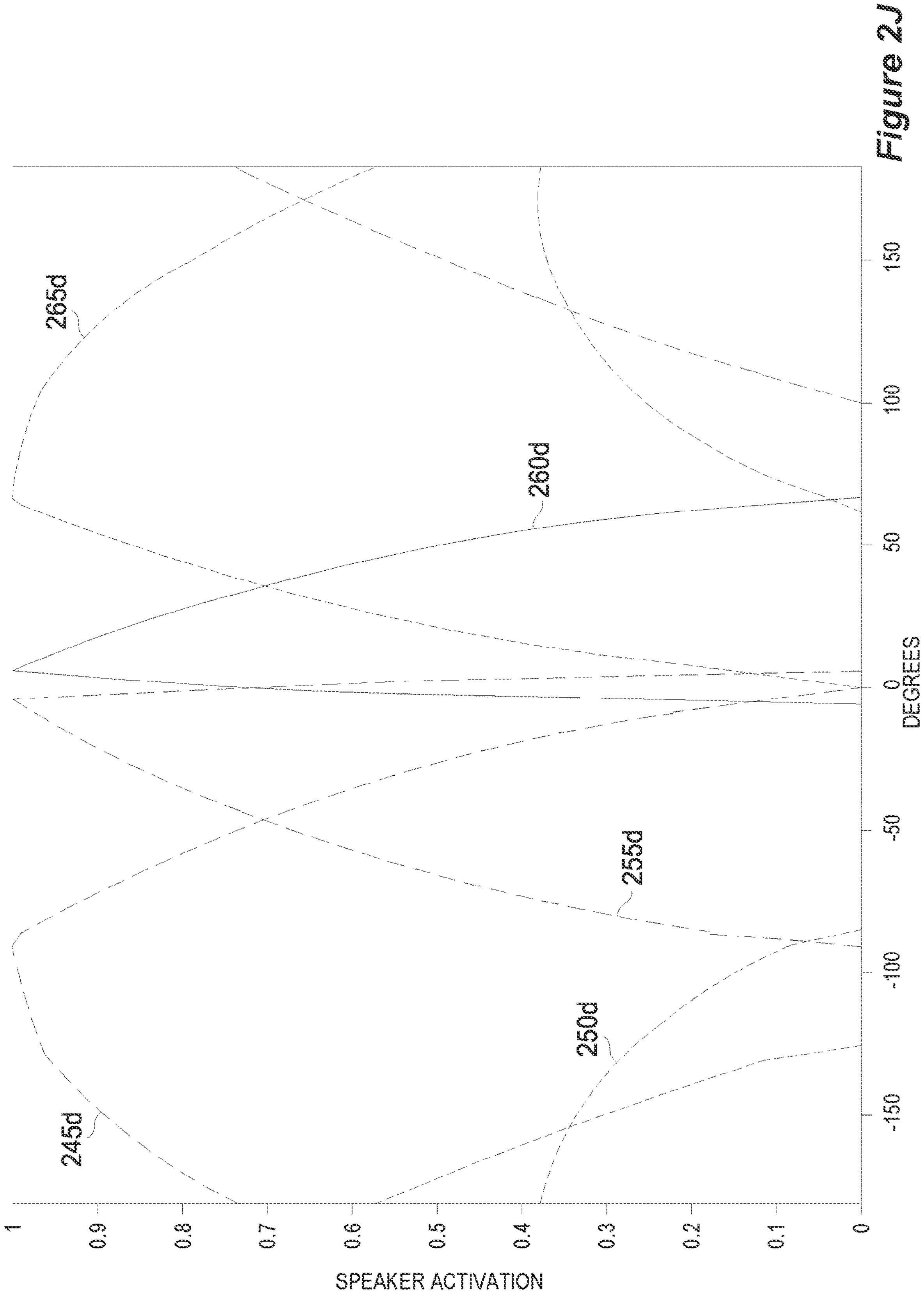
FIG. 2J is a graph of speaker activations in an example embodiment.
Figure 2K:
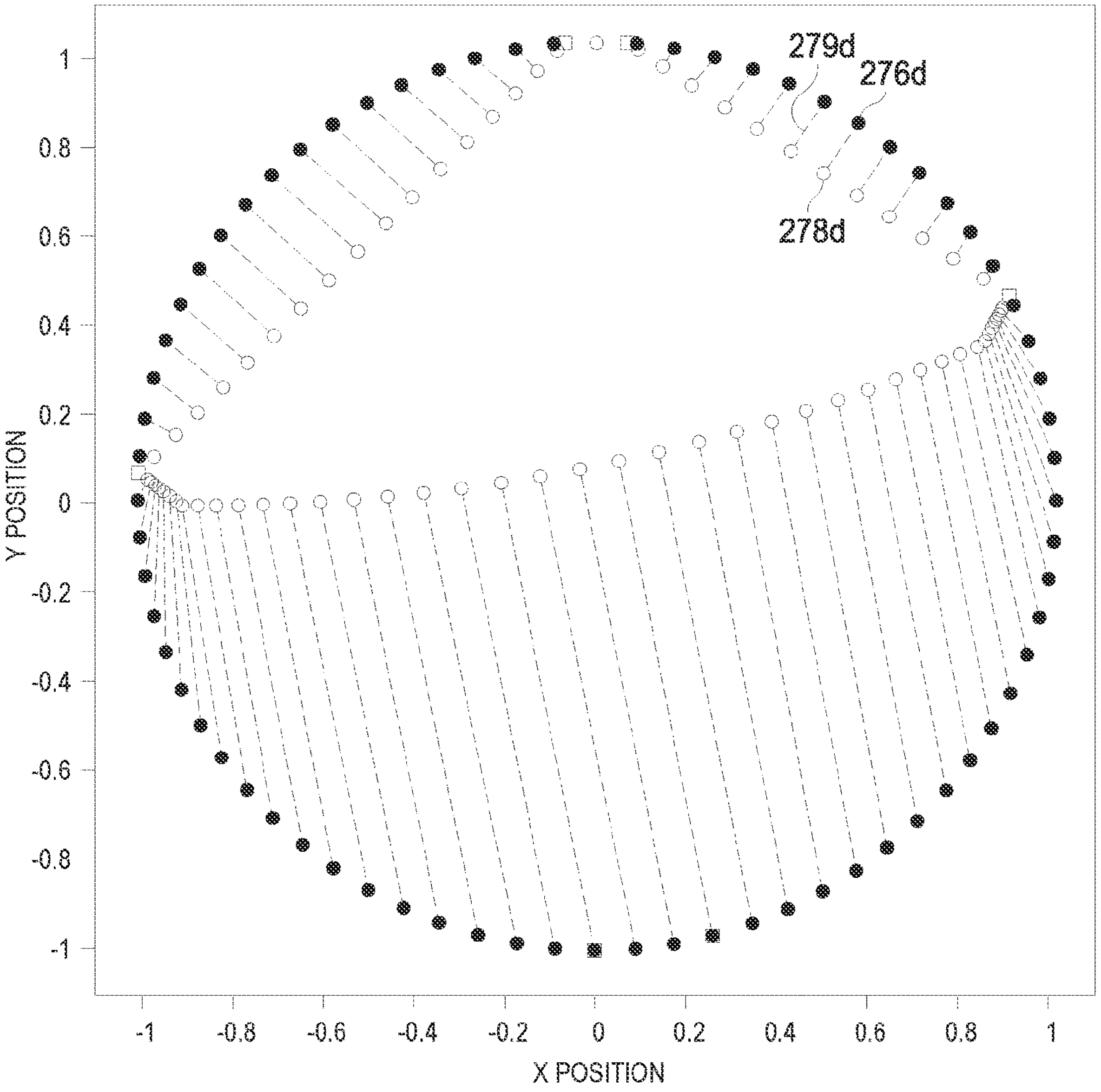
FIG. 2K is a graph of object rendering positions in an example embodiment.

The third example use case is "pushing" audio away from a landmark which is acoustically sensitive, such as a door to a sleeping baby's room. Similarly to the last example, we set $\vec{l}_j$ to a vector corresponding to a door position of 180 degrees (bottom, center of the plot). To achieve a stronger repelling force and skew the soundfield entirely into the front part of the primary listening space, we set $\alpha_j=20$, $\beta_j=5$. FIG. 2J is a graph of speaker activations in an example embodiment. Again, in this example FIG. 2J shows the speaker activations 245*d*, 250*d*, 255*d*, 260*d* and 265*d*, which comprise the optimal solution to the same set of speaker positions with the addition of the stronger repelling force. FIG. 2K is a graph of object rendering positions in an example embodiment. And again, in this example FIG. 2K shows the ideal object positions 276*d* for a multitude of possible object angles and the corresponding actual rendering positions 278*d* for those objects, connected to the ideal object positions 276*d* by dotted lines 279*d*. The skewed orientation of the actual rendering positions 278*d* illustrates the impact of the stronger repeller weightings on the optimal solution to the cost function.

Returning now to FIG. 2B, in this example block 225 involves modifying a rendering process for the first audio signals based at least in part on at least one of the second audio signals, the second rendered audio signals or characteristics thereof, to produce modified first rendered audio signals. Various examples of modifying a rendering process are disclosed herein. "Characteristics" of a rendered signal may, for example, include estimated or measured loudness or audibility at an intended listening position, either in silence or in the presence of one or more additional rendered signals. Other examples of characteristics include parameters associated with the rendering of said signals such as the intended spatial positions of the constituent signals of the associated program stream, the location of loudspeakers over which the signals are rendered, the relative activation of loudspeakers as a function of intended spatial position of the constituent signals, and any other parameters or state associated with the rendering algorithm utilized to generate said rendered signals. In some examples, block 225 may be performed by the first rendering module.

According to this example, block 230 involves modifying a rendering process for the second audio signals based at least in part on at least one of the first audio signals, the first rendered audio signals or characteristics thereof, to produce modified second rendered audio signals. In some examples, block 230 may be performed by the second rendering module.

In some implementations, modifying the rendering process for the first audio signals may involve warping the rendering of first audio signals away from a rendering location of the second rendered audio signals and/or modifying the loudness of one or more of the first rendered audio signals in response to a loudness of one or more of the second audio signals or the second rendered audio signals. Alternatively, or additionally, modifying the rendering process for the second audio signals may involve warping the rendering of second audio signals away from a rendering location of the first rendered audio signals and/or modifying the loudness of one or more of the second rendered audio signals in response to a loudness of one or more of the first audio signals or the first rendered audio signals. Some examples are provided below with reference to FIG. 3 et seq.

However, other types of rendering process modifications are within the scope of the present disclosure. For example, in some instances modifying the rendering process for the first audio signals or the second audio signals may involve performing spectral modification, audibility-based modification or dynamic range modification. These modifications may or may not be related to a loudness-based rendering modification, depending on the particular example. For example, in the aforementioned case of a primary spatial stream being rendered in an open plan living area and a secondary stream comprised of cooking tips being rendered in an adjacent kitchen, it may be desirable to ensure the cooking tips remain audible in the kitchen. This can be accomplished by estimating what the loudness would be for the rendered cooking tips stream in the kitchen without the interfering first signal, then estimating the loudness in the presence of the first signal in the kitchen, and finally dynamically modifying the loudness and dynamic range of both streams across a plurality of frequencies, to ensure audibility of the second signal, in the kitchen.

In the example shown in FIG. 2B, block 235 involves mixing at least the modified first rendered audio signals and the modified second rendered audio signals to produce mixed audio signals. Block 235 may, for example, be performed by the mixer 130*b* shown in FIG. 2A.

According to this example, block 240 involves providing the mixed audio signals to at least some speakers of the environment. Some examples of the method 200 involve playback of the mixed audio signals by the speakers.

As shown in FIG. 2B, some implementations may provide more than 2 rendering modules. Some such implementations may provide N rendering modules, where N is an integer greater than 2. Accordingly, some such implementations may include one or more additional rendering modules. In some such examples, each of the one or more additional rendering modules may be configured for receiving, via the interface system, an additional audio program stream. The additional audio program stream may include additional audio signals that are scheduled to be reproduced by at least one speaker of the environment. Some such implementations may involve rendering the additional audio signals for reproduction via at least one speaker of the environment, to produce additional rendered audio signals and modifying a rendering process for the additional audio signals based at least in part on at least one of the first audio signals, the first rendered audio signals, the second audio signals, the second rendered audio signals or characteristics thereof, to produce modified additional rendered audio signals. According to some such examples, the mixing module may be configured for mixing the modified additional rendered audio signals with at least the modified first rendered audio signals and the modified second rendered audio signals, to produce the mixed audio signals.

As described above with reference to FIGS. 1A and 2A, some implementations may include a microphone system that includes one or more microphones in a listening environment. In some such examples, the first rendering module may be configured for modifying a rendering process for the first audio signals based, at least in part, on first microphone signals from the microphone system. The "first microphone signals" may be received from a single microphone or from 2 or more microphones, depending on the particular implementation. In some such implementations, the second rendering module may be configured for modifying a rendering process for the second audio signals based, at least in part, on the first microphone signals.

As noted above with reference to FIG. 2A, in some instances the locations of one or more microphones may be known and may be provided to the control system. According to some such implementations, the control system may be configured for estimating a first sound source position based on the first microphone signals and modifying the rendering process for at least one of the first audio signals or the second audio signals based at least in part on the first sound source position. The first sound source position may, for example, be estimated according to a triangulation process, based on DOA data from each of three or more microphones, or groups of microphones, having known locations. Alternatively, or additionally, the first sound source position may be estimated according to the amplitude of a received signal from two or more microphones. The microphone that produces the highest-amplitude signal may be assumed to be the nearest to the first sound source position. In some such examples, the first sound source position may be set to the location of the nearest microphone. In some such examples, the first sound source position may be associated with the position of a zone, where a zone is selected by processing signals from two or more microphones through a pre-trained classifier, such as a Gaussian mixer model.

In some such implementations, the control system may be configured for determining whether the first microphone signals correspond to environmental noise. Some such implementations may involve modifying the rendering process for at least one of the first audio signals or the second audio signals based, at least in part, on whether the first microphone signals correspond to environmental noise. For example, if the control system determines that the first microphone signals correspond to environmental noise, modifying the rendering process for the first audio signals or the second audio signals may involve increasing the level of the rendered audio signals so that the perceived loudness of the signals in the presence of the noise at an intended listening position is substantially equal to the perceived loudness of the signals in the absence of the noise.

In some examples, the control system may be configured for determining whether the first microphone signals correspond to a human voice. Some such implementations may involve modifying the rendering process for at least one of the first audio signals or the second audio signals based, at least in part, on whether the first microphone signals correspond to a human voice. For example, if the control system determines that the first microphone signals correspond to a human voice, such as a wakeword, modifying the rendering process for the first audio signals or the second audio signals may involve decreasing the loudness of the rendered audio signals reproduced by speakers near the first sound source position, as compared to the loudness of the rendered audio signals reproduced by speakers farther from the first sound source position. Modifying the rendering process for the first audio signals or the seconds audio signals may alternatively or in addition involve modifying the rendering process to warp the intended positions of the associated program stream's constituent signals away from the first sound source position and/or to penalize the use of speakers near the first sound source position in comparison to speakers farther from the first sound source position.

In some implementations, if the control system determines that the first microphone signals correspond to a human voice, the control system may be configured for reproducing the first microphone signals in one or more speakers near a location of the environment that is different from the first sound source position. In some such examples, the control system may be configured for determining whether the first microphone signals correspond to a child's cry. According to some such implementations, the control system may be configured for reproducing the first microphone signals in one or more speakers near a location of the environment that corresponds to an estimated location of a caregiver, such as a parent, a relative, a guardian, a child care service provider, a teacher, a nurse, etc. In some examples, the process of estimating the caregiver's estimated location may be triggered by a voice command, such as "<wakeword>, don't wake the baby". The control system would be able to estimate the location of the speaker (caregiver) according to the location of the nearest smart audio device that is implementing a virtual assistant, by triangulation based on DOA information provided by three or more local microphones, etc. According to some implementations, the control system would have a priori knowledge of the baby room location (and/or listening devices therein) would then be able to perform the appropriate processing.

According to some such examples, the control system may be configured for determining whether the first microphone signals correspond to a command. If the control system determines that the first microphone signals correspond to a command, in some instances the control system may be configured for determining a reply to the command and controlling at least one speaker near the first sound source location to reproduce the reply. In some such examples, the control system may be configured for reverting to an unmodified rendering process for the first audio signals or the second audio signals after controlling at least one speaker near the first sound source location to reproduce the reply.

In some implementations, the control system may be configured for executing the command. For example, the control system may be, or may include, a virtual assistant that is configured to control an audio device, a television, a home appliance, etc., according to the command.

With this definition of the minimal and more capable multi-stream rendering systems shown in FIGS. 1A, 1B and 2A, dynamic management of the simultaneous playback of multiple program streams may be achieved for numerous useful scenarios. Several examples will now be described with reference to FIGS. 3A and 3B.

Figure 3A:
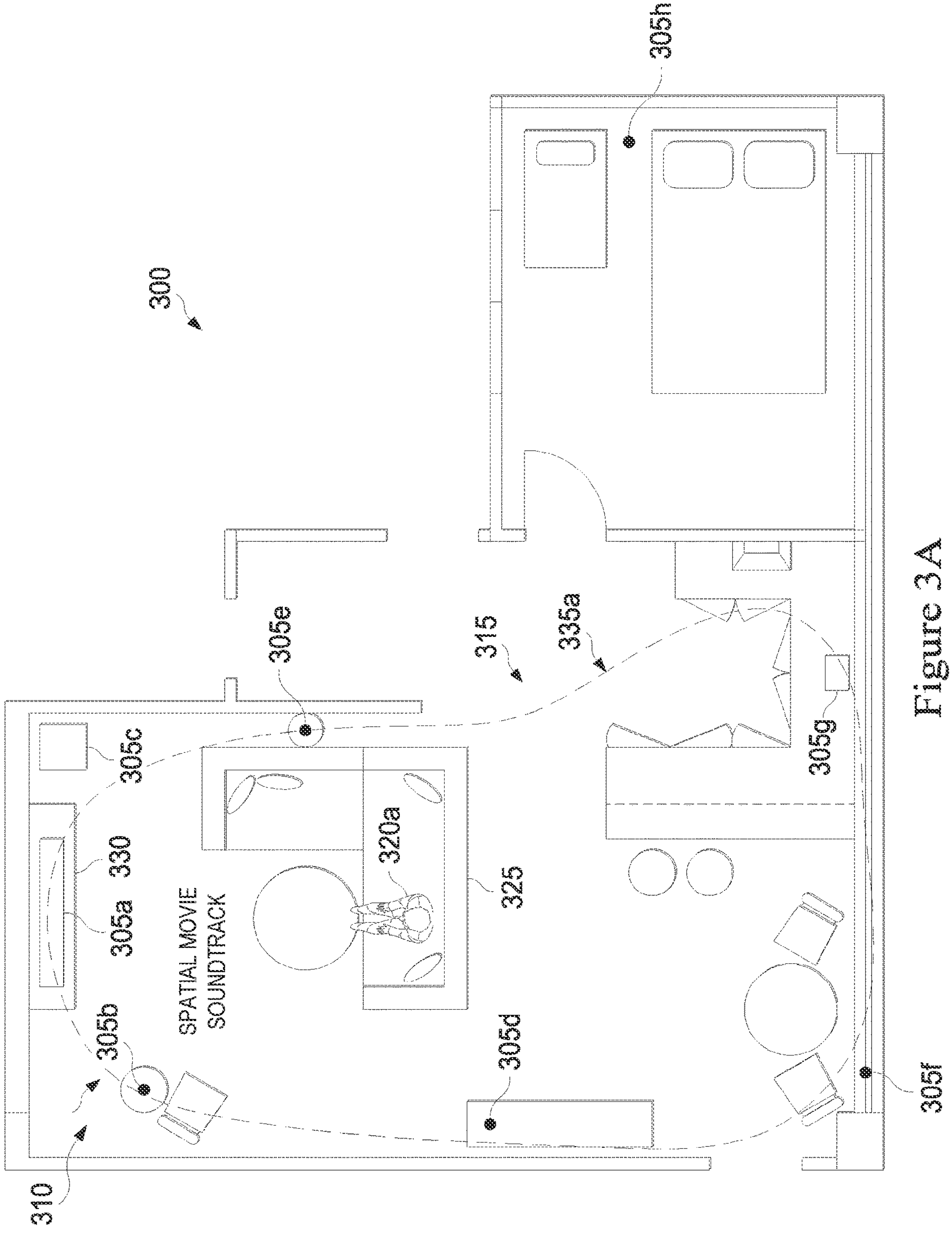
FIGS. 3A and 3B show an example of a floor plan of a connected living space.
Figure 3B:
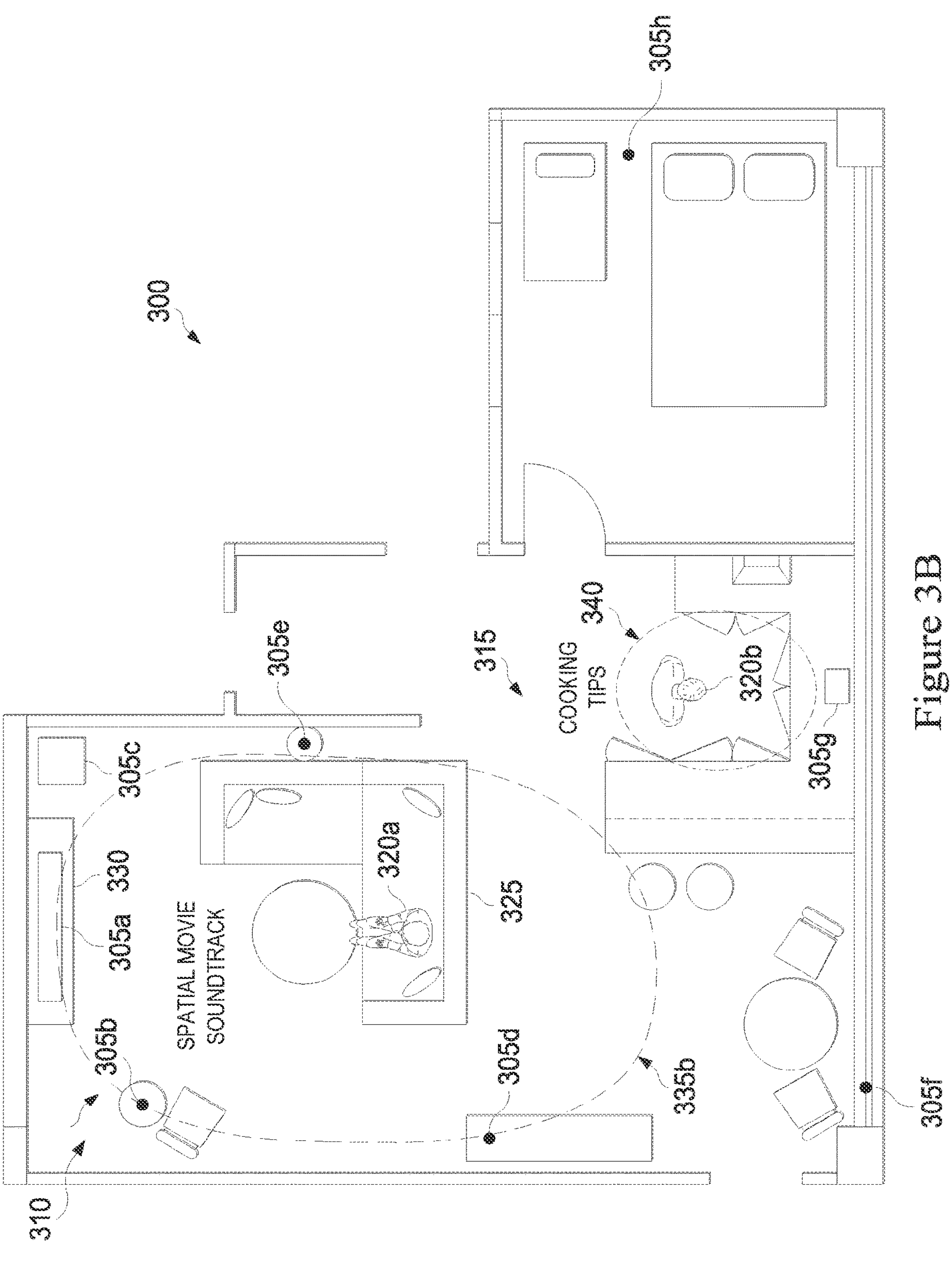

We first examine the previously-discussed example involving the simultaneous playback of a spatial movie sound track in a living room and cooking tips in a connected kitchen. The spatial movie sound track is an example of the "first audio program stream" referenced above and the cooking tips audio is an example of the "second audio program stream" referenced above. FIGS. 3A and 3B show an example of a floor plan of a connected living space. In this example, the living space 300 includes a living room at the upper left, a kitchen at the lower center, and a bedroom at the lower right. Boxes and circles 305*a*-305*h* distributed across the living space represent a set of 8 loudspeakers placed in locations convenient to the space, but not adhering to any standard prescribed layout (arbitrarily placed). In FIG. 3A, only the spatial movie soundtrack is being played back, and all the loudspeakers in the living room 310 and kitchen 315 are utilized to create an optimized spatial reproduction around the listener 320*a* seated on the couch 325 facing the television 330, given the loudspeaker capabilities and layout. This optimal reproduction of the movie soundtrack is represented visually by the cloud 335*a* lying within the bounds of the active loudspeakers.

In FIG. 3B, cooking tips are simultaneously rendered and played back over a single loudspeaker 305*g* in the kitchen 315 for a second listener 320*b*. The reproduction of this second program stream is represented visually by the cloud 340 emanating from the loudspeaker 305*g*. If these cooking tips were simultaneously played back without modification to the rendering of the movie soundtrack as depicted in FIG. 3A, then audio from the movie soundtrack emanating from speakers in or near the kitchen 315 would interfere with the second listener's ability to understand the cooking tips. Instead, in this example, rendering of the spatial movie soundtrack is dynamically modified as a function of the rendering of the cooking tips. Specifically, the rendering of the movie sound track is shifted away from speakers near the rendering location of the cooking tips (the kitchen 315), with this shift represented visually by the smaller cloud 335*b* in FIG. 3B that is pushed away from speakers near the kitchen. If playback of the cooking tips stops while the movie soundtrack is still playing, then in some implementations the rendering of the movie soundtrack may dynamically shift back to its original optimal configuration seen in FIG. 3A. Such a dynamic shift in the rendering of the spatial movie soundtrack may be achieved through numerous disclosed methods.

Many spatial audio mixes include a plurality of constituent audio signals designed to be played back at a particular location in the listening space. For example, Dolby 5.1 and 7.1 surround sound mixes consist of 6 and 8 signals, respectively, meant to be played back on speakers in prescribed canonical locations around the listener. Object-based audio formats, e.g., Dolby Atmos, consist of constituent audio signals with associated metadata describing the possibly time-varying 3D position in the listening space where the audio is meant to be rendered. With the assumption that the renderer of the spatial movie soundtrack is capable of rendering an individual audio signal at any location with respect to the arbitrary set of loudspeakers, the dynamic shift to the rendering depicted in FIGS. 3A and 3B may be achieved by warping the intended positions of the audio signals within the spatial mix. For example, the 2D or 3D coordinates associated with the audio signals may be pushed away from the location of the speaker in the kitchen or alternatively pulled toward the upper left corner of the living room. The result of such warping is that speakers near the kitchen are used less since the warped positions of the spatial mix's audio signals are now more distant from this location. While this method does achieve the goal of making the second audio stream more intelligible to the second listener, it does so at the expense of significantly altering the intended spatial balance of the movie soundtrack for the first listener.

A second method for achieving the dynamic shift to the spatial rendering may be realized by using a flexible rendering system. In some such implementations, the flexible rendering system may be CMAP, FV or a hybrid of both, as described above. Some such flexible rendering systems attempt to reproduce a spatial mix with all its constituent signals perceived as coming from their intended locations. While doing so for each signal of the mix, in some examples, preference is given to the activation of loudspeakers in close proximity to the desired position of that signal. In some implementations, additional terms may be dynamically added to the optimization of the rendering, which penalize the use of certain loudspeakers based on other criteria. For the example at hand, what may be referred to as a "repelling force" may be dynamically placed at the location of the kitchen to highly penalize the use of loudspeakers near this location and effectively push the rendering of the spatial movie soundtrack away. As used herein, the term "repelling force" may refer to a factor that corresponds with relatively lower speaker activation in a particular location or area of a listening environment. In other words, the phrase "repelling force" may refer to a factor that favors the activation of speakers that are relatively farther from a particular position or area that corresponds with the "repelling force." However, according to some such implementations the renderer may still attempt to reproduce the intended spatial balance of the mix with the remaining, less penalized speakers. As such, this technique may be considered a superior method for achieving the dynamic shift of the rendering in comparison to that of simply warping the intended positions of the mix's constituent signals.

The described scenario of shifting the rendering of the spatial movie soundtrack away from the cooking tips in the kitchen may be achieved with the minimal version of the multi-stream renderer depicted in FIG. 1B. However, improvements to the scenario may be realized by employing the more capable system depicted in FIG. 2A. While shifting the rendering of the spatial movie soundtrack does improve the intelligibility of the cooking tips in the kitchen, the movie soundtrack may still be noticeably audible in the kitchen. Depending on the instantaneous conditions of both streams, the cooking tips might be masked by the movie soundtrack; for example, a loud moment in the movie soundtrack masking a soft moment in the cooking tips. To deal with this issue, a dynamic modification to the rendering of the cooking tips as a function of the rendering of the spatial movie soundtrack may be added. For example, a method for dynamically altering an audio signal across frequency and time in order to preserve its perceived loudness in the presence of an interfering signal may be performed. In this scenario, an estimate of the perceived loudness of the shifted movie soundtrack at the kitchen location may be generated and fed into such a process as the interfering signal. The time and frequency varying levels of the cooking tips may then be dynamically modified to maintain its perceived loudness above this interference, thereby better maintaining intelligibility for the second listener. The required estimate of the loudness of the movie soundtrack in the kitchen may be generated from the speaker feeds of the soundtrack's rendering, signals from microphones in or near the kitchen, or a combination thereof. This process of maintaining the perceived loudness of the cooking tips will in general boost the level of the cooking tips, and it is possible that the overall loudness may become objectionably high in some cases. To combat this issue, yet another rendering modification may be employed. The interfering spatial movie soundtrack may be dynamically turned down as a function of the loudness-modified cooking tips in the kitchen becoming too loud. Lastly, it is possible that some external noise source might simultaneously interfere with the audibility of both program streams; a blender may be used in the kitchen during cooking, for example. An estimate of the loudness of this environmental noise source in both the living room and kitchen may be generated from microphones connected to the rendering system. This estimate may, for example, be added to the estimate of the loudness of the soundtrack in the kitchen to affect the loudness modifications of the cooking tips. At the same time, the rendering of the soundtrack in the living room may be additionally modified as a function of the environmental noise estimate to maintain the perceived loudness of the soundtrack in the living room in the presence of this environmental noise, thereby better maintaining audibility for the listener in the living room.

Figure 4A:
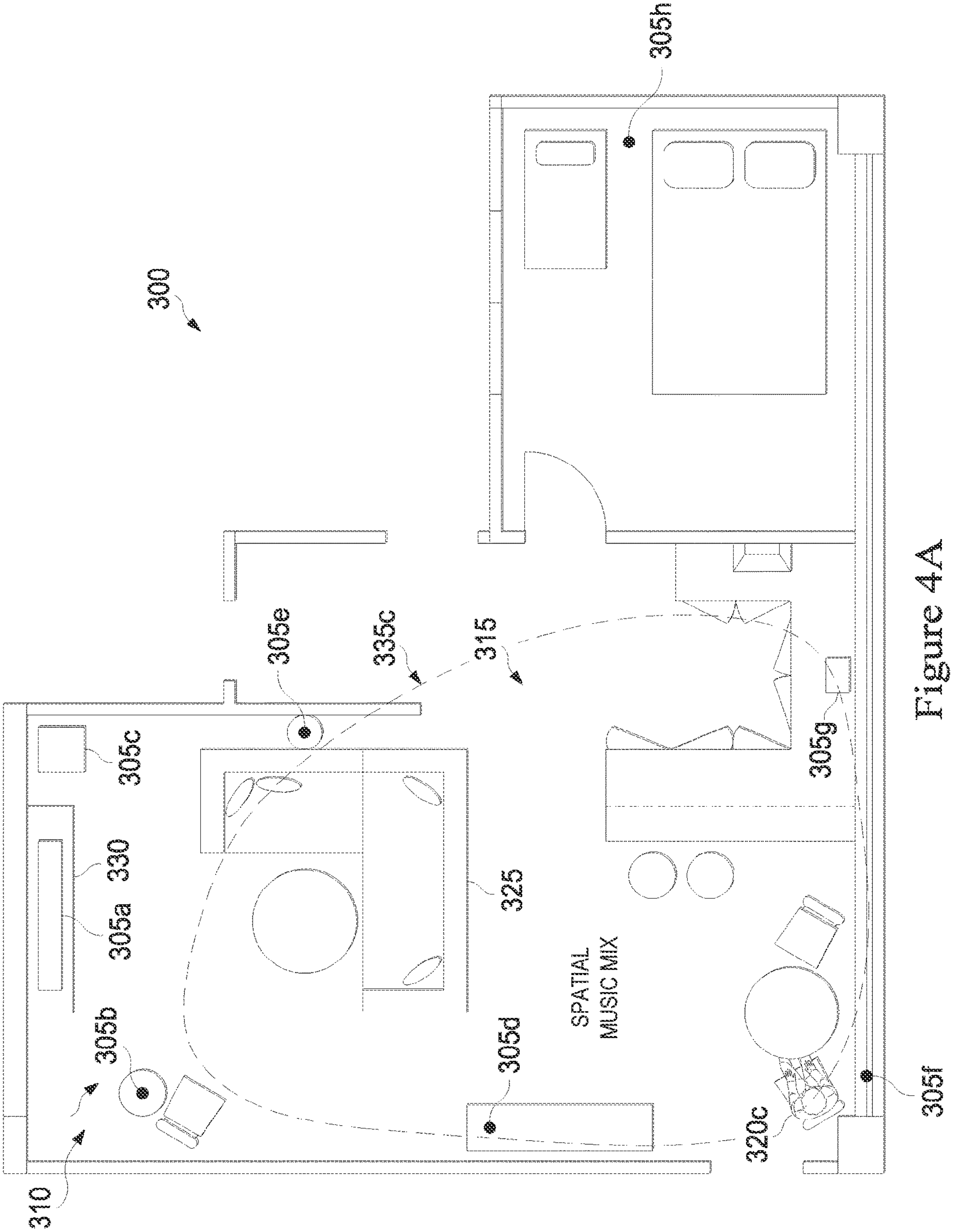
FIGS. 4A and 4B show an example of a multi-stream renderer providing simultaneous playback of a spatial music mix and a voice assistant response.
Figure 4B:
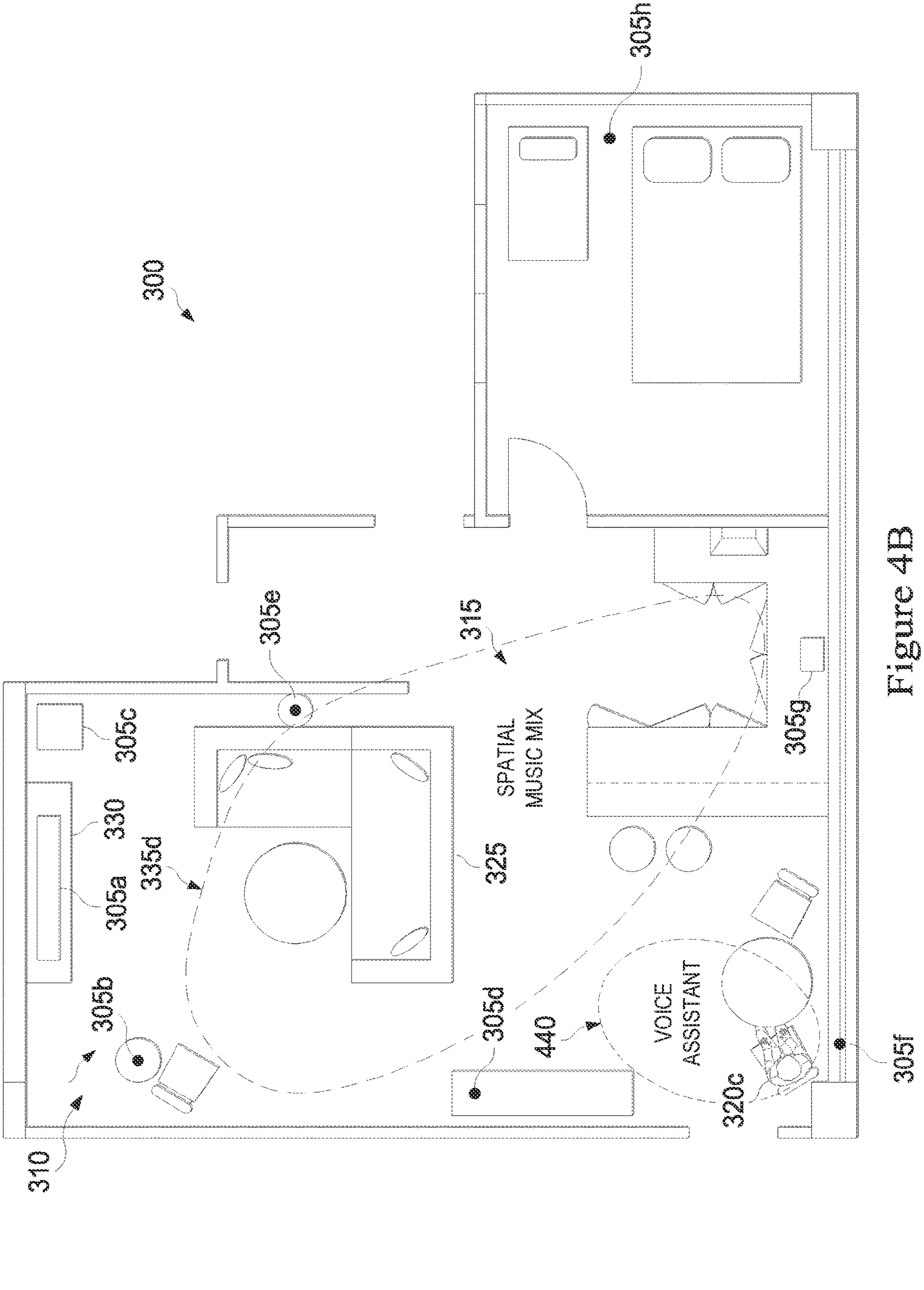

As can be seen, this example use case of the disclosed multi-stream renderer employs numerous, interconnected modifications to the two program streams in order to optimize their simultaneous playback. In summary, these modifications to the streams can be listed as:

- Spatial movie soundtrack
  - Spatial rendering shifted away from the kitchen as a function of the cooking tips being rendered in the kitchen
  - Dynamic reduction in loudness as a function of the loudness of the cooking tips rendered in the kitchen
  - Dynamic boost in loudness as a function of an estimate of the loudness in the living room of the interfering blender noise from the kitchen
- Cooking tips
  - Dynamic boost in loudness as a function of a combined estimate of the loudness of both the movie soundtrack and blender noise in the kitchen A second example use case of the disclosed multi-stream renderer involves the simultaneous playback of a spatial program stream, such as music, with the response of a smart voice assistant to some inquiry by the user. With existing smart speakers, where playback has generally been constrained to monophonic or stereo playback over a single device, an interaction with the voice assistant typically consists of the following stages:

1) Music playing
2) User utters the voice assistant wakeword
3) Smart speaker recognizes the wakeword and turns down (ducks) the music by a significant amount
4) User utters a command to the smart assistant (i.e. "Play the next song")
5) Smart speaker recognizes the command, affirms this by playing some voice response (i.e. "Ok, playing next song") through the speaker mixed over the top of the ducked music, and then executes the command
6) Smart speaker turns the music back up to the original volume FIGS. 4A and 4B show an example of a multi-stream renderer providing simultaneous playback of a spatial music mix and a voice assistant response. When playing spatial audio over a multitude of orchestrated smart speakers, some embodiments provide an improvement to the above chain of events. Specifically, the spatial mix may be shifted away from one or more of the speakers selected as appropriate for relaying the response from the voice assistant. Creating this space for the voice assistant response means that the spatial mix may be turned down less, or perhaps not at all, in comparison to the existing state of affairs listed above. FIGS. 4A and 4B depict this scenario. In this example, the modified chain of events may transpire as:

1) A spatial music program stream is playing over a multitude of orchestrated smart speakers for a user cloud 335*c* in FIG. 4A).
2) User 320*c* utters the voice assistant wakeword.
3) One or more smart speakers (e.g., the speaker 305*d* and/or the speaker 305*f*) recognizes the wakeword and determines the location of the user 320*c*, or which speaker(s) the user 320*c* is closest to, using the associated recordings from microphones associated with the one or more smart speaker(s).
4) The rendering of the spatial music mix is shifted away from the location determined in the previous step in anticipation of a voice assistant response program stream being rendered near that location (cloud 335*d* in FIG. 4B).
5) User utters a command to the smart assistant (e.g., to a smart speaker running smart assistant/virtual assistant software).
6) Smart speakers recognize the command, synthesize a corresponding response program stream, and render the response near the location of the user (cloud 440 in FIG. 4B).
7) Rendering of the spatial music program stream shifts back to its original state when the voice assistant response is complete (cloud 335*c* in FIG. 4A).

In addition to optimizing the simultaneous playback of the spatial music mix and voice assistant response, the shifting of the spatial music mix may also improve the ability of the set of speakers to understand the listener in step 5. This is because music has been shifted out of the speakers near the listener, thereby improving the voice to other ratio of the associated microphones.

Similar to what was described for the previous scenario with the spatial movie mix and cooking tips, the current scenario may be further optimized beyond what is afforded by shifting the rendering of the spatial mix as a function of the voice assistant response. On its own, shifting the spatial mix may not be enough to make the voice assistant response completely intelligible to the user. A simple solution is to also turn the spatial mix down by a fixed amount, though less than is required with the current state of affairs. Alternatively, the loudness of the voice assistant response program stream may be dynamically boosted as a function of the loudness of the spatial music mix program stream in order to maintain the audibility of the response. As an extension, the loudness of the spatial music mix may also be dynamically cut if this boosting process on the response stream grows too large.

Figure 5A:
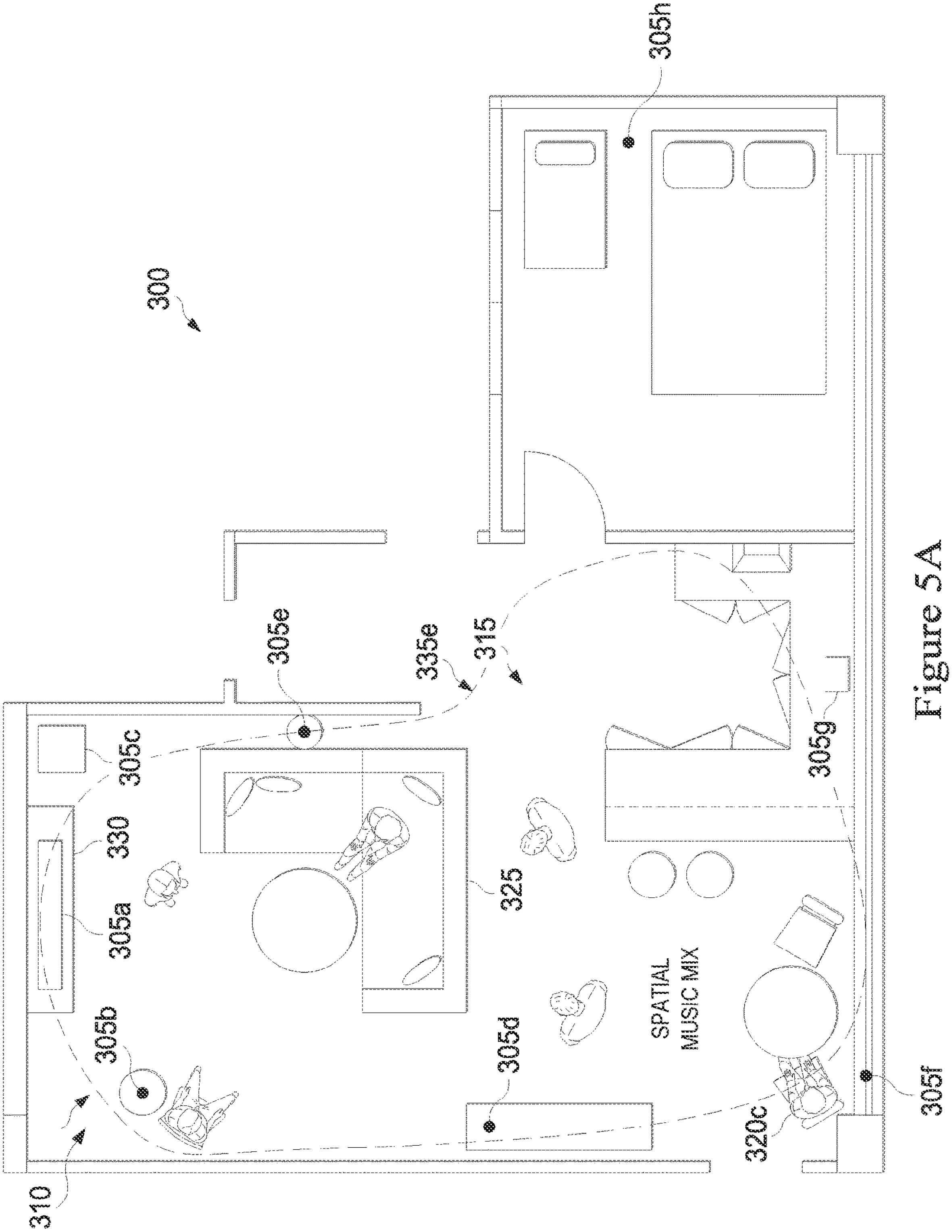
FIGS. 5A, 5B and 5C illustrate a third example use case for a disclosed multi-stream renderer.
Figure 5B:
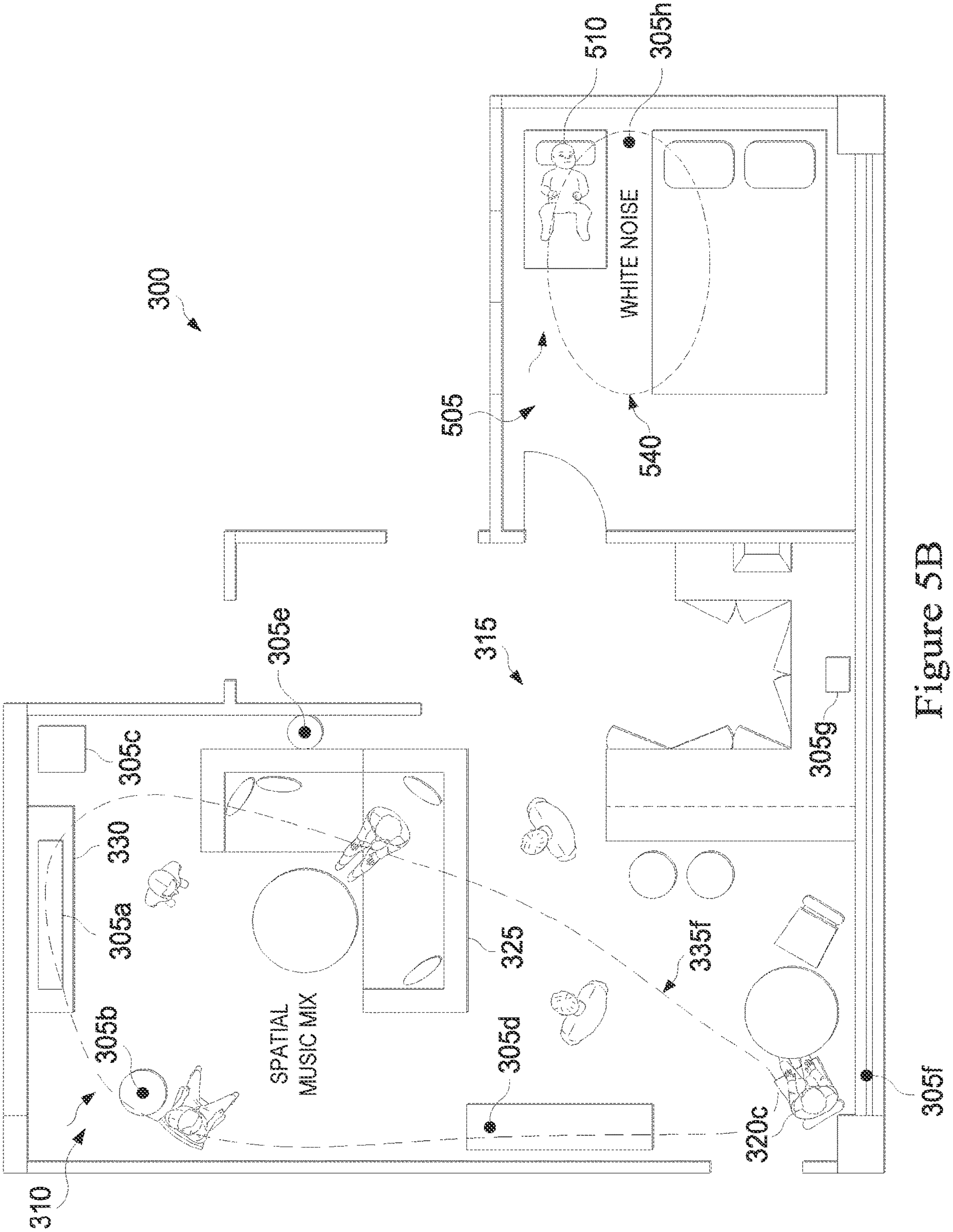
Figure 5C:
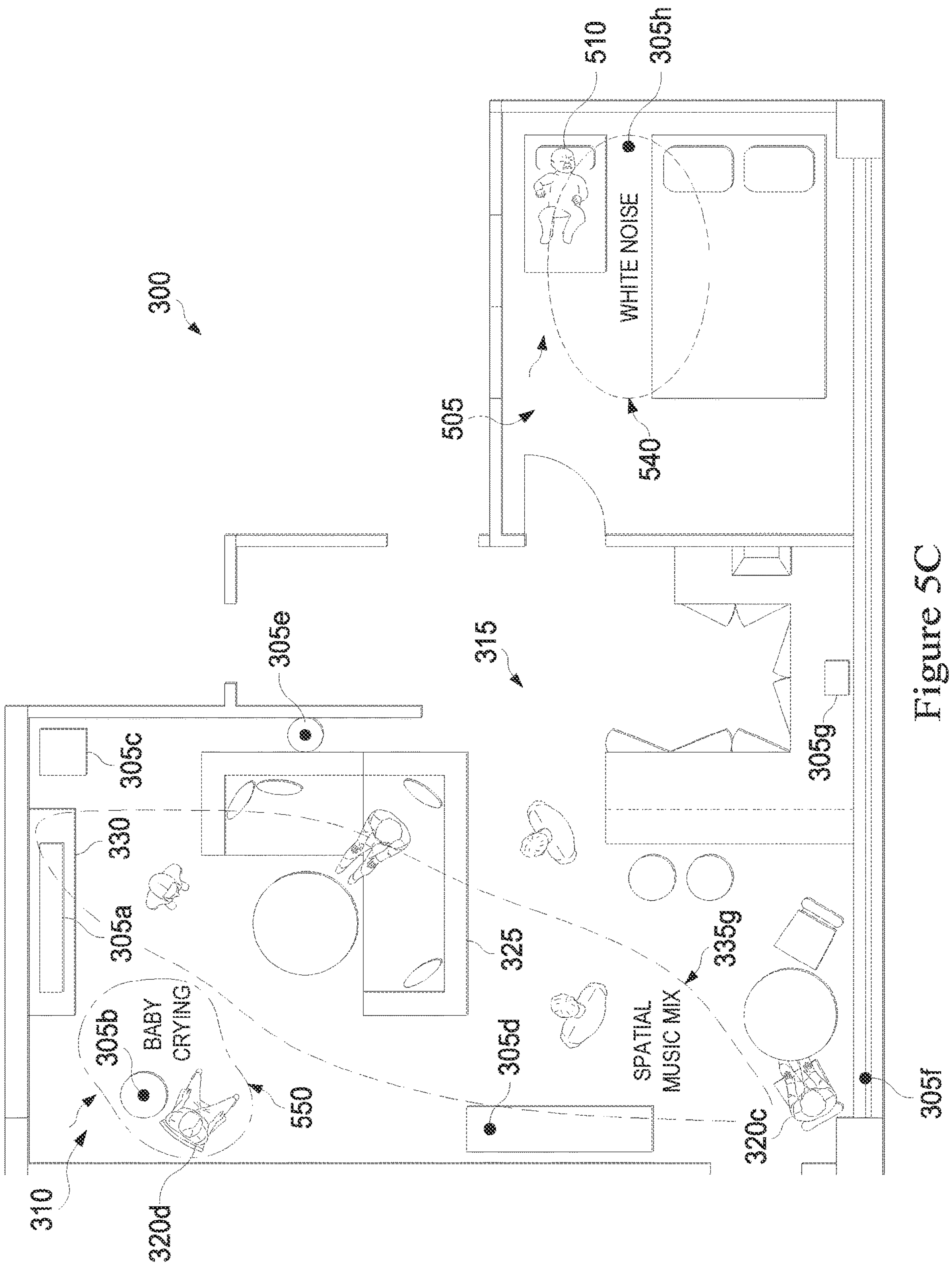

FIGS. 5A, 5B and 5C illustrate a third example use case for a disclosed multi-stream renderer. This example involves managing the simultaneous playback of a spatial music mix program stream and a comfort-noise program stream while at the same time attempting to make sure that a baby stays asleep in an adjacent room but being able to hear if the baby cries. FIG. 5A depicts a starting point wherein the spatial music mix (represented by the cloud 335*e*) is playing optimally across all the speakers in the living room 310 and kitchen 315 for numerous people at a party. In FIG. 5B a baby 510 is now trying to sleep in the adjacent bedroom 505 pictured at the lower right. To help ensure this, the spatial music mix is dynamically shifted away from the bedroom to minimize leakage therein, as depicted by the cloud 335*f*, while still maintaining a reasonable experience for people at the party. At the same time, a second program stream containing soothing white noise (represented by the cloud 540) plays out of the speaker 305*h* in the baby's room to mask any remaining leakage from the music in the adjacent room. To ensure complete masking, the loudness of this white noise stream may, in some examples, be dynamically modified as a function of an estimate of the loudness of the spatial music leaking into the baby's room. This estimate may be generated from the speaker feeds of the spatial music's rendering, signals from microphones in the baby's room, or a combination thereof. Also, the loudness of the spatial music mix may be dynamically attenuated as a function of the loudness-modified noise if it becomes too loud. This is analogous to the loudness processing between the spatial movie mix and cooking tips of the first scenario. Lastly, microphones in the baby's room (e.g., microphones associated with the speaker 305*h*, which may be a smart speaker in some implementations) may be configured to record audio from the baby (cancelling out sound that might be picked up from the spatial music and white noise), and a combination of these processed microphone signals may then serve as a third program stream which may be simultaneously played back near the listener 320*d*, who may be a parent or other caregiver, in the living room 310 if crying is detected (through machine learning, via a pattern matching algorithm, etc.). FIG. 5C depicts the reproduction of this additional stream with the cloud 550. In this case, the spatial music mix may be additionally shifted away from the speaker near the parent playing the baby's cry, as shown by the modified shape of the cloud 335*g* relative to the shape of the cloud 335*f* of FIG. 5B, and the program stream of the baby's cry may be loudness modified as a function of the spatial music stream so that the baby's cry remains audible to the listener 320*d*. The interconnected modifications optimizing the simultaneous playback of the three program streams considered within this example may be summarized as follows:

- Spatial music mix in living room
  - Spatial rendering shifted away from the baby's room to reduce transmission into the room
  - Dynamic reduction in loudness as a function of the loudness of the white noise rendered in the baby's room
  - Spatial rendering shifted away from parent as a function of the baby's cry being rendered on a speaker near the parent
- White noise
  - Dynamic boost in loudness as a function of an estimate of the loudness of the music stream bleeding into the baby's room
- Recording of baby's cry
  - Dynamic boost in loudness as a function of an estimate of the loudness of the music mix at the position of the parent or other caregiver.

We next describe examples of how some of the noted embodiments may be implemented.

In FIG. 1B, each of the Render blocks 1 . . . N may be implemented as identical instances of any single-stream renderer, such as the CMAP, FV or hybrid renderers previously mentioned. Structuring the multi-stream renderer this way has some convenient and useful properties.

First, if the rendering is done in this hierarchical arrangement and each of the single-stream renderer instances is configured to operate in the frequency/transform domain (e.g. QMF), then the mixing of the streams can also happen in the frequency/transform domain and the inverse transform only needs to be run once, for M channels. This is a significant efficiency improvement over running N×M inverse transforms and mixing in the time domain.

Figure 6:
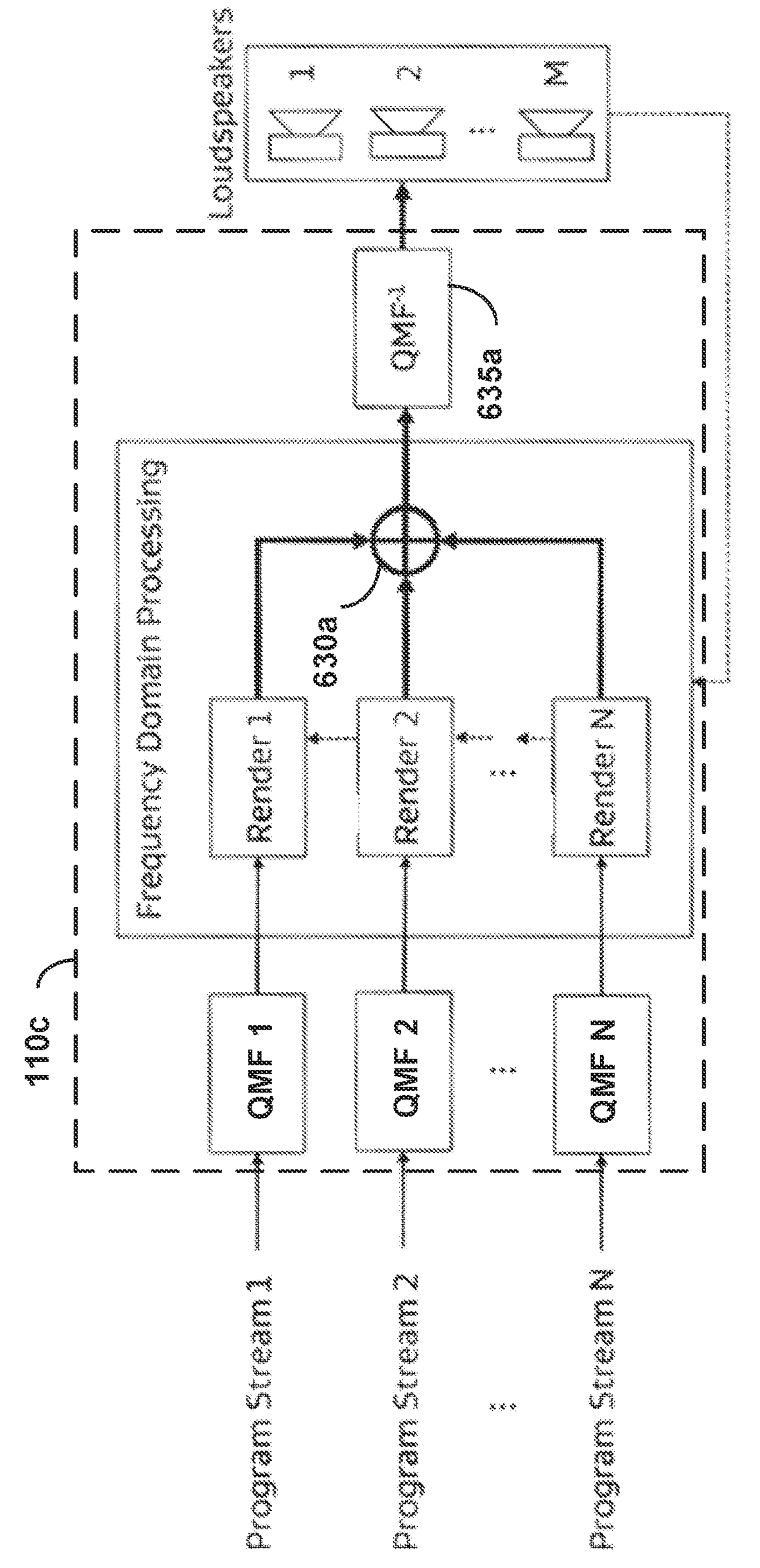
FIG. 6 shows a frequency/transform domain example of the multi-stream renderer shown in FIG. 1B.

FIG. 6 shows a frequency/transform domain example of a multi-stream renderer shown in FIG. 1B. In this example, a quadrature mirror analysis filterbank (QMF) is applied to each of program streams 1 through N before each program stream is received by a corresponding one of the rendering modules 1 through N. According to this example, the rendering modules 1 through N operate in the frequency domain. After the mixer 630*a* mixes the outputs of the rendering modules 1 through N, an inverse synthesis filterbank 635*a* converts the mix to the time domain and provides mixed speaker feed signals in the time domain to the loudspeakers 1 through M. In this example, the quadrature mirror filterbanks, the rendering modules 1 through N, the mixer 630*a* and the inverse filterbank 635*a* are components of the control system 110*c*.

Figure 7:
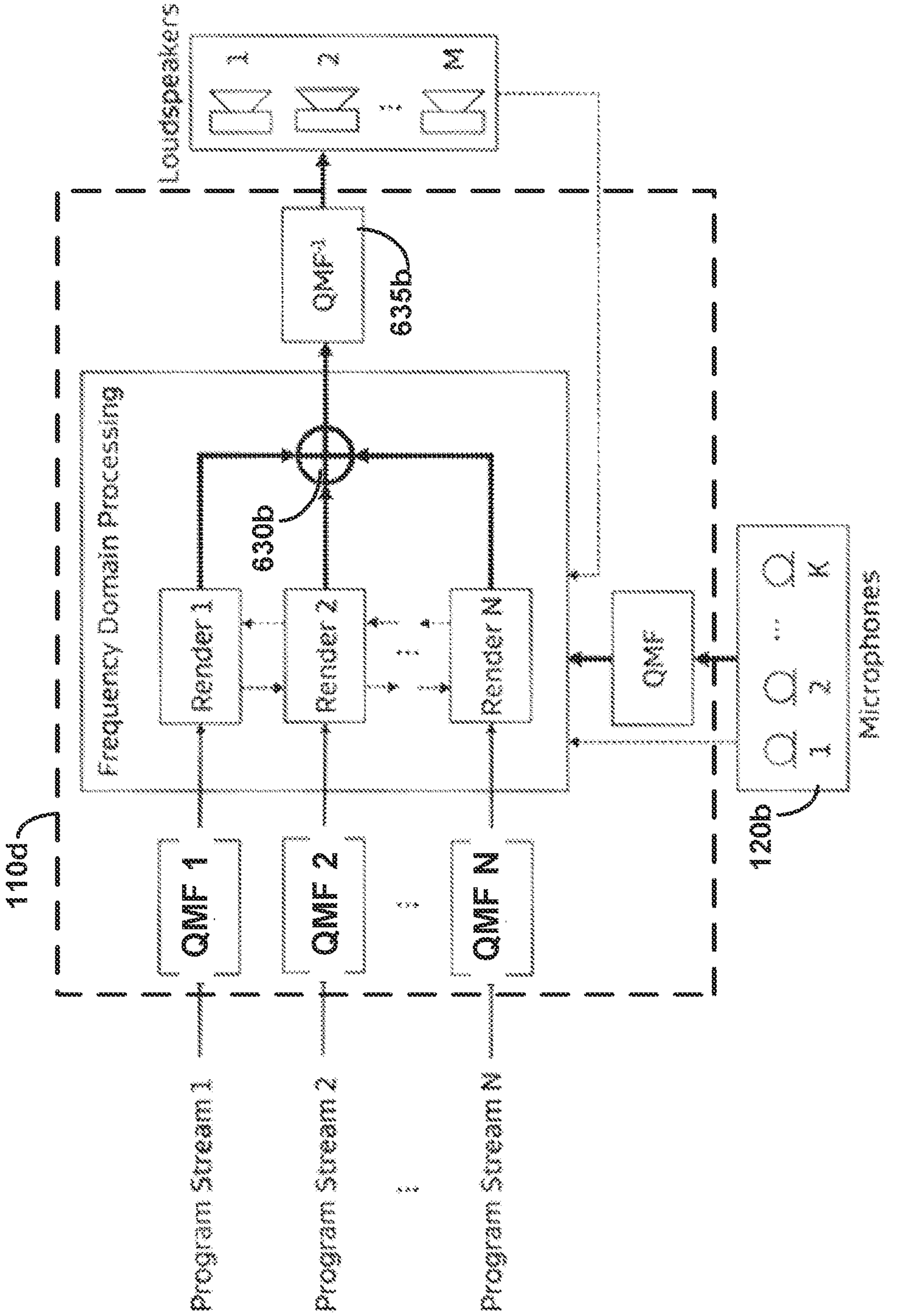
FIG. 7 shows a frequency/transform domain example of the multi-stream renderer shown in FIG. 2A.

FIG. 7 shows a frequency/transform domain example of the multi-stream renderer shown in FIG. 2A. As in FIG. 6, a quadrature mirror filterbank (QMF) is applied to each of program streams 1 through N before each program stream is received by a corresponding one of the rendering modules 1 through N. According to this example, the rendering modules 1 through N operate in the frequency domain. In this implementation, time-domain microphone signals from the microphone system 120*b* are also provided to a quadrature mirror filterbank, so that the rendering modules 1 through N receive microphone signals in the frequency domain. After the mixer 630*b* mixes the outputs of the rendering modules 1 through N, an inverse filterbank 635*b* converts the mix to the time domain and provides mixed speaker feed signals in the time domain to the loudspeakers 1 through M. In this example, the quadrature mirror filterbanks, the rendering modules 1 through N, the mixer 630*b* and the inverse filterbank 635*b* are components of the control system 110*d*.

Another benefit of a hierarchical approach in the frequency domain is in the calculation of the perceived loudness of each audio stream and the use of this information in dynamically modifying one or more of the other audio streams. To illustrate this embodiment, we consider the previously mentioned example that is described above with reference to FIGS. 3A and 3B. In this case we have two audio streams (N=2), a spatial movie soundtrack and cooking tips. We also may have environmental noise produced a blender in the kitchen, picked up by one or more of the K microphones.

After each audio stream s has been individually rendered and each microphone i captured and transformed to the frequency domain, a source excitation signal $E_s$ or $E_i$ can be calculated, which serves as a time-varying estimate of the perceived loudness of each audio stream s or microphone signal i. In this example, these source excitation signals are computed from the rendered streams or captured microphones via transform coefficients $X_s$ for audio steams or $X_i$ for microphone signals, for b frequency bands across time t for c loudspeakers and smoothed with frequency-dependent time constants $\lambda_b$:

$$E_s(b,t,c) = \lambda_b E_s(b,t-1,c) + (1-\lambda_b)|X_s(b,t,c)|^2 \tag{20a}$$

$$E_i(b,t,c) = \lambda_b(b) E_i(b,t-1,c) + (1-\lambda_b)|X_i(b,t,c)|^2 \tag{20b}$$

In this example, the raw source excitations are an estimate of the perceived loudness of each stream at a specific position. For the spatial stream, that position is in the middle of the cloud 335*b* in FIG. 3B, whereas for the cooking tips stream, it is in the middle of the cloud 340. The position for the blender noise picked up by the microphones may, for example, be based on the specific location(s) of the microphone(s) closest to the source of the blender noise.

The raw source excitations must be translated to the listening position of the audio stream(s) that will be modified by them, to estimate how perceptible they will be as noise at the listening position of each target audio stream. For example, if audio stream 1 is the movie soundtrack and audio stream 2 is the cooking tips, $\hat{E}_{12}$ would be the translated (noise) excitation. That translation is calculated by applying an audibility scale factor $A_{xs}$ from a source audio stream s to a target audio stream x or $A_{xi}$ from microphone i to a target audio stream x, as a function of each loudspeaker c for each frequency band b. Values for $A_{xs}$ and $A_{xi}$ may be determined by using distance ratios or estimates of actual audibility, which may vary over time.

$$\hat{E}_{xs}(b,t,c) = A_{xs}(b,t,c) E_s(b,t,c) \tag{21a}$$

$$\hat{E}_{xi}(b,t,c) = A_{xi}(b,t,c) E_i(b,t,c) \tag{21b}$$

In equation 13a, $\hat{E}_{xs}$ represents raw noise excitations computed for source audio streams, without reference to microphone input. In equation 13b, $\hat{E}_{xi}$ represents raw noise excitations computed with reference to microphone input. According to this example, the raw noise excitations $\hat{E}_{xs}$ or $\hat{E}_{xi}$ are then summed across streams 1 to N, microphones 1 to K, and output channels 1 to M to get a total noise estimate $\hat{E}_x$ for a target stream x:

$$\hat{E}_x(b,t) = \sum_{c=1}^{M} \left( \sum_{s=1}^{N} \hat{E}_{xs}(b,t,c) + \sum_{i=1}^{K} \hat{E}_{xi}(b,t,c) \right) \tag{22}$$

According to some alternative implementations, a total noise estimate may be obtained without reference to microphone input by omitting the term $$\sum_{i=1}^{K} \hat{E}_{xi}(b,t,c)$$

in Equation 14.

In this example, the total raw noise estimate is smoothed to avoid perceptible artifacts that could be caused by modifying the target streams too rapidly. According to this implementation, the smoothing is based on the concept of using a fast attack and a slow release, similar to an audio compressor. The smoothed noise estimate $\overline{E}_x$ for a target stream x is calculated in this example as:

$$\overline{E}_x(b,t) = \lambda(b,t)\hat{E}_x(b,t) + (1-\lambda(b,t))\overline{E}_x(b,t-1) \tag{23}$$

$$\lambda(b,t) = \begin{cases} \lambda_{fast}, & \hat{E}_x(b,t) > \overline{E}_x(b,t) \\ \lambda_{slow}, & \hat{E}_x(b,t) \le \overline{E}_x(b,t) \end{cases} \tag{24}$$

Once we have a complete noise estimate $\overline{E}_x(b,t)$ for stream x, we can reuse the previously calculated source excitation signal $E_x(b,t,c)$ to determine a set of time-varying gains $G_x(b,t,c)$ to apply to the target audio stream x to ensure that it remains audible over the noise. These gains can be calculated using any of a variety of techniques.

In one embodiment, a loudness function L{•,•} can be applied to the excitations to model various non-linearities in a human's perception of loudness and to calculate specific loudness signals which describe the time-varying distribution of the perceived loudness across frequency. Applying L{•,•} to the excitations for the noise estimate and rendered audio stream x gives an estimate for the specific loudness of each signal:

$$L_{xn}(b,t) = L\{\overline{E}_x(b,t)\} \tag{25a}$$

$$L_x(b,t,c) = L\{E_x(b,t,c)\} \tag{25b}$$

In Equation 17a, $L_{xn}$ represents an estimate for the specific loudness of the noise and in Equation 17b, $L_x$ represents an estimate for the specific loudness of the rendered audio stream x. These specific loudness signals represent the perceived loudness when the signals are heard in isolation. However, if the two signals are mixed, masking may occur. For example, if the noise signal is much louder than the stream x signal, it will mask the stream x signal thereby decreasing the perceived loudness of that signal relative to the perceived loudness of that signal heard in isolation. This phenomenon may be modeled with a partial loudness function PL{•,•} which takes two inputs. The first input is the excitation of the signal of interest, and the second input is the excitation of the competing (noise) signal. The function returns a partial specific loudness signal PL representing the perceived loudness of the signal of interest in the presence of the competing signal. The partial specific loudness of the stream x signal in the presence of the noise signal may then be computed directly from the excitation signals, across frequency bands b, time t, and loudspeaker c:

$$PL_x(b,t,c) = PL\{E_x(b,t,c), \overline{E}_x(b,t)\} \tag{26}$$

To maintain audibility of the audio stream x signal in the presence of the noise, we can calculate gains $G_x(b,t,c)$ to apply to audio stream x to boost the loudness until it is audible above the noise as shown in Equations 8a and 8b. Alternatively, if the noise is from another audio stream s, we can calculate two sets of gains. In one such example, the first, $G_x(b,t,c)$, is to be applied to audio stream x to boost its loudness and the second, $G_s(b,t)$, is to be applied to competing audio stream s to reduce its loudness such that the combination of the gains ensures audibility of audio stream x, as shown in Equations 9a and 9b. In both sets of equations $\overline{PL}_x(b,t,c)$ represents the partial specific loudness of the source signal in the presence of noise after application of the compensating gains.

$$\overline{PL}_x(b, t, c) = PL\{G_x(b, t, c)^2 E_x(b, t, c), \overline{E}_x(b, t)\} \tag{27a}$$

such that $$L_x(b, t, c) - \overline{PL}_x(b, t, c) < L_x(b, t, c) - PL_x(b, t, c) \tag{27b}$$

$$\overline{PL}_x(b, t, c) = PL\{G_x(b, t, c)^2 E_x(b, t, c), G_s(b, t)^2 \overline{E}_x(b, t)\} \tag{28a}$$

again, such that $$L_x(b, t, c) - \overline{PL}_x(b, t, c) < L_x(b, t, c) - PL_x(b, t, c) \tag{28b}$$

In some examples, the raw gains may be further smoothed across frequency using a smoothing function S{•} before being applied to an audio stream, again to avoid audible artifacts. $\overline{G}_x(b,t,c)$ and $\overline{G}_s(b,t)$ represent the final compensation gains for a target audio stream x and a competing audio stream s:

$$\overline{G}_x(b, t, c) = S\{G_x(b, t, c)\} \tag{29a}$$

$$\overline{G}_s(b, t) = S\{G_s(b, t)\} \tag{29b}$$

In one embodiment these gains may be applied directly to all rendered output channels of an audio stream. In another embodiment they may instead be applied to an audio stream's objects before they are rendered, e.g., using the methods described in US Patent Application Publication No. 2019/0037333A1, which is hereby incorporated by reference. These methods involve calculating, based on spatial metadata of the audio object, a panning coefficient for each of the audio objects in relation to each of a plurality of predefined channel coverage zones. The audio signal may be converted into submixes in relation to the predefined channel coverage zones based on the calculated panning coefficients and the audio objects. Each of the submixes may indicate a sum of components of the plurality of the audio objects in relation to one of the predefined channel coverage zones. A submix gain may be generated by applying an audio processing to each of the submix and may control an object gain applied to each of the audio objects. The object gain may be a function of the panning coefficients for each of the audio objects and the submix gains in relation to each of the predefined channel coverage zones. Applying the gains to the objects has some advantages, especially when combined with other processing of the streams.

Figure 8:
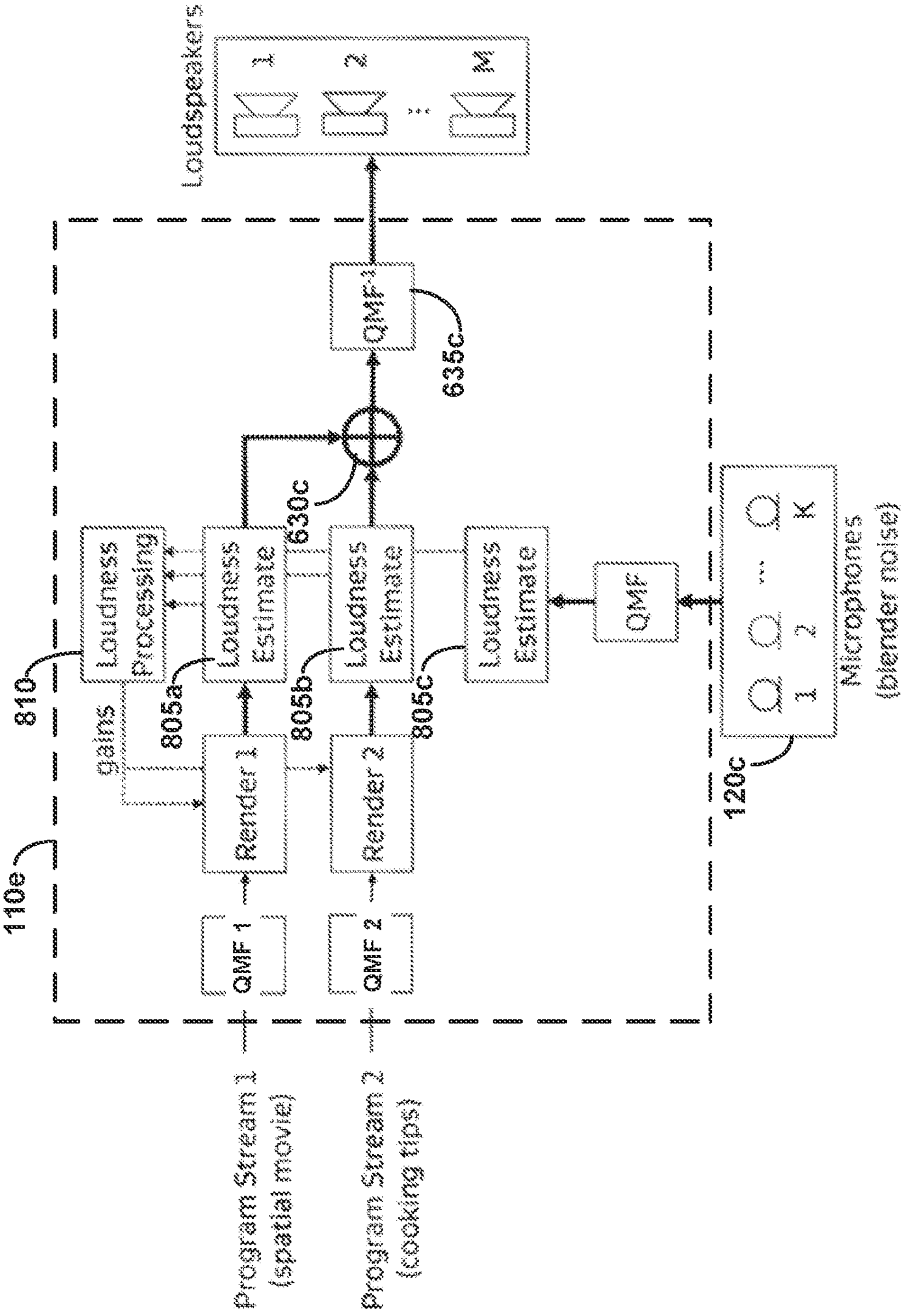
FIG. 8 shows an implementation of a multi-stream rendering system having audio stream loudness estimators.

FIG. 8 shows an implementation of a multi-stream rendering system having audio stream loudness estimators. According to this example, the multi-stream rendering system of FIG. 8 is also configured for implementing loudness processing, e.g., as described in Equations 12a-21b, and compensation gain application within each single-stream renderer. In this example, a quadrature mirror filterbank (QMF) is applied to each of program streams 1 and 2 before each program stream is received by a corresponding one of the rendering modules 1 and 2. In alternative examples, a quadrature mirror filterbank (QMF) may be applied to each of program streams 1 through N before each program stream is received by a corresponding one of the rendering modules 1 through N. According to this example, the rendering modules 1 and 2 operate in the frequency domain. In this implementation, loudness estimation module 805_a_ calculates a loudness estimate for program stream 1, e.g., as described above with reference to Equations 12a-17b. Similarly, in this example the loudness estimation module 805_b_ calculates a loudness estimate for program stream 2.

In this implementation, time-domain microphone signals from the microphone system 120_c_ are also provided to a quadrature mirror filterbank, so that the loudness estimation module 805_c_ receives microphone signals in the frequency domain. In this implementation, loudness estimation module 805_c_ calculates a loudness estimate for the microphone signals, e.g., as described above with reference to Equations 12b-17a. In this example, the loudness processing module 810 is configured for implementing loudness processing, e.g., as described in Equations 18-21b, and compensation gain application for each single-stream rendering module. In this implementation, the loudness processing module 810 is configured for altering audio signals of program stream 1 and audio signals of program stream 2 in order to preserve their perceived loudness in the presence of one or more interfering signals. In some instances, the control system may determine that the microphone signals correspond to environmental noise above which a program stream should be raised. However, in some examples the control system may determine that the microphone signals correspond to a wakeword, a command, a child's cry, or other such audio that may need to be heard by a smart audio device and/or one or more listeners. In some such implementations, the loudness processing module 810 may be configured for altering the microphone signals in order to preserve their perceived loudness in the presence of interfering audio signals of program stream 1 and/or audio signals of program stream 2. Here, the loudness processing module 810 is configured to provide appropriate gains to the rendering modules 1 and 2.

After the mixer 630_c_ mixes the outputs of the rendering modules 1 through N, an inverse filterbank 635_c_ converts the mix to the time domain and provides mixed speaker feed signals in the time domain to the loudspeakers 1 through M. In this example, the quadrature mirror filterbanks, the rendering modules 1 through N, the mixer 630_c_ and the inverse filterbank 635_c_ are components of the control system 110_e_.

Figure 9A:
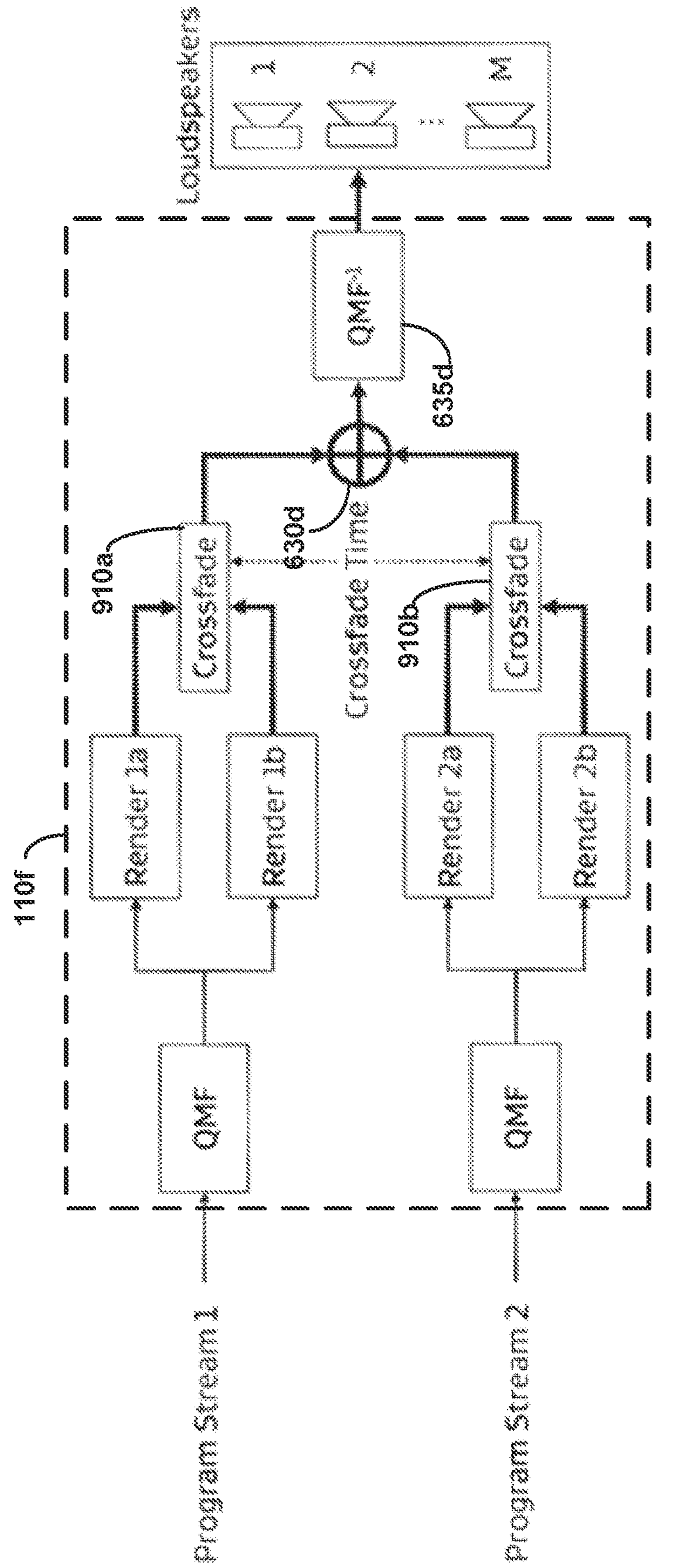
FIG. 9A shows an example of a multi-stream rendering system configured for crossfading of multiple rendered streams.

FIG. 9A shows an example of a multi-stream rendering system configured for crossfading of multiple rendered streams. In some such embodiments, crossfading of multiple rendered streams is used to provide a smooth experience when the rendering configurations are changed dynamically. One example is the aforementioned use case of simultaneous playback of a spatial program stream, such as music, with the response of a smart voice assistant to some inquiry by the listener, as described above with reference to FIGS. 4A and 4B. In this case, it is useful to instantiate extra single-stream renderers with the alternate spatial rendering configurations and simultaneously crossfade between them, as shown in FIG. 9A.

In this example, a QMF is applied to program stream 1 before the program stream is received by rendering modules 1a and 1b. Similarly, a QMF is applied to program stream 2 before the program stream is received by rendering modules 2a and 2b. In some instances, the output of rendering module 1a may correspond with a desired reproduction of the program stream 1 prior to the detection of a wakeword, whereas the output of rendering module 1b may correspond with a desired reproduction of the program stream 1 after the detection of the wakeword. Similarly, the output of rendering module 2a may correspond with a desired reproduction of the program stream 2 prior to the detection of a wakeword, whereas the output of rendering module 2b may correspond with a desired reproduction of the program stream 2 after the detection of the wakeword. In this implementation, the output of rendering modules 1a and 1b is provided to crossfade module 910*a* and the output of rendering modules 2a and 2b is provided to crossfade module 910*b*. The crossfade time may, for example, be in the range of hundreds of milliseconds to several seconds.

After the mixer 630*d* mixes the outputs of the crossfade modules 910*a* and 910*b*, an inverse filterbank 635*d* converts the mix to the time domain and provides mixed speaker feed signals in the time domain to the loudspeakers 1 through M. In this example, the quadrature mirror filterbanks, the rendering modules, the crossfade modules, the mixer 630*d* and the inverse filterbank 635*d* are components of the control system 110*f*.

In some embodiments it may be possible to precompute the rendering configurations used in each of the single stream renderers 1a, 1b, 2a, and 2b. This is especially convenient and efficient for use cases like the smart voice assistant, as the spatial configurations are often known a priori and have no dependency on other dynamic aspects of the system. In other embodiments it may not be possible or desirable to precompute the rendering configurations, in which case the complete configurations for each single-stream renderer must be calculated dynamically while the system is running.

Figure 9B:
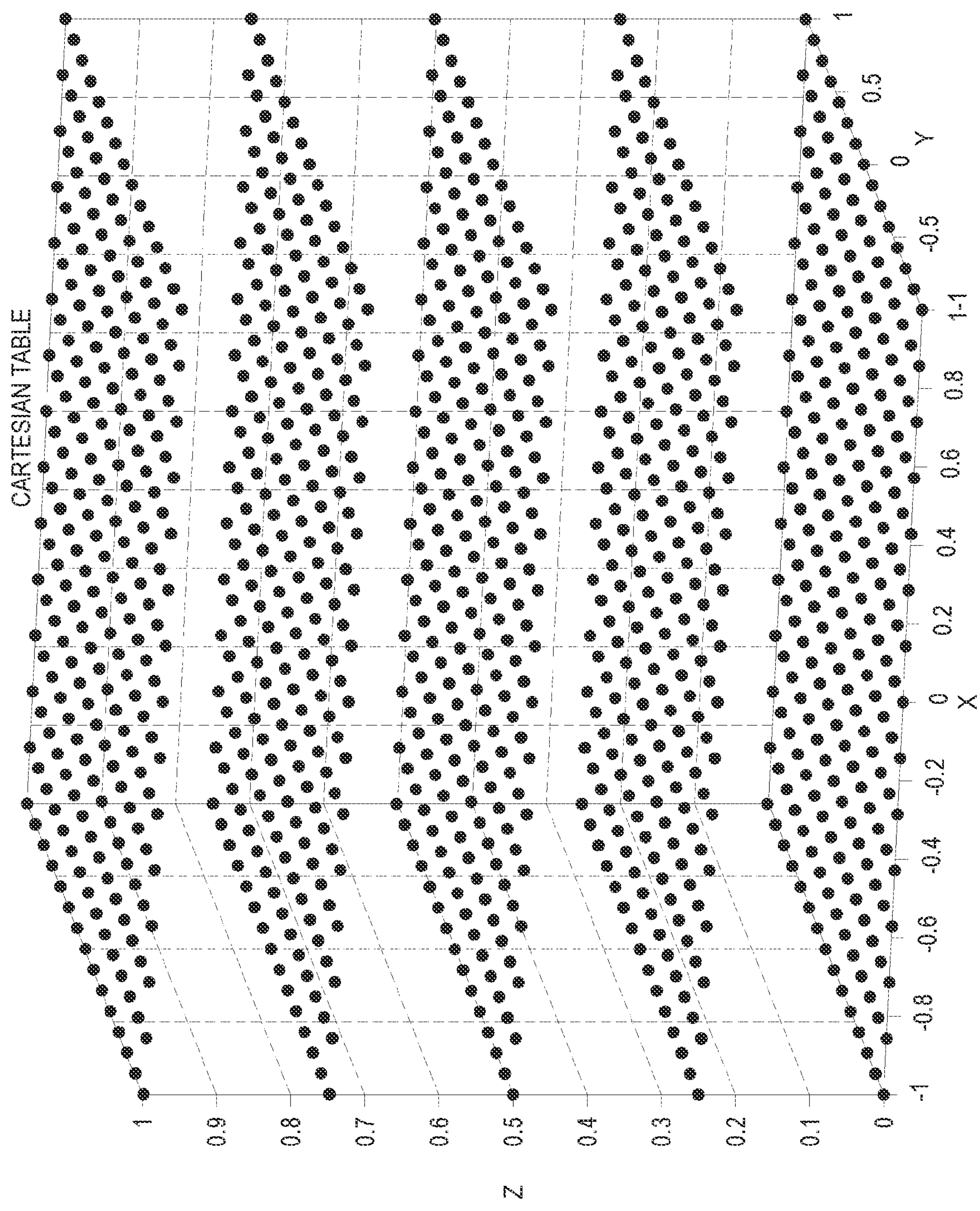
FIG. 9B is a graph of points indicative of speaker activations, in an example embodiment.

One of the practical considerations in implementing dynamic cost flexible rendering (in accordance with some embodiments) is complexity. In some cases it may not be feasible to solve the unique cost functions for each frequency band for each audio object in real-time, given that object positions (the positions, which may be indicated by metadata, of each audio object to be rendered) may change many times per second. An alternative approach to reduce complexity at the expense of memory is to use a look-up table that samples the three dimensional space of all possible object positions. The sampling need not be the same in all dimensions. FIG. 9B is a graph of points indicative of speaker activations, in an example embodiment. In this example, the x and y dimensions are sampled with 15 points and the z dimension is sampled with 5 points. According to this example, each point represents M speaker activations, one speaker activation for each of M speakers in an audio environment. The speaker activations may, for example, be a single gain per speaker for Center of Mass Amplitude Panning (CMAP) rendering or a vector of complex values across a plurality of N frequencies for Flexible Virtualization (FV) or hybrid CMAP/FV rendering. Other implementations may include more samples or fewer samples. For example, in some implementations the spatial sampling for speaker activations may not be uniform. Some implementations may involve speaker activation samples in more or fewer x,y planes than are shown in FIG. 9B. Some such implementations may determine speaker activation samples in only one x,y, plane. According to this example, each point represents the M speaker activations for the CMAP or FV solution. In some implementations, a set of speaker activations such as those shown in FIG. 9B may be stored in a data structure, which may be referred to herein as a “table” (or a “cartesian table,” as indicated in FIG. 9B).

Figure 10:
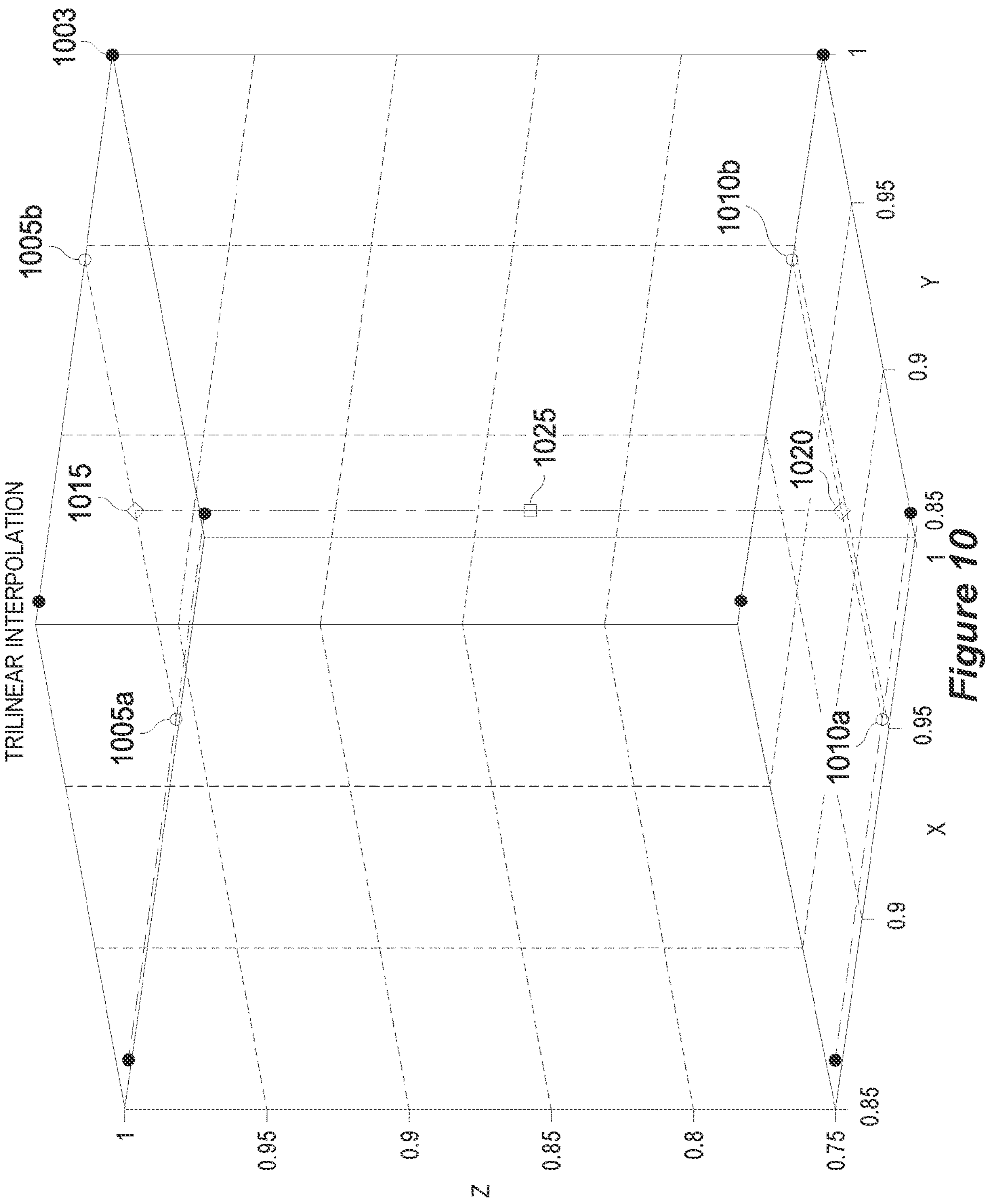
FIG. 10 is a graph of tri-linear interpolation between points indicative of speaker activations according to one example.

A desired rendering location will not necessarily correspond with the location for which a speaker activation has been calculated. At runtime, to determine the actual activations for each speaker, some form of interpolation may be implemented. In some such examples, tri-linear interpolation between the speaker activations of the nearest 8 points to a desired rendering location may be used. FIG. 10 is a graph of tri-linear interpolation between points indicative of speaker activations according to one example. According to this example, the solid circles 1003 at or near the vertices of the rectangular prism shown in FIG. 10 correspond to locations of the nearest 8 points to a desired rendering location for which speaker activations have been calculated. In this instance, the desired rendering location is a point within the rectangular prism that is presented in FIG. 10. In this example, the process of successive linear interpolation includes interpolation of each pair of points in the top plane to determine first and second interpolated points 1005*a* and 1005*b*, interpolation of each pair of points in the bottom plane to determine third and fourth interpolated points 1010*a* and 1010*b*, interpolation of the first and second interpolated points 1005*a* and 1005*b* to determine a fifth interpolated point 1015 in the top plane, interpolation of the third and fourth interpolated points 1010*a* and 1010*b* to determine a sixth interpolated point 1020 in the bottom plane, and interpolation of the fifth and sixth interpolated points 1015 and 1020 to determine a seventh interpolated point 1025 between the top and bottom planes. Although tri-linear interpolation is an effective interpolation method, one of skill in the art will appreciate that tri-linear interpolation is just one possible interpolation method that may be used in implementing aspects of the present disclosure, and that other examples may include other interpolation methods. For example, some implementations may involve interpolation in more or fewer x,y, planes than are shown in FIG. 9B. Some such implementations may involve interpolation in only one x,y, plane. In some implementations, a speaker activation for a desired rendering location will simply be set to the speaker activation of the nearest location to the desired rendering location for which a speaker activation has been calculated.

As noted above with reference to FIG. 9B, in some examples each data structure or table may correspond with a particular rendering configuration. In some examples, each data structure or table may correspond with a version of a particular rendering configuration, e.g., a simplified version or a complete version. The complexity of the rendering configuration and the time required to calculate the corresponding speaker activations is correlated with the number of points (speaker activations) in the table, which in a three-dimensional example can be calculated as the product of 5 dimensions: the number of x, y, and z points, the number M of loudspeakers in the audio environment and the number N of frequency bands involved. In some examples, this correlation between table size and complexity arises from the need to minimize a potentially unique cost function to populate each point in the table. The complexity and time to calculate a speaker activation table may, in some examples, also be correlated with the fidelity of the rendering.

Figure 11A:
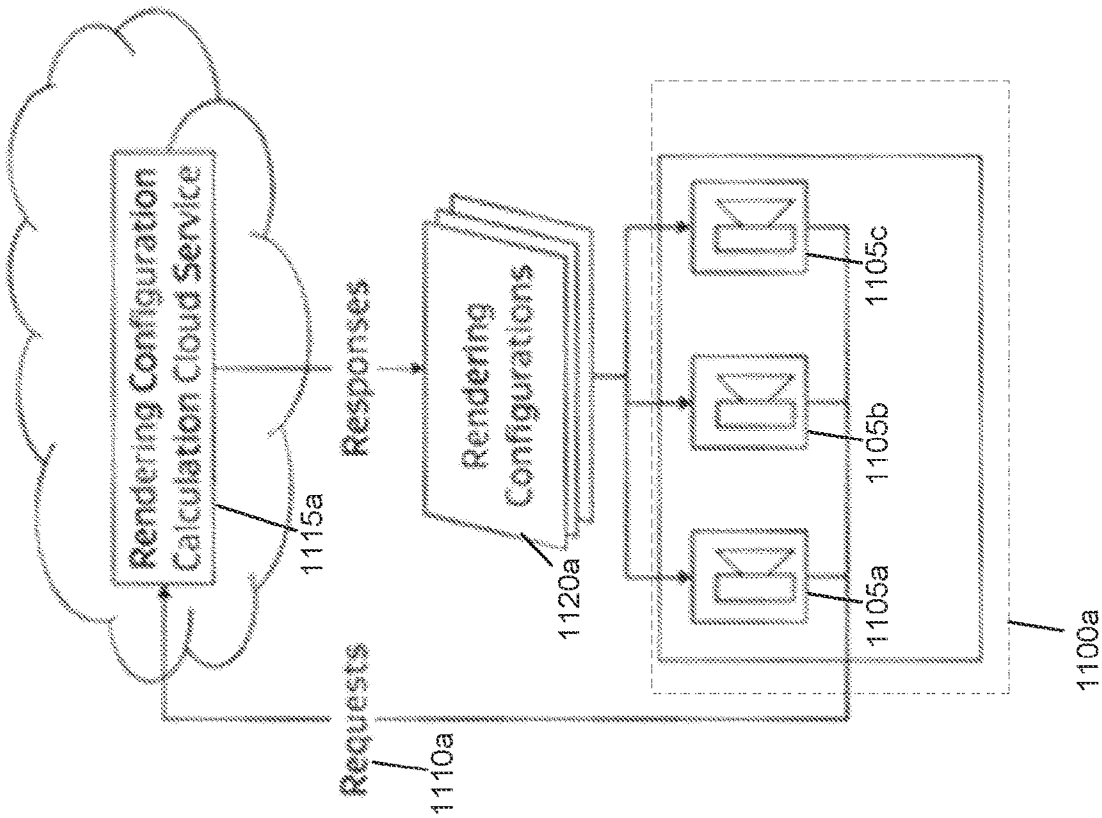
FIGS. 11A and 11B show examples of providing rendering configuration calculation services.
Figure 11B:
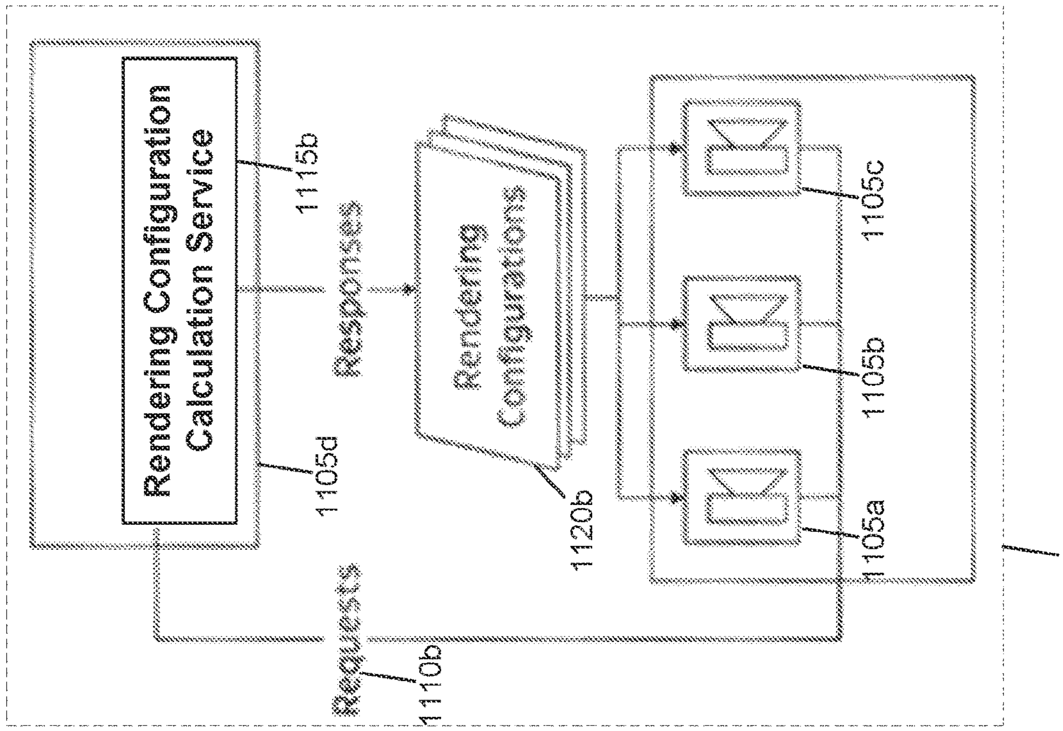

FIGS. 11A and 11B show examples of providing rendering configuration calculation services. High-quality rendering configuration calculation may be too complex for some audio devices, such as the smart audio devices 1105*a*, 1105*b* and 1105*c* shown in FIGS. 11A and 11B.

In the example shown in FIG. 11A, the smart audio devices 1105*a*-1105*c* are configured to send requests 1110*a* to a rendering configuration calculation service 1115*a*. In this example, the rendering configuration calculation service 1115*a* is a cloud-based service, which may be implemented by one or more servers of a data center in some instances. According to this example, the smart audio devices 1105*a*-1105*c* are configured to send the requests 1110*a* from the audio environment 1100*a* to the rendering configuration calculation service 1115*a* via the Internet. Here, the rendering configuration calculation service 1115*a* provides rendering configurations 1120*a*, responsive to the requests 1110*a*, to the smart audio devices 1105*a*-1105*c* via the Internet.

According to the example shown in FIG. 11B, the smart audio devices 1105*a*-1105*c* are configured to send requests 1110*b* to a rendering configuration calculation service 1115*b*. In this example, the rendering configuration calculation service 1115*b* is implemented by another, more capable device of the audio environment 1100*b*. Here, the audio device 1105*d* is a relatively more capable smart audio device than the smart audio devices 1105*a*-1105*c*. In some examples, the local device may be what is referred to herein as an orchestrating device or a "smart home hub." According to this example, the smart audio devices 1105*a*-1105*c* are configured to send the requests 1110*b* to the rendering configuration calculation service 1115*b* via a local network, such as a Wi-Fi network. In this implementation, the rendering configuration calculation service 1115*b* provides the rendering configurations 1120*b*, responsive to the requests 1110*b*, to the smart audio devices 1105*a*-1105*c* via the local network.

In the examples shown in FIGS. 11A and 11B, the network communications add additional latency to the process of computing the rendering configuration. In a dynamic, orchestrated audio system, it is a desirable property to have a rendering configuration change take effect with minimal latency. This is especially true when the rendering configuration change is in response to a real-time event, such as a rendering configuration that performs spatial ducking in response to a wakeword utterance. For highly dynamic applications, latency is arguably more important than quality, since any perceived lag in the system before reacting to an event will have a negative impact on the user experience. Therefore, in many use cases it can be highly desirable to obtain a valid rendering configuration with low latency, ideally in the range of a few hundred milliseconds. Some disclosed examples include methods for achieving rendering configuration changes with low latency. Some disclosed examples implement methods for calculating a relatively lower-complexity version of a rendering configuration to satisfy the latency requirements and then progressively transitioning to a higher-quality version of the rendering configuration when the higher-quality version is available.

Another desirable property of a dynamic flexible renderer is the ability to smoothly transition to a new rendering configuration, regardless of the current state of the system. For example, if a third configuration change is requested when the system is in the midst of a transition between a lower-complexity version of a rendering configuration and a higher-quality version of the rendering configuration, some disclosed implementations are configured to start a transition to a new rendering configuration without waiting for the first rendering configuration transition to complete. The present disclosure includes methods for smoothly handling such transitions.

The disclosed examples are generally applicable to any renderer that applies a set of speaker activations (e.g., a set of M speaker activations) to a collection of audio signals to generate outputs (e.g., M outputs), whether the renderer operates in the time domain or the frequency domain. By ensuring that the rendering configuration transition between a current set of speaker activations and a new set of speaker activations is smooth and continuous, but also arbitrarily interruptible, the timing of transitions between rendering configurations can effectively be decoupled from the time it takes to calculate the speaker activations for the new rendering configuration. Some such implementations enable the progressive transition to a new, lower-quality/complexity rendering configuration and then to a corresponding higher-quality/complexity rendering configuration, the latter of which may be computed asynchronously and/or by a device other than the one performing the rendering. Some implementations that are capable of supporting a smooth, continuous, and arbitrarily interruptible transition also have the desirable property of allowing a set of new target rendering activations to be updated dynamically at any time, regardless of any previous transitions that may be in progress.

Rendering Configuration Transitions

Figure 12A:
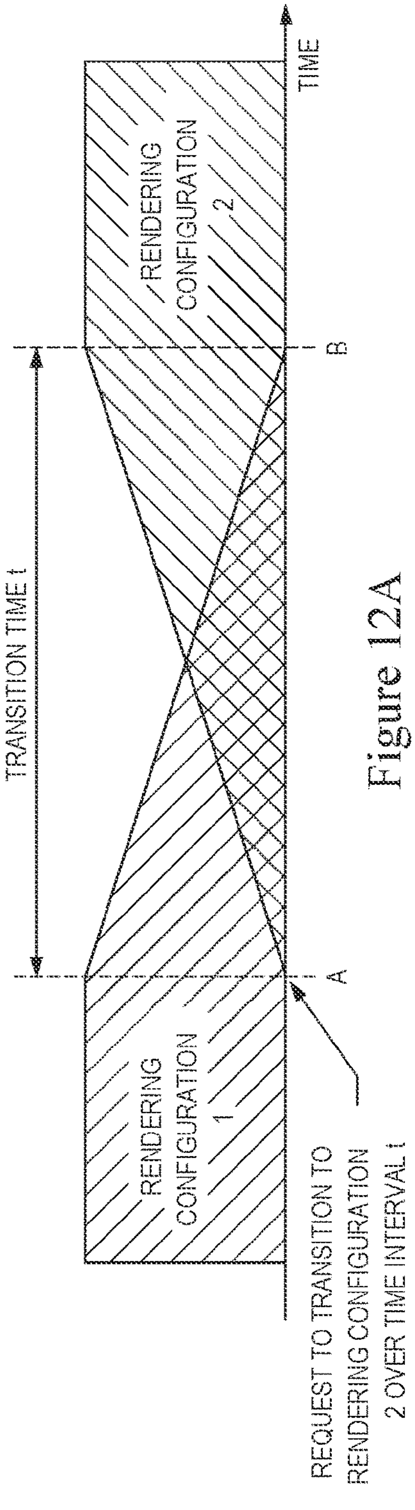
FIGS. 12A and 12B show examples of rendering configuration transitions.
Figure 12B:
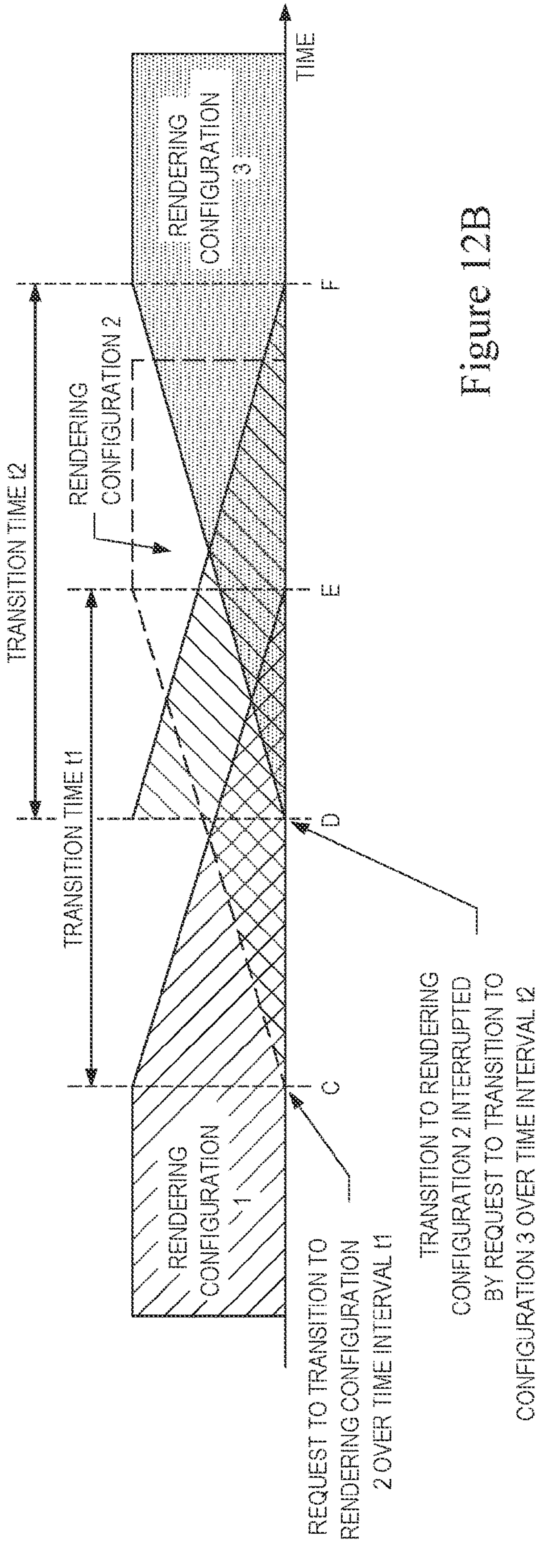

Various methods are disclosed herein for implementing smooth, dynamic, and arbitrarily interruptible rendering configuration transitions (which also may be referred to herein as renderer configuration transitions or simply as "transitions"). FIGS. 12A and 12B show examples of rendering configuration transitions. In the example shown in FIG. 12A, an audio system is initially reproducing audio rendered according to Rendering Configuration 1. For example, one or more control systems in an audio environment may be rendering input audio data into loudspeaker feed signals according to Rendering Configuration 1. Rendering Configuration 1 may, for example, correspond to a data structure ("table") such as that described above with reference to FIG. 9B.

According to this example, at time A, a rendering transition indication is received. In some examples, the rendering transition indication may be received by an orchestrating device, such as a smart speaker or a "smart home hub," that is configured to coordinate or orchestrate the rendering of audio devices in the audio environment. In this example, the rendering transition indication is an indication that the current rendering configuration should transition to Rendering Configuration 2. The rendering transition indication may, for example correspond to (e.g., may be in response to) a detected event in the audio system, such as a wake word utterance, an incoming telephone call, an indication that a second content stream (such as a content stream corresponding to the "cooking tips" example that is described above with reference to FIG. 3B) will be rendered by one or more audio devices of the audio environment, etc. Rendering Configuration 2 may, for example, correspond to a rendering configuration that performs spatial ducking in response to a wake word utterance, a rendering configuration that is used to "push" audio away from a position of the audio environment responsive to user input, etc. According to this example, during a transition time t, the audio system transitions from Rendering Configuration 1 to Rendering Configuration 2. After the transition time t, the audio system has fully transitioned to Rendering Configuration 2.

FIG. 12B shows an example of an interrupted renderer configuration transition. In the example shown in FIG. 12B, an audio system is initially reproducing audio rendered according to Rendering Configuration 1. According to this example, at time C, a first rendering transition indication is received. In this example, the first rendering transition indication is an indication that the current rendering configuration should transition to Rendering Configuration 2. According to this example, a transition time t1 (from time C to time E) would have been required for the audio system to fully transition from to Rendering Configuration 1 to Rendering Configuration 2. However, before the transition time t1 has elapsed and before the audio system has fully transitioned to Rendering Configuration 2, in this example a second rendering transition indication is received at time D. Here, the second rendering transition indication is an indication that the current rendering configuration should transition to Rendering Configuration 3. According to this example, the transition from Rendering Configuration 1 to Rendering Configuration 2 is interrupted upon receiving the second rendering transition indication. In this example, a transition time t2 (from time D to time F) was required for the audio system to fully transition to Rendering Configuration 3.

Various mechanisms for managing transitions between rendering configurations are disclosed herein. In the example described above with reference to FIG. 9A, cross-fading of multiple rendered streams is used to provide a smooth transition when the rendering configurations are changed dynamically.

Figure 13:
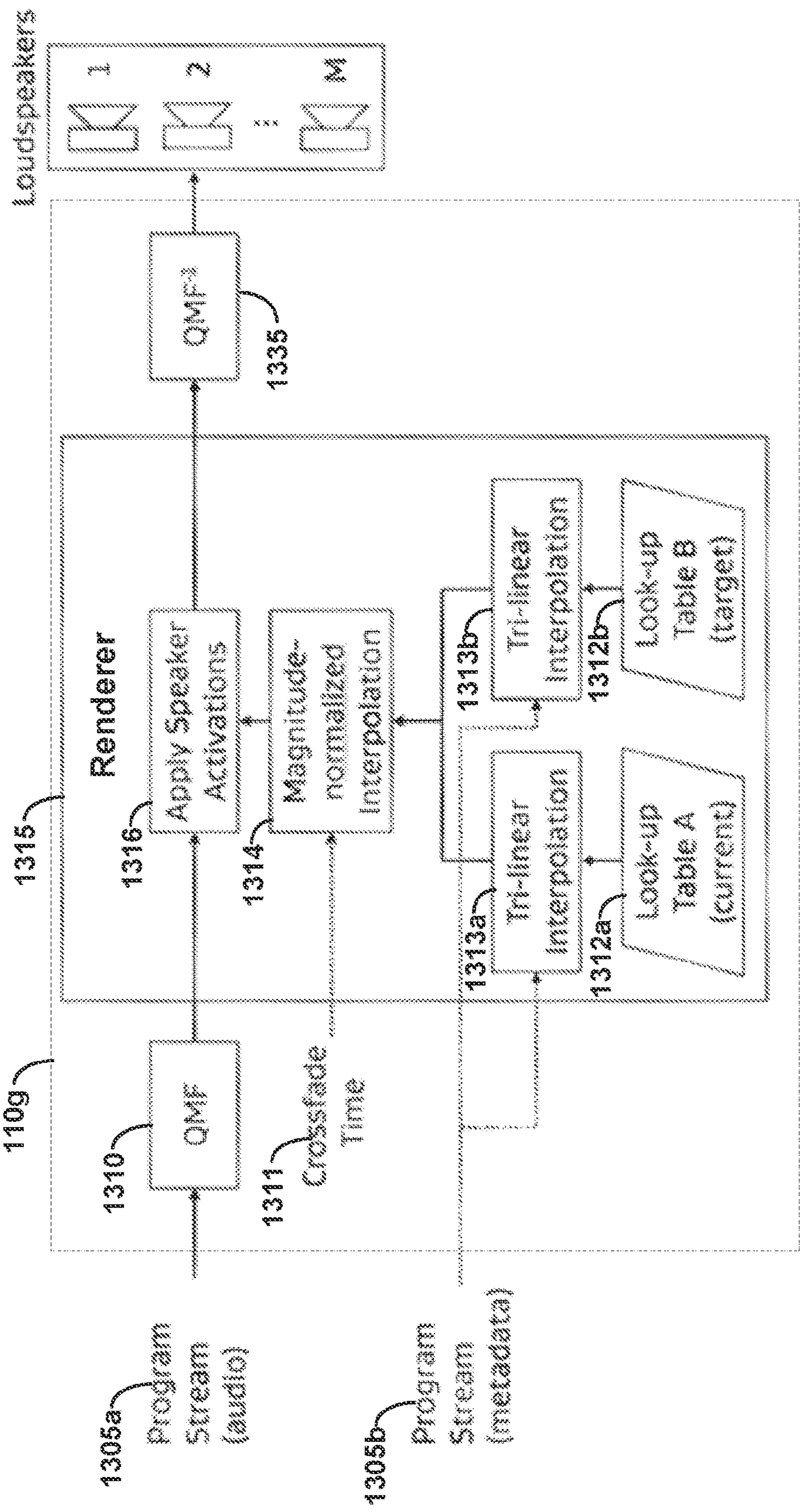
FIG. 13 presents blocks corresponding to an alternative implementation for managing transitions between rendering configurations.

FIG. 13 presents blocks corresponding to an alternative implementation for managing transitions between rendering configurations. As with other disclosed implementations, the number, arrangement and types of elements presented in FIG. 13 are merely made by way of example. According to this example, the renderer 1315, the QMF 1310 and the inverse QMF 1335 are implanted via a control system 110*g*, which is an instance of the control system 110 that is described above with reference to FIG. 1A. Here, the control system 110*g* is shown receiving a program stream, which includes program stream audio data 1305*a* and program stream metadata 1305*b* in this instance. In this example, only a single renderer instance is implemented for a given program stream, which is a more efficient implementation compared to implementation that maintain two or more renderer instances.

According to this implementation, the renderer 1315 maintains active data structures 1312*a* and 1312*b*, which are look-up tables A and B in this example. Each of the data structures 1312*a* and 1312*b* corresponds to a rendering configuration, or a version of a rendering configuration (such as a simplified version or a complete version). Table A corresponds to the current rendering configuration and Table B corresponds to a target rendering configuration. The data structures 1312*a* and 1312*b* may, for example, correspond to a set of speaker activations such as those shown in FIG. 9B and described above. In the example shown in FIG. 13, the target rendering configuration corresponds to a rendering transition indication that has been received by the control system 110*g*. In other words, the rendering transition indication was an indication for the control system 110*g* to transition from the current rendering configuration (corresponding to Table A) to a new rendering configuration. In some instances, Table B may correspond to a simplified version of the new rendering configuration. In other examples, Table B may correspond to a complete version of the new rendering configuration.

In this implementation, when the renderer 1315 is rendering an audio object, the renderer 1315 computes two sets of speaker activations for the audio object's position: here, one set of speaker activations for the audio object's position is based on Table A and the other set of speaker activations for the audio object's position is based on Table B. According to this example, tri-linear interpolation modules 1313*a* and 1313*b* are configured to determine the actual activations for each speaker. In some such examples, the tri-linear interpolation modules 1313*a* and 1313*b* are configured to determine the actual activations for each speaker according to a tri-linear interpolation process between the speaker activations of the nearest 8 points, as described above with reference to FIG. 10. Other implementations may use other types of interpolation. In still other implementations, the actual activations for each speaker may be determined according to the speaker activations of more than or fewer than the nearest 8 points.

In this example, module 1314 of the control system 110*g* is configured to determine a magnitude-normalized interpolation between the two sets of speaker activations, based at least in part on the crossfade time 1311. According to this example, module 1314 of the control system 110*g* is configured to determine a single table of speaker activations based on the interpolated values for Table A, received from the tri-linear interpolation module 1313*a*, and based on the interpolated values for Table B, received from the tri-linear interpolation module 1313*b*. In some examples, the rendering transition indication also indicated the crossfade time 1311, which corresponds to the transition times described above with reference to FIGS. 12A and 12B. However, in other examples the control system 110*g* will determine the crossfade time 1311, e.g., by accessing a stored crossfade time. In some instances, the crossfade time 1311 may be configurable according to user input to a device that includes the control system 110*g*.

In this implementation, module 1316 of the control system 110*g* is configured to compute a final set of speaker activations for each audio object in the frequency domain according to the magnitude-normalized interpolation. In this example, an inverse filterbank 1335 converts the final set of speaker activations to the time domain and provides speaker feed signals in the time domain to the loudspeakers 1 through M. In alternative implementations, the renderer 1315 may operate in the time domain.

Figure 14:
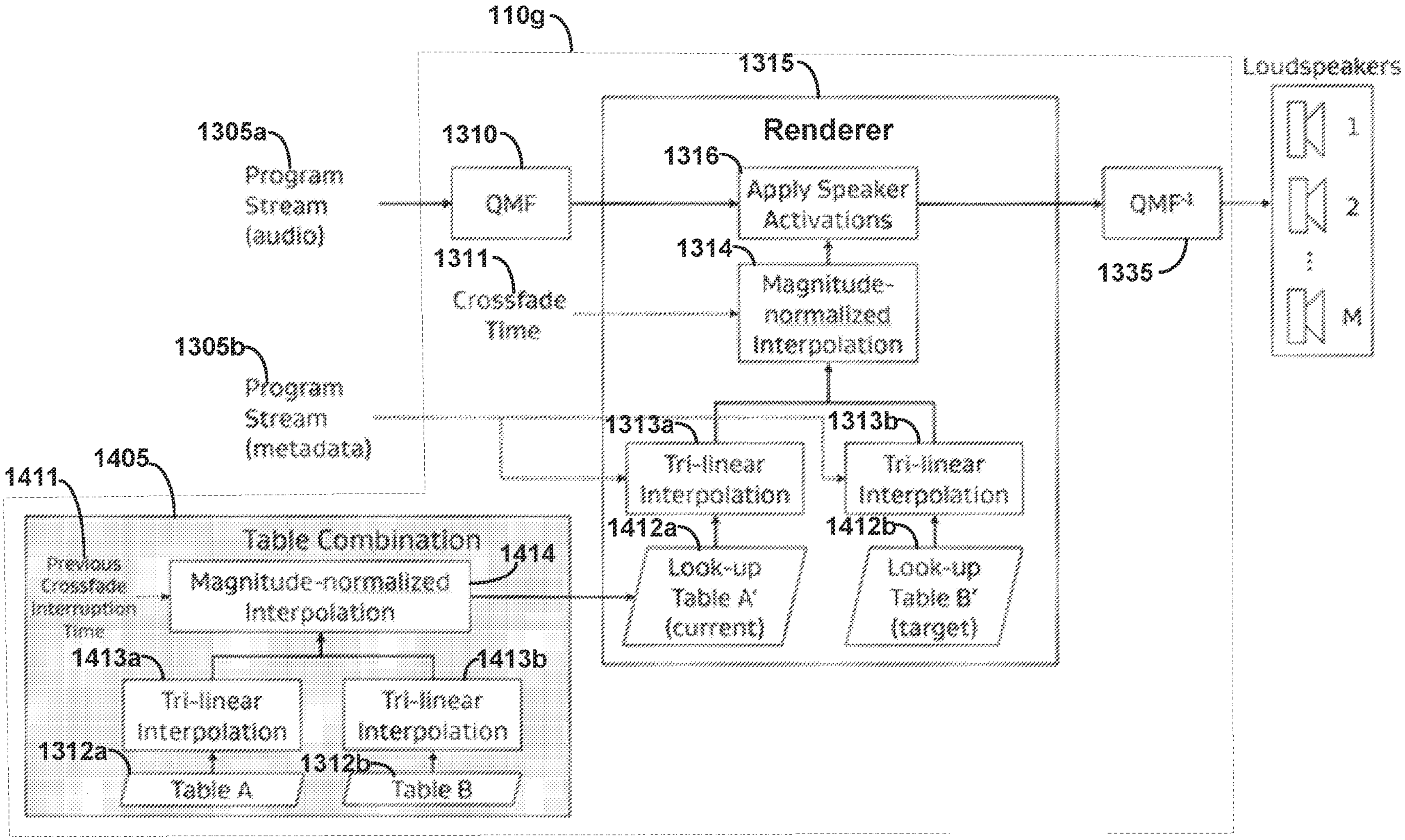
FIG. 14 presents blocks corresponding to another implementation for managing transitions between rendering configurations.

FIG. 14 presents blocks corresponding to another implementation for managing transitions between rendering configurations. As with other disclosed implementations, the number, arrangement and types of elements presented in FIG. 14 are merely made by way of example. In this example, FIG. 14 includes the blocks of FIG. 13, which may function as described above. However, in this example, the control system 110*g* is also configured to implement a table combination module 1405.

In some instances, e.g., as described above with reference to FIG. 12B, a transition from a first rendering configuration to a second rendering configuration may be interrupted. In some such examples, a second rendering transition indication may be received during a time interval during which a system is transitioning from the first rendering configuration to the second rendering configuration. The second rendering transition indication may, for example, indicate a transition to a third rendering configuration.

According to some examples, the table combination module 1405 may be configured to process interruptions of rendering configuration transitions. In some such examples, if a rendering configuration transition is interrupted by another rendering transition indication, the table combination module 1405 may be configured to combine the above-described data structures 1312*a* and 1312*b* (the previous two look-up tables A and B), to create a new current look-up table A' (data structure 1412*a*). In some such implementations, the control system 110*g* is configured to replace the data structure 1312*b* with a new target look-up table B' (the data structure 1412*b*). The new target look-up table B' may, for example, correspond with a third rendering configuration.

In some examples, block 1414 of the table combination module 1405 may be configured to implement the combination operation by applying the same magnitude-normalized interpolation mechanism at each point of the A and B tables, following an interpolation process: in this implementation, the interpolation process involves separate tri-linear interpolation processes performed on the contents of Tables A and B by block 1413*a* and 1413*b*, respectively. The interpolation process may be based, at least in part, on the time at which the previous rendering configuration transition was interrupted (as indicated by previous crossfade interruption time 1411 of FIG. 14).

According to some implementations, the new current look-up table A' (data structure 1412*a*) may optionally have reduced dimensions compared to one or more of the previous tables (A and/or B). The choice of dimensions for A' allows for a trade-off between the complexity of the one-time calculation vs. quality during the transition to the new rendering configuration associated with the new target look-up table B'. After the target table B is replaced by the new target table B', in some instances the table combination module 1405 may be configured to continue live interpolation between the tables until the rendering configuration transition is completed. In some implementations, the table combination module 1405 (e.g., in combination with other disclosed features) may be configured to process multiple rendering configuration transition interruptions with no discontinuities.

Progressive calculation and application of rendering configurations is a way of meeting the low-latency objectives desirable for a good user experience without sacrificing the quality of a flexible rendering configuration, e.g., a flexible rendering configuration that optimizes playback for a heterogenous set of arbitrarily-placed audio devices. Given a set of constraints associated with a particular rendering configuration, some disclosed methods involve calculating a lower-complexity solution (e.g., a lower-complexity version of a rendering configuration) in parallel with a higher-complexity solution (e.g., a higher-complexity version of the rendering configuration). The dimensions of the lower-complexity version of the rendering configuration may, for example, be chosen such that the lower-complexity version of the rendering configuration may be computed with minimal latency. The higher-complexity solution may, in some instances, be computed in parallel. According to some such examples, as soon as the lower-complexity version of the rendering configuration is available, the rendering configuration transition may begin, e.g., using the methods described above. At a later time, when the higher-complexity version of the rendering configuration becomes available, the transition to the lower-complexity version of the rendering configuration can be interrupted (if the rendering configuration transition is not already complete) with a transition to the higher-complexity version of the rendering configuration, e.g., as described above.

Table 1, below, provides some example dimensions for high- and low-complexity rendering configuration look-up tables, to illustrate the order of magnitude of the difference in their calculation.

TABLE 1

| Configuration Type | x | y | z | Frequencies (N) | Cost Functions to Minimize |
|---|---|---|---|---|---|
| Lower-complexity | 3 | 3 | 2 | 1 | 18 |
| Higher-complexity | 9 | 9 | 5 | 20 | 8,100 |

Additional Examples of Frequency Domain Implementations

Figure 15:
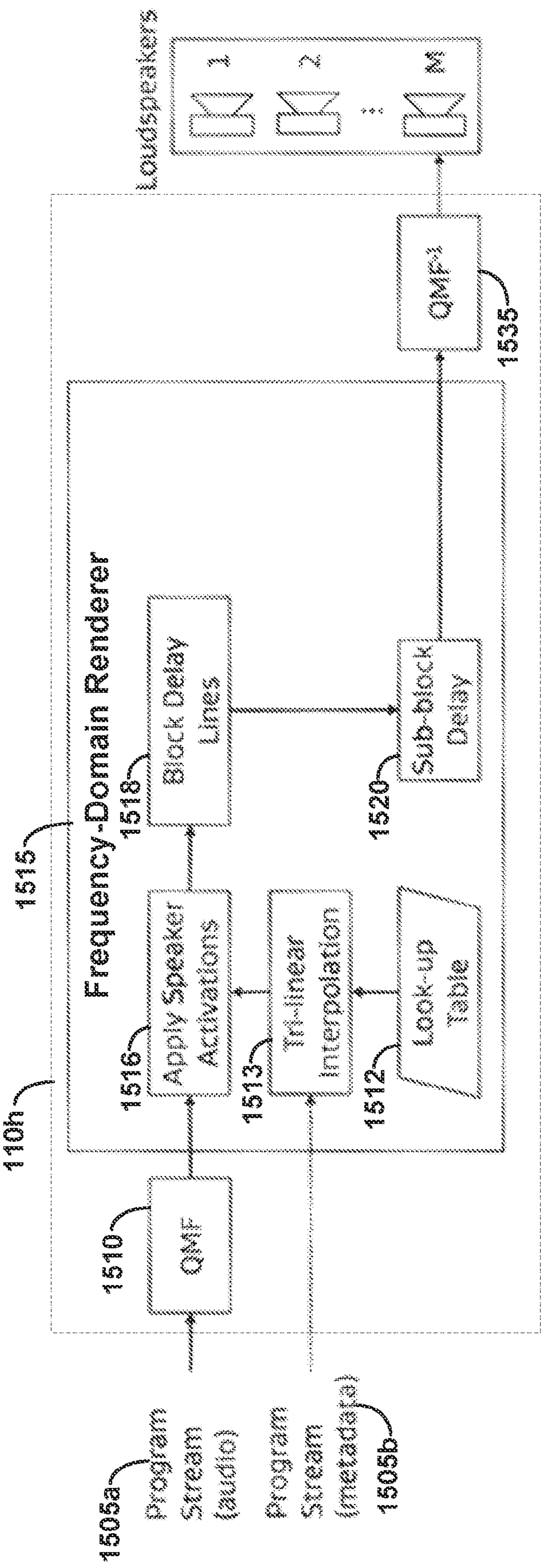
FIG. 15 presents blocks corresponding to a frequency-domain renderer according to one example.

FIG. 15 presents blocks corresponding to a frequency-domain renderer according to one example. As with other disclosed implementations, the number, arrangement and types of elements presented in FIG. 15 are merely made by way of example. According to this example, the frequency-domain renderer 1515, the QMF 1510 and the inverse QMF 1535 are implemented via a control system 110*h*, which is an instance of the control system 110 that is described above with reference to FIG. 1A. Here, the control system 110*h* is shown receiving a program stream, which includes program stream audio data 1505*a* and program stream metadata 1505*b* in this instance. Unless specified otherwise, the reader may assume that the blocks 1510, 1512, 1513, 1516 and 1535 of FIG. 15 provide the functionality of the blocks 1310, 1312, 1313, 1316 and 1335 of FIG. 13.

In this example, the frequency-domain renderer 1515 is configured to apply a set of speaker activations to the program stream audio data 1505*a* to generate M outputs, one for each of loudspeakers 1 through M. In addition to speaker activations, in this example the frequency-domain renderer 1515 is configured to apply varying delays to the M outputs, for example to time-align the arrival of sound from each loudspeaker to a listening position. These delays may be implemented as any combination of sample and group delay, e.g., in the case that the M speaker activations are represented by time-domain filter coefficients. In some examples wherein rendering is implemented in the frequency domain, the M speaker activations may be represented by N frequency domain filter coefficients, and the delays may be represented by a combination of transform block delays (implemented via transform block delay lines module 1518 in the example of FIG. 15) and a residual linear phase term (sub-block delay) applied by the frequency domain filter coefficients (implemented via sub-block delay module 1520 in the example of FIG. 15). According to some examples, the sub-block delays may be implemented as a simple complex multiplier per band of the filterbank, the complex values for each band being chosen according to a linear phase term with a slope equal to the negative of the sub-block delay. For a more accurate result, the sub-block delays may be implemented with higher precision multi-tap filters operating across blocks of the filterbank.

Figure 16:
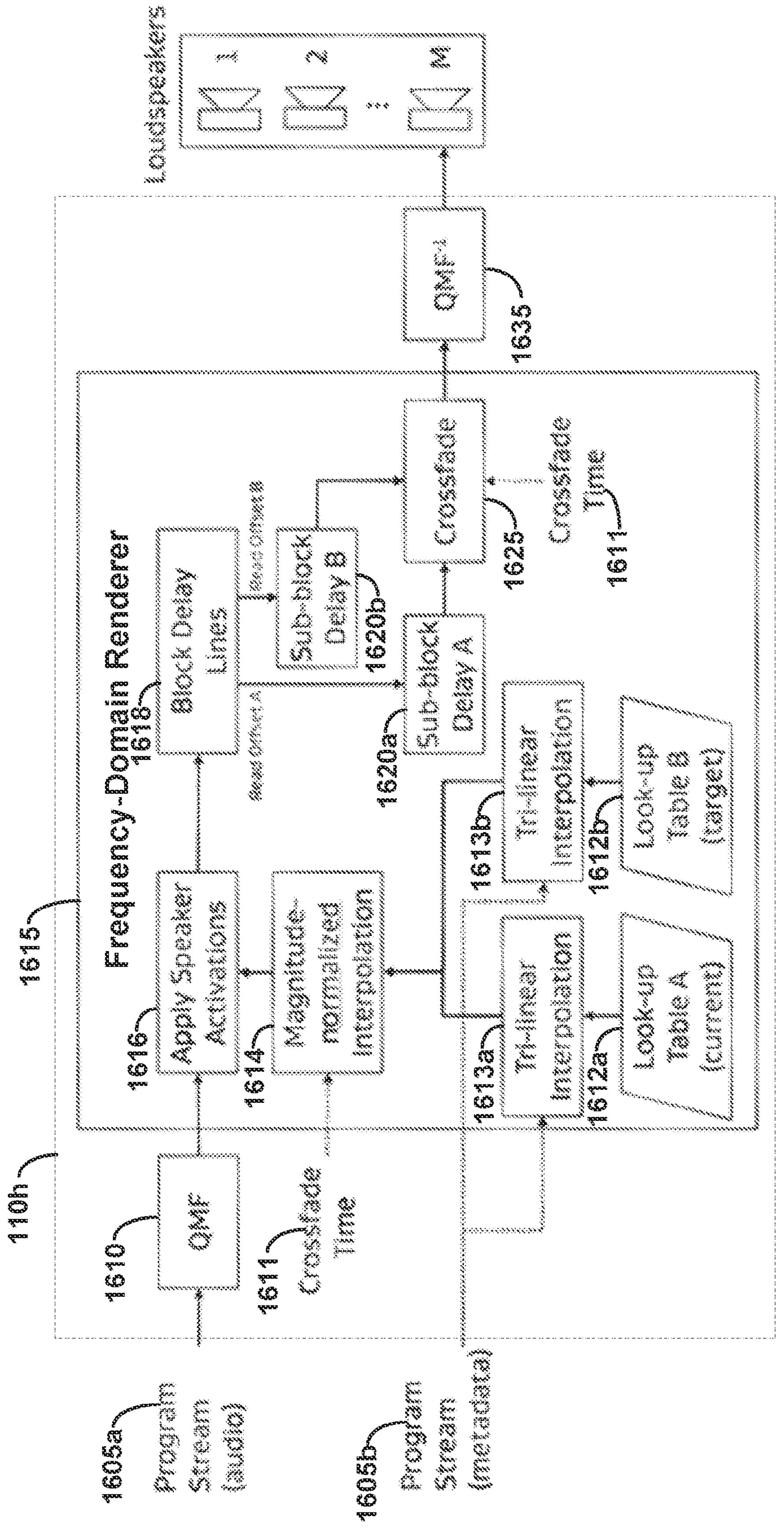
FIG. 16 presents blocks corresponding to another implementation for managing transitions between rendering configurations.

FIG. 16 presents blocks corresponding to another implementation for managing transitions between rendering configurations. As with other disclosed implementations, the number, arrangement and types of elements presented in FIG. 16 are merely made by way of example. According to this example, the frequency-domain renderer 1615, the QMF 1610 and the inverse QMF 1635 are implanted via a control system 110*h*, which is an instance of the control system 110 that is described above with reference to FIG. 1A. Here, the control system 110*h* is shown receiving a program stream, which includes program stream audio data 1605*a* and program stream metadata 1605*b* in this instance.

In order to support rendering configuration transitions that can be continuously and arbitrarily interrupted, without discontinuities, the aforementioned approach to interpolating the speaker activations may be used, as described above with reference to FIG. 13. In the example shown in FIG. 16, as in the example described above with reference to FIG. 13, there are 2 active rendering configurations, each with its own data structure (data structures 1612*a* and 1612*b*, also referred to in FIG. 16 as look-up tables A and B). Accordingly, unless specified otherwise the reader may assume that blocks 1610, 1612*a*, 1612*b*, 1613*a*, 1613*b*, 1616 and 1635 of FIG. 16 provide the functionality of blocks 1310, 1312*a*, 1312*b*, 1313*a*, 1313*b*, 1316 and 1335 of FIG. 13. Moreover, unless specified otherwise, the reader may assume that block 1618 of FIG. 16 provides the functionality of transform block delay lines module 1518 of FIG. 15.

For example, module 1614 of the control system 110*g* may be configured to determine a magnitude-normalized interpolation between the two sets of speaker activations, based at least in part on the crossfade time 1611. According to this example, module 1614 of the control system 110 is configured to determine a single table of speaker activations based on the interpolated values for Table A, received from the tri-linear interpolation module 1613*a*, and based on the interpolated values for Table B, received from the tri-linear interpolation module 1613*b*. In this implementation, module 1616 of the control system 110*g* is configured to compute a final set of speaker activations for each audio object in the frequency domain according to the table of speaker activations determined by module 1614. Here, module 1616 outputs speaker feeds, one for each of the loudspeakers 1 through M, to the transform block delay lines module 1618.

According to this example, the transform block delay lines module 1618 applies a set of delay lines, one delay line for each speaker feed. As in the example described above with reference to FIG. 15, the delays may be represented by a combination of transform block delays (implemented via transform block delay lines 1618 in the example of FIG. 16) and a residual linear phase term (a sub-block delay, which also may be referred to herein as a sub-block delay filter) applied according to the frequency domain filter coefficients. In this example, the sub-block delays are residual phase terms that allow for delays that are not exact multiples of a frequency domain transform block size.

According to this example, each active rendering configuration also has its own corresponding delays and read offsets. Here, the read offset A is for the rendering configuration (or rendering configuration version) corresponding to table A and the read offset B is for the rendering configuration (or rendering configuration version) corresponding to table B. According to some examples, "read offset A" corresponds to a set of M read offsets associated with rendering configuration A, with one read offset for each of M channels. In such examples, "read offset B" corresponds to a set of M read offsets associated with rendering configuration B. In such implementations, the comparison of the delays and choice of using a unity power sum or a unity amplitude sum may be made on a per-channel basis. As described above, according to some examples, after reading from each delay line an additional filtering stage is used to implement the sub-block delays associated with the rendering configurations corresponding to tables A and B. In in this example, the sub-block delays for the active rendering configuration corresponding to look-up table A are implemented by the sub-block delay module 1620*a* and the sub-block delays for the active rendering configuration corresponding to look-up table B are implemented by the sub-block delay module 1620*b*.

In this example, the multiple delayed sets of speaker feeds for each configuration (the outputs of the sub-block delay module 1620*a* and the sub-block delay module 1620*b*) are crossfaded, by the crossfade module 1625, to produce a single set of M output speaker feeds. In some examples, the crossfade module 1625 may be configured to apply crossfade windows for each rendering configuration. According to some implementations, the crossfade module 1625 may be configured to select crossfade windows based, at least in part, on the delay line read offsets A and B.

There are many possible symmetric crossfade window pairs that may be used. Accordingly, the crossfade module 1625 may be configured to select crossfade window pairs in different ways, depending on the particular implementation. In some implementations, the crossfade module 1625 may be configured to select the crossfade windows to have a unity power sum if the delay line read offsets A and B are not identical, so far as can be determined according to the transform block size sample. Practically speaking, the read offsets A and B will appear to be identical if the total delays for rendering configuration A and B are within the transform block size samples of each other. For example, if the transform block includes 64 samples the corresponding time interval would be approximately 1.333 milliseconds at a 48 kHz sampling rate. differ by more than a threshold amount. According to some examples, this condition may be expressed as follows:

$$w(i)^2+(1-w(i))^2=1 \tag{30}$$

In Equation 30, i represents a block index that correlates to time, but is in the frequency domain. One example of w(i) that meets the criteria of Equation 30 is:

$$w(i)=\cos\left(i*\frac{\pi}{2}\right) \tag{31}$$

Figure 17:
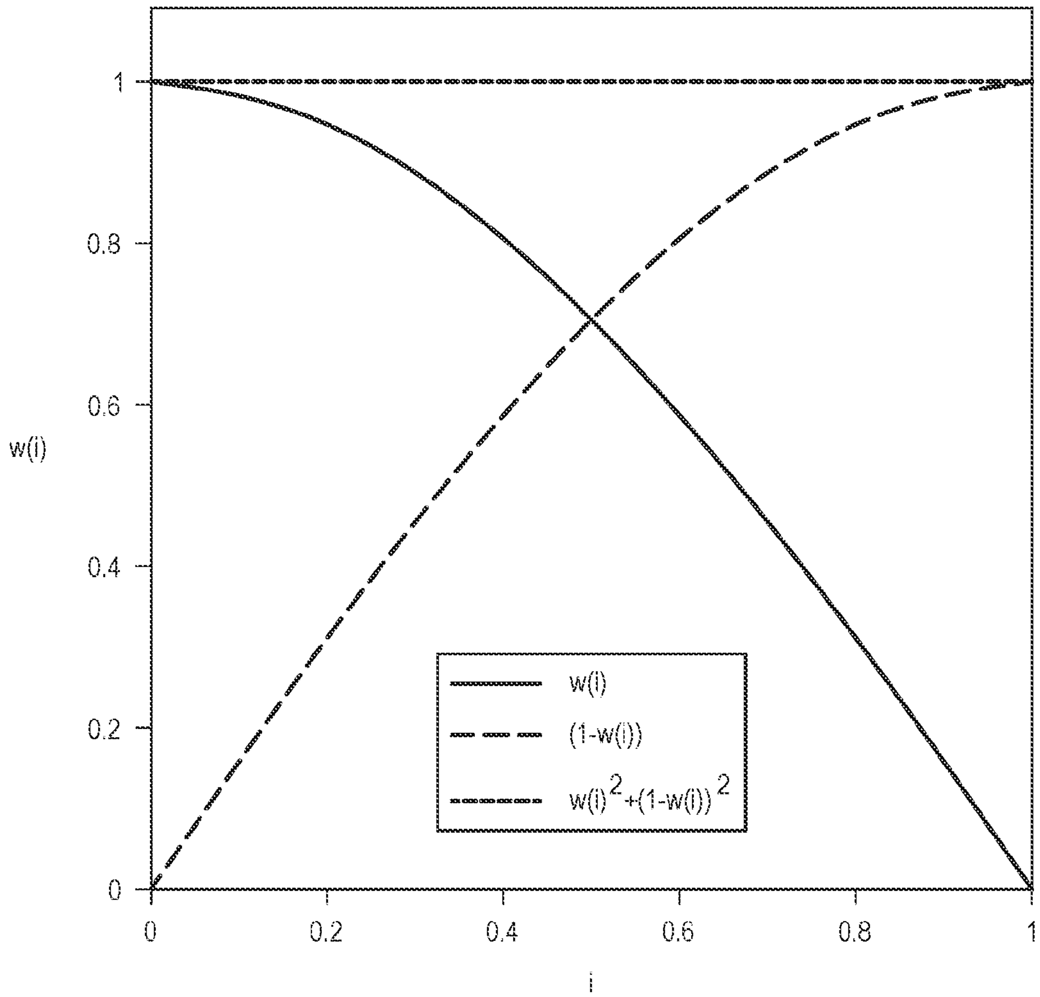
FIG. 17 shows an example of a crossfade window pair having a unity power sum.

FIG. 17 shows an example of a crossfade window pair having a unity power sum. In this example, the pair of windows w(i) and (1−w(i)) presented in FIG. 17 is based on Equation 31.

However, if the read offsets A and B, as shown in FIG. 16, are equal for a given output channel, it means the total delay (combined block and sub-block delay) associated with the given channel of rendering configurations A and B is similar (e.g. within a transform block size number of samples). In this case, the crossfade windows should have a unity amplitude sum (also referred to herein as a "unity sum") instead of a unity power sum, because the signals being combined will likely be highly correlated. Some examples of w(i) that meet the unity-sum criterion are as follows:

$$w(i)=i \tag{32}$$

$$w(i)=\cos\left(i*\frac{\pi}{2}\right)^2 \tag{33}$$

Figure 18A:
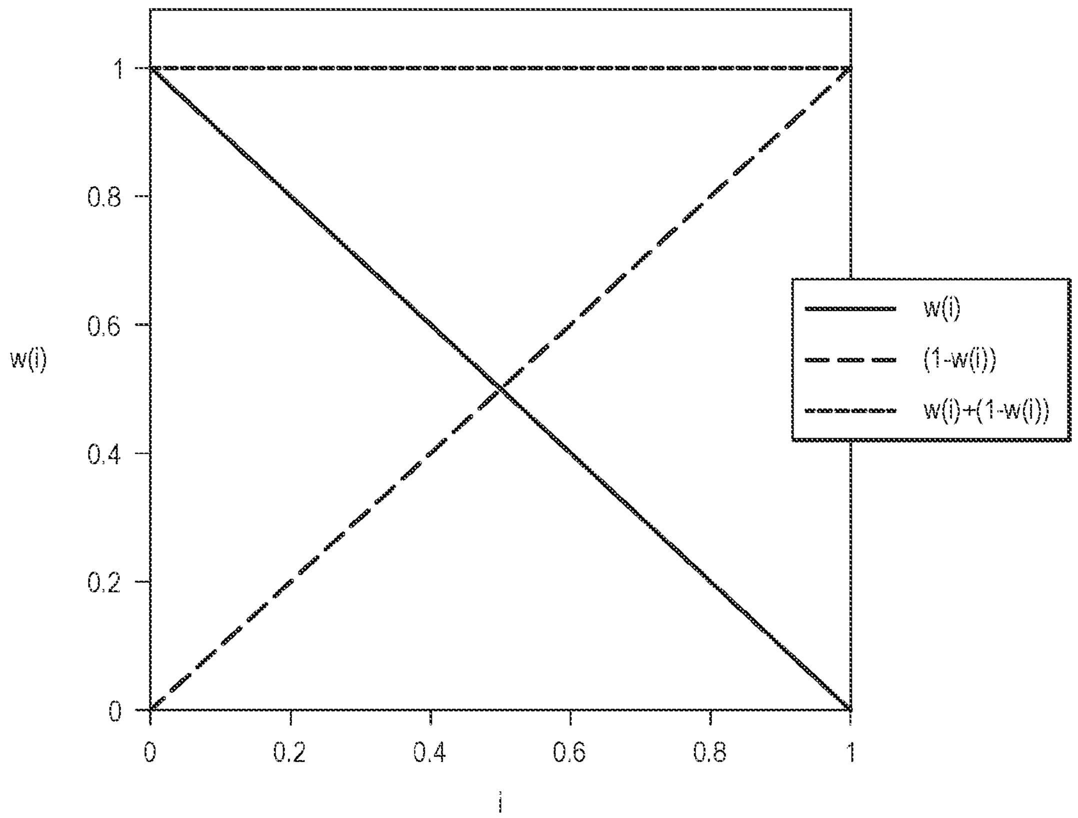
FIGS. 18A and 18B present examples of crossfade window pairs having unity sums.
Figure 18B:
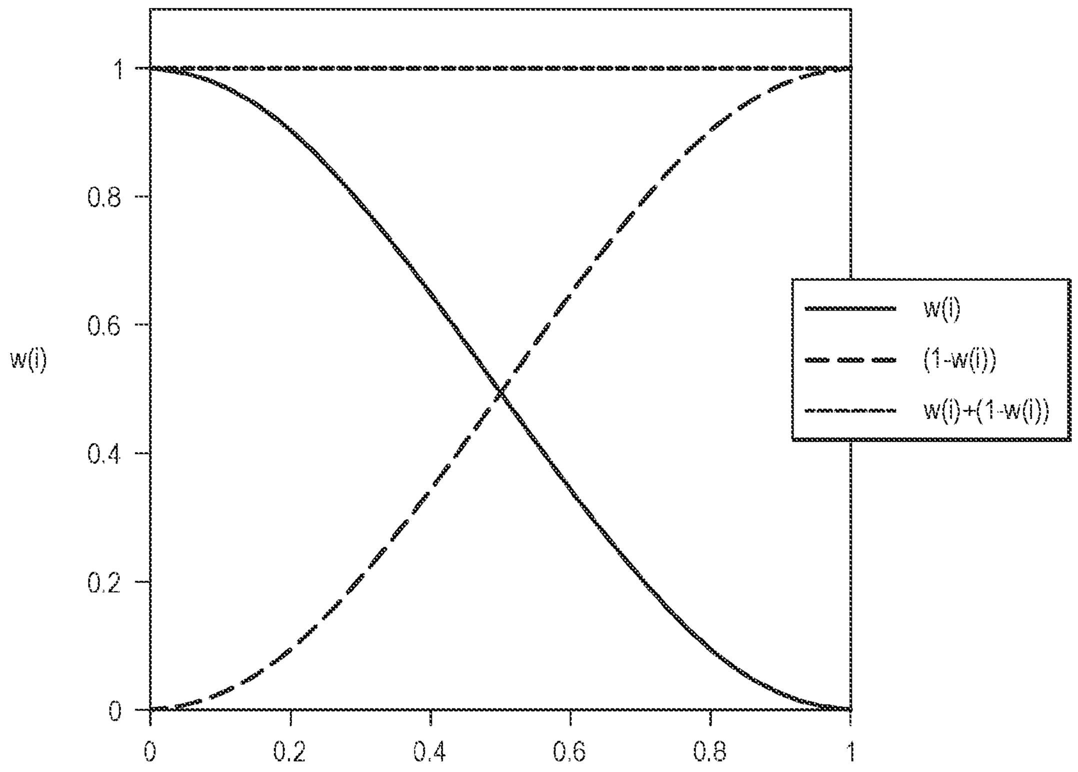

FIGS. 18A and 18B present examples of crossfade window pairs having unity amplitude sums. FIG. 18A shows an example of crossfade window pairs having a unity sum according to Equation 32. FIG. 18B shows an example of crossfade window pairs having a unity sum according to Equation 33.

The previous crossfade window examples are straightforward. However a more generalized approach to window design may be needed for the crossfade module 1625 of FIG. 16 to be able to process rendering configuration transitions that can be continuously and arbitrarily interrupted, without discontinuities. During each interruption of a rendering configuration transition, an additional read from the block delay lines may be needed. In an implementation such as that shown in FIG. 16, if a transition from rendering configuration A to rendering configuration B were interrupted by the receipt of a second rendering transition indication indicating a transition to a rendering configuration C, 3 block delay line reads and three read offsets will be involved, and the crossfade module 1625 should implement a 3-part crossfade window.

Figure 19:
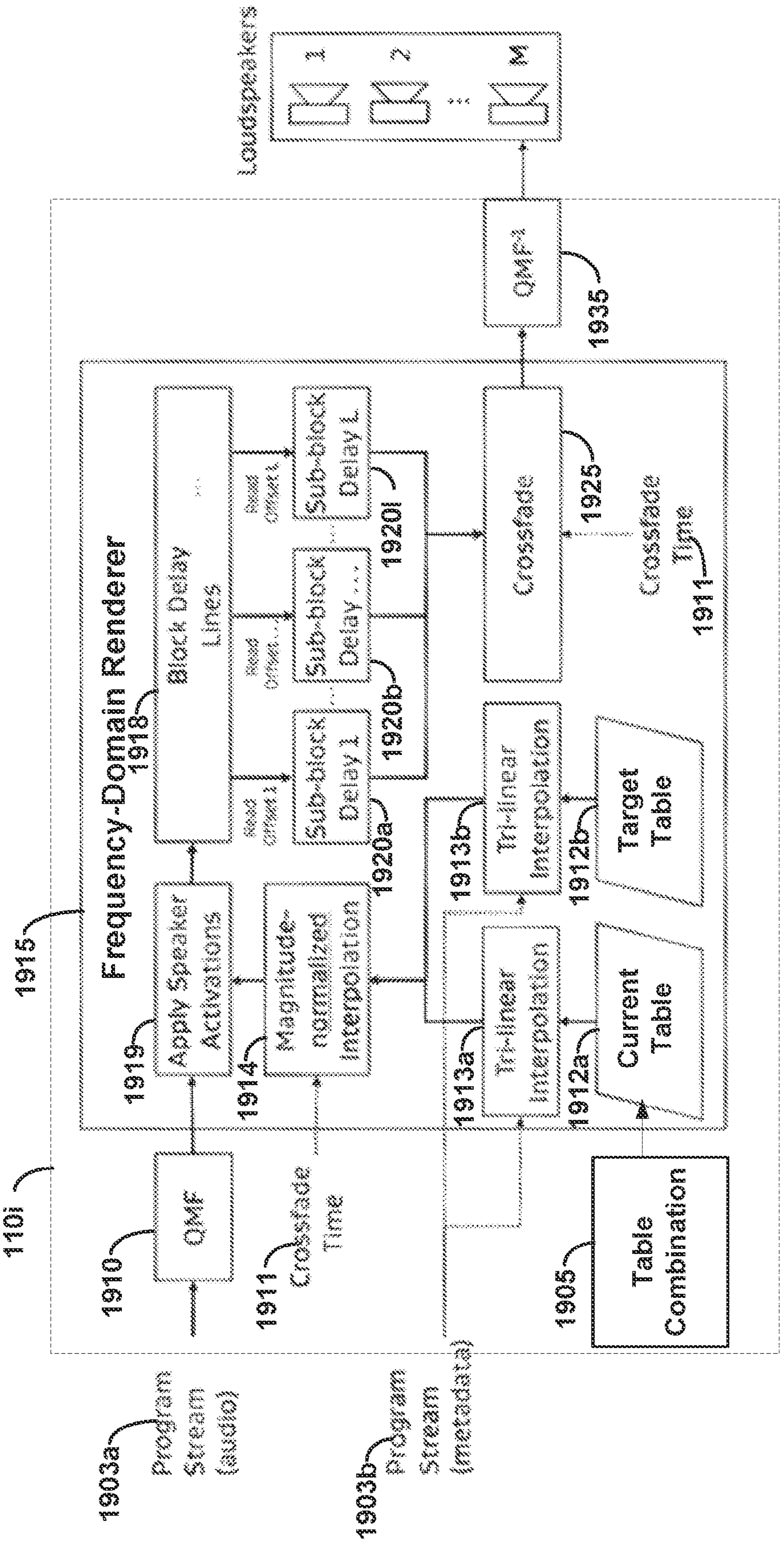
FIG. 19 presents blocks corresponding to another implementation for managing transitions between first through $L^{th}$ sets of speaker activations.

FIG. 19 presents blocks corresponding to another implementation for managing transitions between first through $L^{th}$ sets of speaker activations. In this example, L is an integer greater than two. As with other disclosed implementations, the number, arrangement and types of elements presented in FIG. 19 are merely made by way of example. According to this example, the frequency-domain renderer 1915, the QMF 1910 and the inverse QMF 1935 are implanted via a control system 110*i*, which is an instance of the control system 110 that is described above with reference to FIG. 1A. Here, the control system 110*i* is shown receiving a program stream, which includes program stream audio data 1903*a* and program stream metadata 1903*b* in this instance.

The L sets of speaker activations may, in some examples, correspond to L rendering configurations. However, as noted elsewhere herein, some implementations may involve multiple sets of speaker activations corresponding to multiple versions of a single rendering configuration. For example, a first set of speaker activations may be for a simplified version of a rendering configuration and a second set of speaker activations may be for a complete version of the rendering configuration. In some such examples, a single rendering transition indication may result in a first transition to the simplified version of the rendering configuration and a second transition to the complete version of the rendering configuration.

Therefore, in the examples described with reference to FIG. 19 (as well as other examples disclosed herein), there may or may not be the same numerical relationships between transition indications, speaker activation sets and rendering configurations. If there will be a simplified-to-complete transition responsive to a received rendering transition indication, two sets of speaker activations may be determined for the rendering transition indication and there may be two transitions corresponding to the rendering transition indication. However, if there will be no simplified-to-complete transition responsive to a rendering transition indication, one set of speaker activations may be determined for the rendering transition indication and there may be only one transition corresponding to the rendering transition indication.

For the sake of simplicity, the following discussion will assume that the L sets of speaker activations of FIG. 19 correspond to L rendering configurations. In order to support rendering configuration transitions that can be continuously and arbitrarily interrupted, without discontinuities, the above-described approaches to interpolating the speaker activations may be used (for example, as described above with reference to FIGS. 13, 14 and 16). Accordingly, unless specified otherwise the reader may assume that blocks 1910, 1912*a*, 1912*b*, 1913*a*, 1913*b*, 1916 and 1935 of FIG. 19 provide the functionality of blocks 1610, 1612*a*, 1612*b*, 1613*a*, 1613*b*, 1616 and 1635 of FIG. 16. Moreover, unless specified otherwise, the reader may assume that block 1918 of FIG. 19 provides the functionality of block 1618 of FIG. 16.

In the example shown in FIG. 16, there are 2 active rendering configurations, each with a corresponding data structure (data structures 1612*a* and 1612*b*, also referred to in FIG. 16 as look-up tables A and B) and each with a corresponding sub-block delay module (sub-block delay modules 1620*a* and 1620*b*). In the example shown in FIG. 19, there are L active rendering configurations, each with a corresponding sub-block delay module (sub-block delay modules 1920*a*-19201).

However, in the example shown in FIG. 19, there are still only two current rendering configuration data structures: the data structure 1912*a* corresponds to a current rendering configuration (which may be a transitional rendering configuration) and the data structure 1912*b* corresponds to a target rendering configuration (which is the rendering configuration L in this example). This efficiency is made possible by the scalability of the implementation that is described above with reference to FIG. 14: in the example shown in FIG. 19, the control system 110*i* is also configured to implement a table combination module 1905, which may function as described above with reference to the table combination module 1405 of FIG. 14. Therefore, in this example only two active look-up tables are implemented, regardless of the number of interruptions and regardless of the number of active rendering configurations.

According to the example shown in FIG. 19, the crossfade module 1925 is configured to implement an L-part crossfade window. The design of an L-part crossfade window set should take into account which of the L block delay lines reads have matching read-offsets and which have different read-offsets (so far as can be determined given the transform block size). The crossfade window set design should also account for the values of the (L−1) rendering configurations that were part of the previous crossfade window set at the time of a given interruption (i_0), to ensure smooth transitions.

In some implementations, the following approach may be used to design an L-part crossfade window set.

1. Given a symmetric pair of decaying and rising window functions w(i) and 1−w(i)), the first L−1 windows (the windows corresponding with the current rendering configuration(s)) may initially be set to the decaying function w(i) while the last window L (the window corresponding with the target rendering configuration) may be set to the rising function 1−w(i).
2. The L−1 decaying windows may be scaled by the previous window values at the time of the last interruption ($i_0$). As noted above, i represents a block index that correlates to time, but is in the frequency domain. Accordingly, $i_0$ may be a sample in the frequency domain, or a block of samples, that correspond(s) to a point in time.
3. The set of L windows ($l_{1 \ldots L}(i)$) may be grouped into K groups by summing windows with matching read offsets. K may range from 1 to L. If none of the read offsets match, there will be L groups. If all of the read offsets match, there will be 1 group.

4. The sum of the powers for each of the K window groups ($k_{1 \ldots K}(i)$) is computed, e.g., as follows:

$$p(i) = \sum_{j=1}^{K} (k_j(i))^2 \tag{34}$$

5. A normalization function may then be computed as one over the sum of the powers of the K window groups:

$$n(i) = \frac{1}{p(i)} \tag{35}$$

6. The square root of the normalization function may be used to scale the original set of L windows, which ensures that the sum of the powers of the window groups will be unity:

$$l_{1 \ldots L}(i) = \sqrt{n(i)}\,(l_{1 \ldots L}(i)). \tag{36}$$

In some implementations, the more generalized formulation of the power-sum constraint shown in equation 36 supersedes that of equation 31. Using this approach means that the choice of w(i) will impact the shape of a simple power-preserving crossfade window pair used in a direct, non-interrupted transition.

One approach to choosing w(i) is to combine equations 32 and 33:

$$w(i) = \propto * i + (1 - \propto) * \cos\left(i * \frac{\pi}{2}\right)^2 \tag{37}$$

By selecting an appropriate value for cc (such as ∝=0.75), and using equation 37 as the base window function w(i) in the L-part crossfade design algorithm described in the previous paragraph, one may arrive at a power-preserving crossfade window pair that resembles equation 31 and a linear crossfade window pair that resembles equation 33.

Figure 20A:
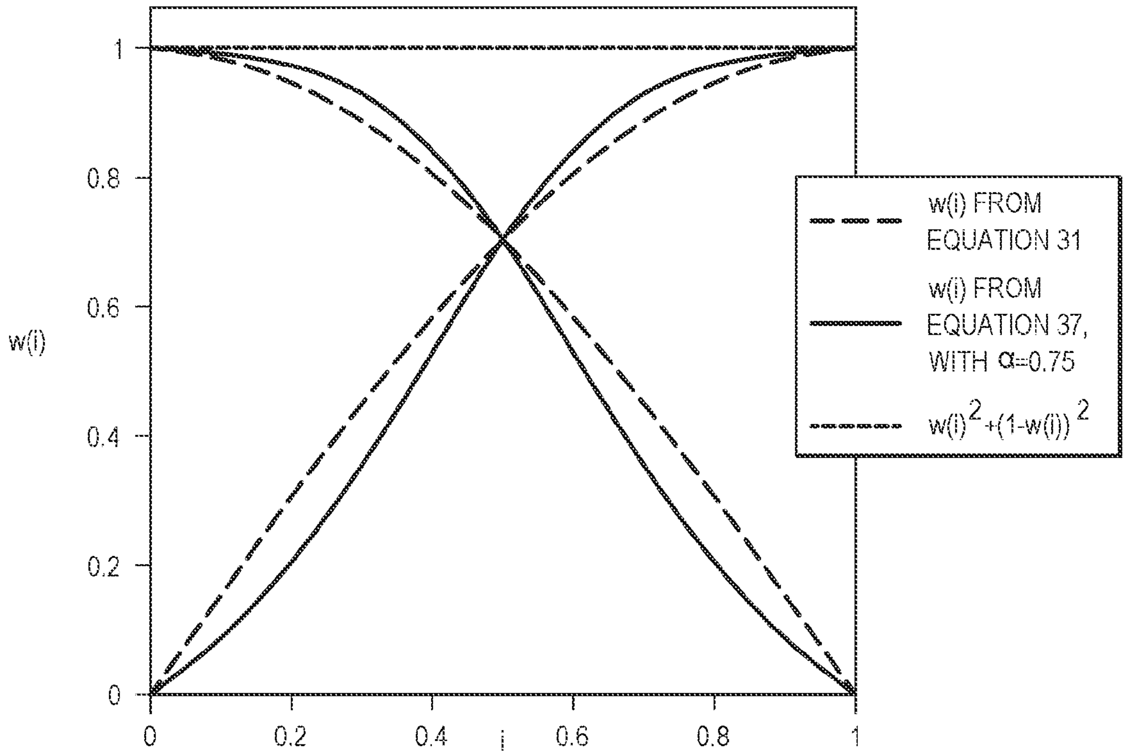
FIG. 20A shows examples of crossfade window pairs with unity power sums.

FIG. 20A shows examples of crossfade window pairs with unity power sums according to equations 31 and 37, with ∝=0.75. Other examples may have other values of ∝, such as 0.60, 0.65, 0.70, 0.80, 0.85, etc.

Figure 20B:
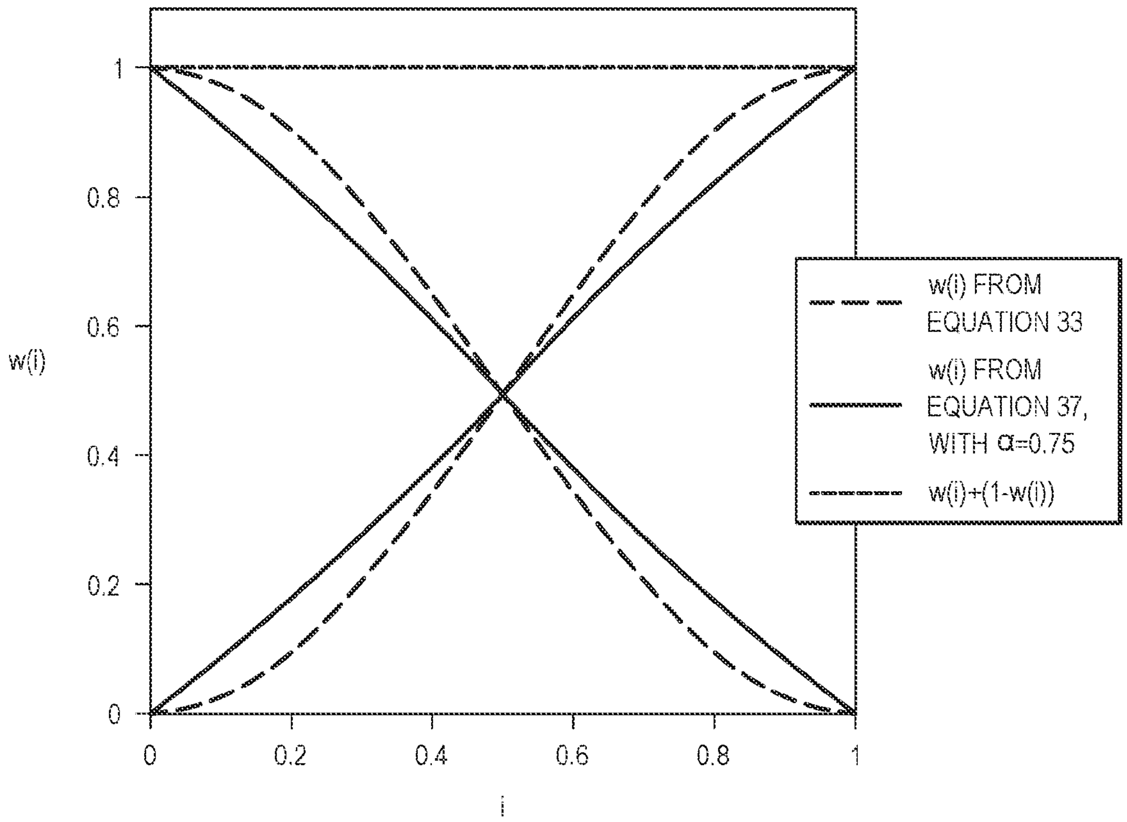
FIG. 20B shows examples of crossfade window pairs with unity sums.

FIG. 20B shows examples of crossfade window pairs with unity sums according to equations 33 and 37, with ∝=0.75. Other examples may have other values of ∝.

FIGS. 21, 22, 23, 24 and 25 are graphs that present examples of crossfade windows with none, some or all of the read offsets matching. In these examples, the crossfade windows were designed using equations 34-37, the y axis represents w(i) and the x axis represents i. As noted above, i represents a block index that correlates to time, but is in the frequency domain.

In these examples, during a time interval corresponding with $0 \leq i < i_1$, a first rendering configuration transition from rendering configuration A to rendering configuration B was taking place. The first rendering configuration transition may, for example, have been responsive to a first rendering transition indication. According to these examples, at or near a time corresponding with $i_1$, the first rendering configuration transition is interrupted by the receipt of a second rendering transition indication, indicating a transition to rendering configuration C.

In these examples, during a time interval corresponding with $i_1$, $0 \leq i < i_2$ and without requiring the transition to rendering configuration B to be completed, a second rendering configuration transition, to rendering configuration C, takes place.

According to these examples, at or near a time corresponding with $i_2$, the second rendering configuration transition is interrupted by the receipt of a third rendering transition indication, indicating a transition to rendering configuration D. In these examples, during a time interval corresponding with $i_2 \leq i < 1$ and without requiring the transition to rendering configuration C to be completed, a third rendering configuration transition, to rendering configuration D, takes place. In these examples, the third rendering configuration transition is completed at a time corresponding with i=1.

Figure 21:
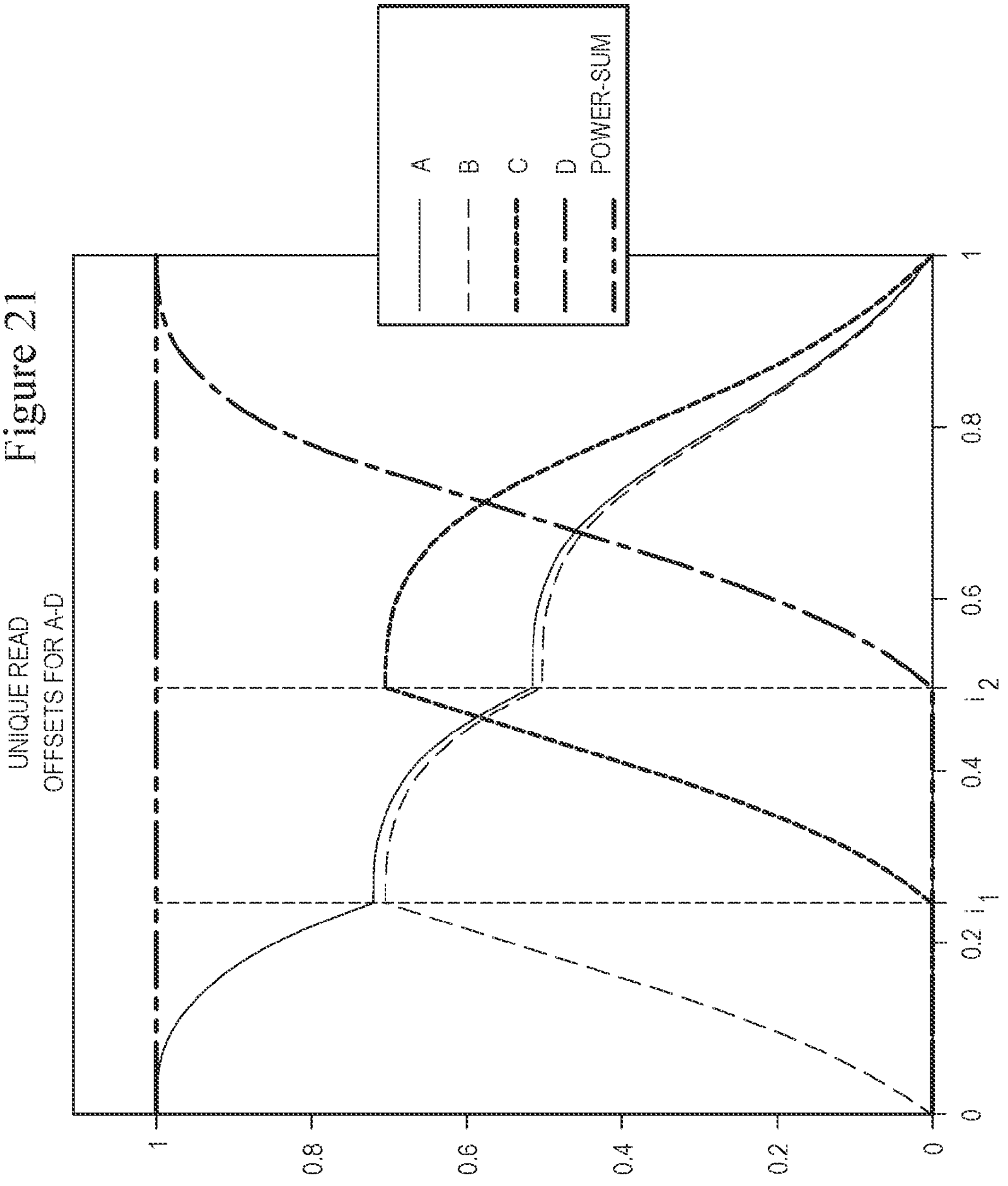
FIGS. 21, 22, 23, 24 and 25 are graphs that present examples of crossfade windows with none, some or all of the read offsets matching.

In the example presented in FIG. 21, none of the read offsets for rendering configurations A-D match. Accordingly, the crossfade windows for all rendering configuration transitions have been selected to have a unity power sum.

Figure 22:
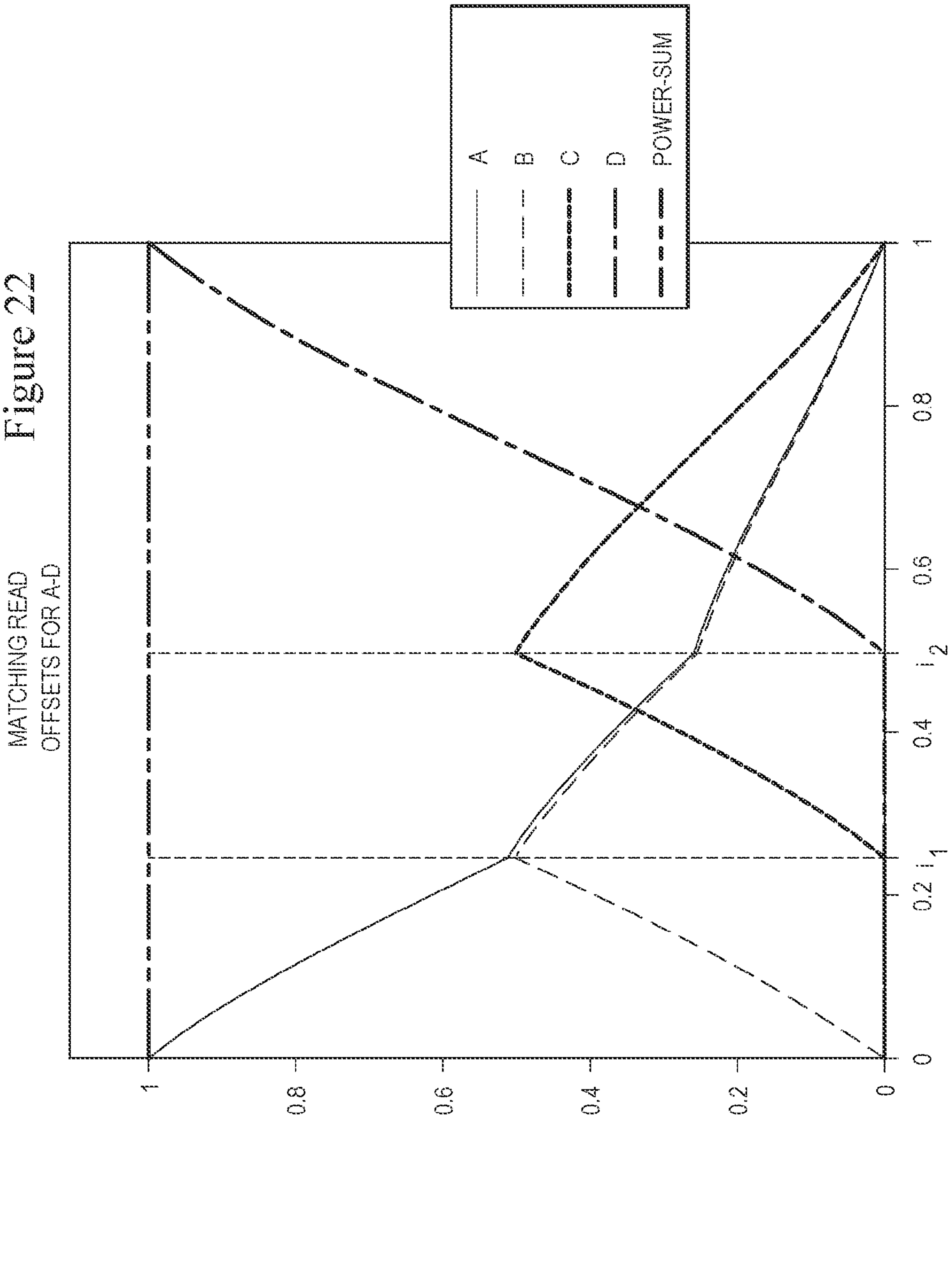

According to the example presented in FIG. 22, all of the read offsets for rendering configurations A-D match. Therefore, the crossfade windows for all rendering configuration transitions have been selected to have a unity sum.

Figure 23:
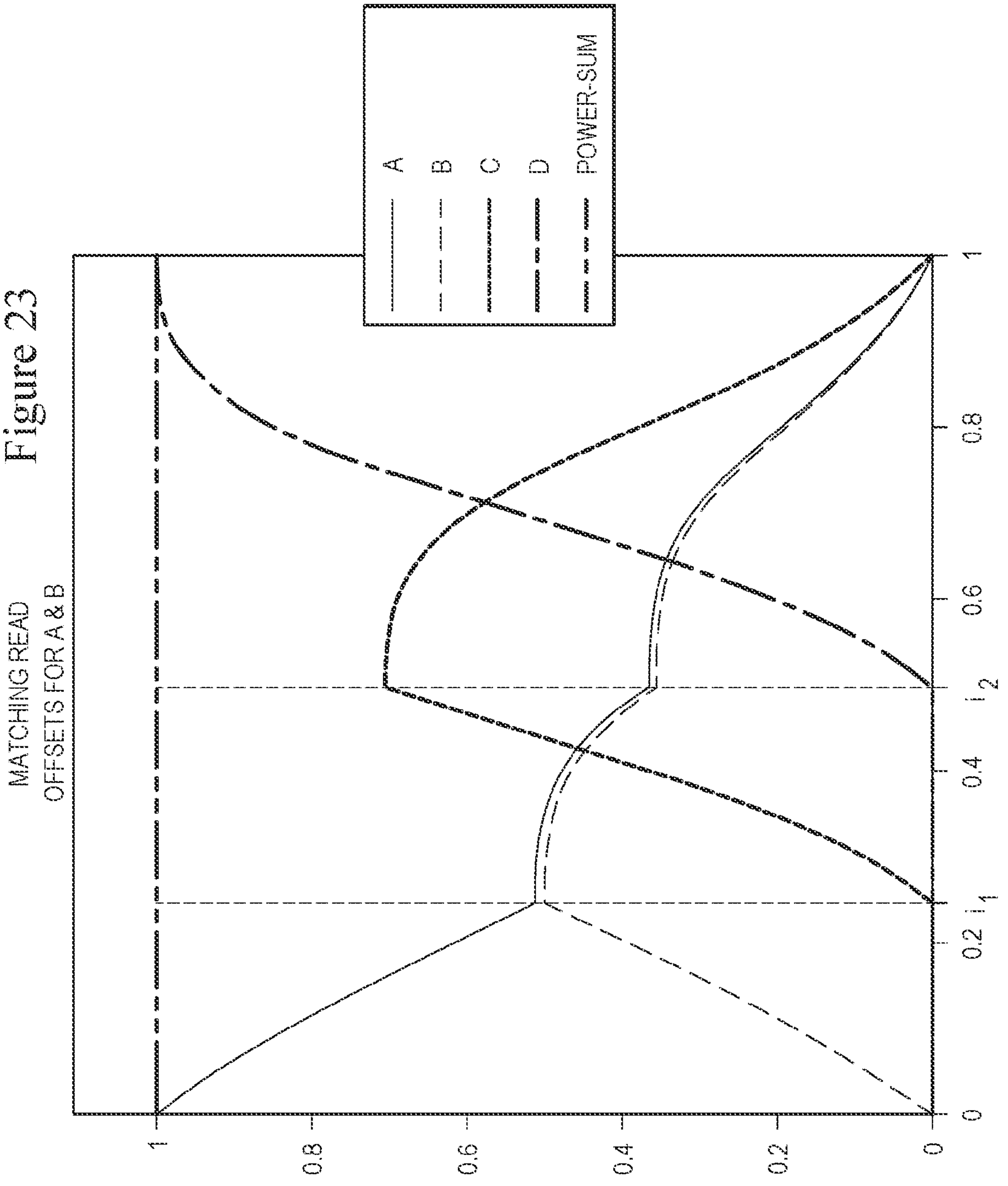

In the example presented in FIG. 23, only the read offsets for rendering configurations A and B match. Therefore, in this example the crossfade window pair for the first rendering configuration transition (from rendering configuration A to rendering configuration B) has been selected to have a unity sum, whereas the crossfade window pairs for the second and third rendering configuration transitions have been selected to have a unity power sum.

Figure 24:
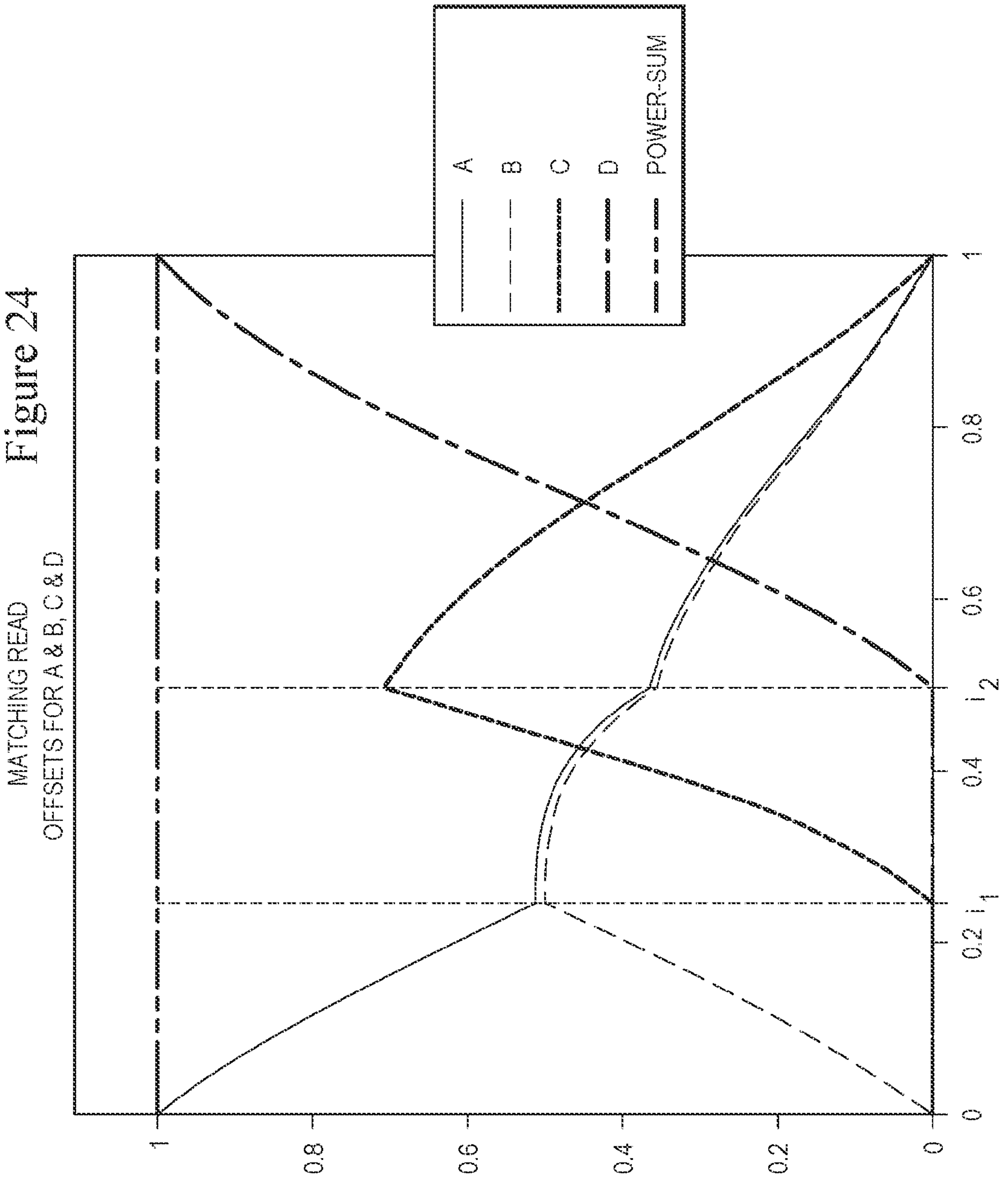

According to the example presented in FIG. 24, the read offsets for rendering configurations A and B match and the read offsets for rendering configurations C and D match. However, the read offsets for rendering configurations B and C do not match. Therefore, in this example the crossfade window pairs for the first rendering configuration transition (from rendering configuration A to rendering configuration B) and the third rendering configuration transition (from rendering configuration C to rendering configuration D) have been selected to have a unity sum, whereas the crossfade window pair for the second rendering configuration transition has been selected to have a unity power sum.

Figure 25:
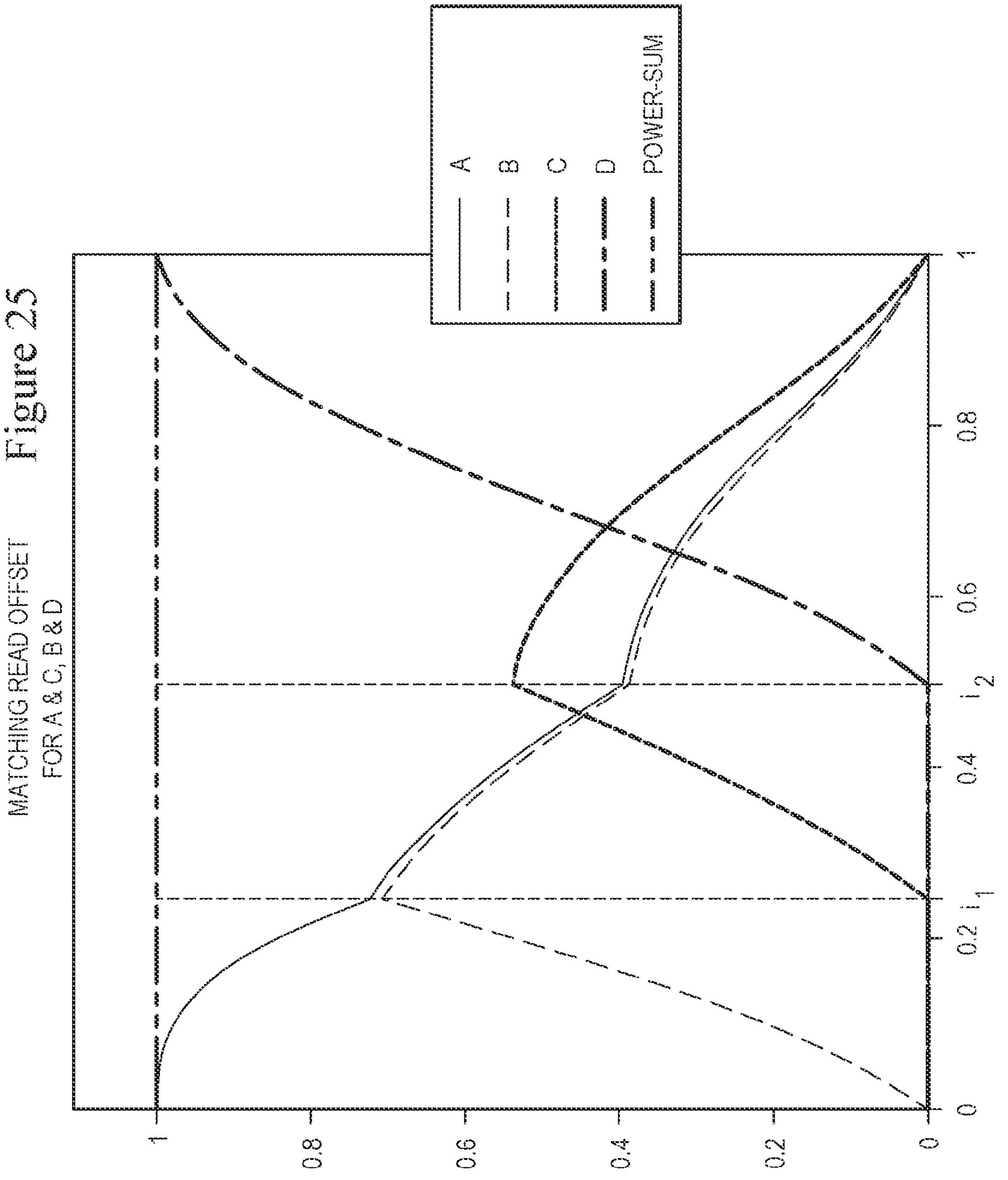
Figure 26:
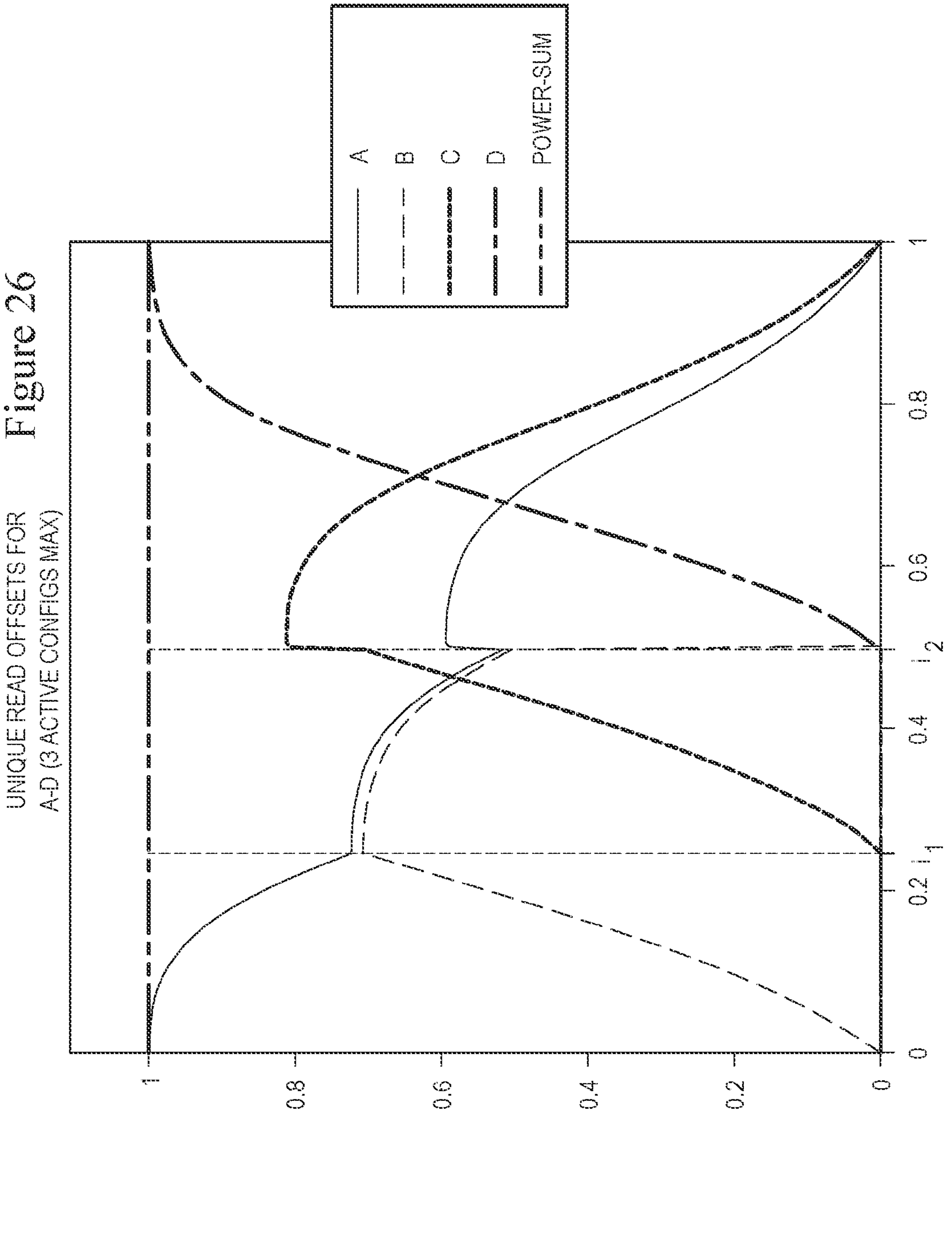
FIGS. 26, 27, 28, 29 and 30 illustrate the same cases as FIGS. 21-25, but with a limit of 3 active rendering configurations.
Figure 27:
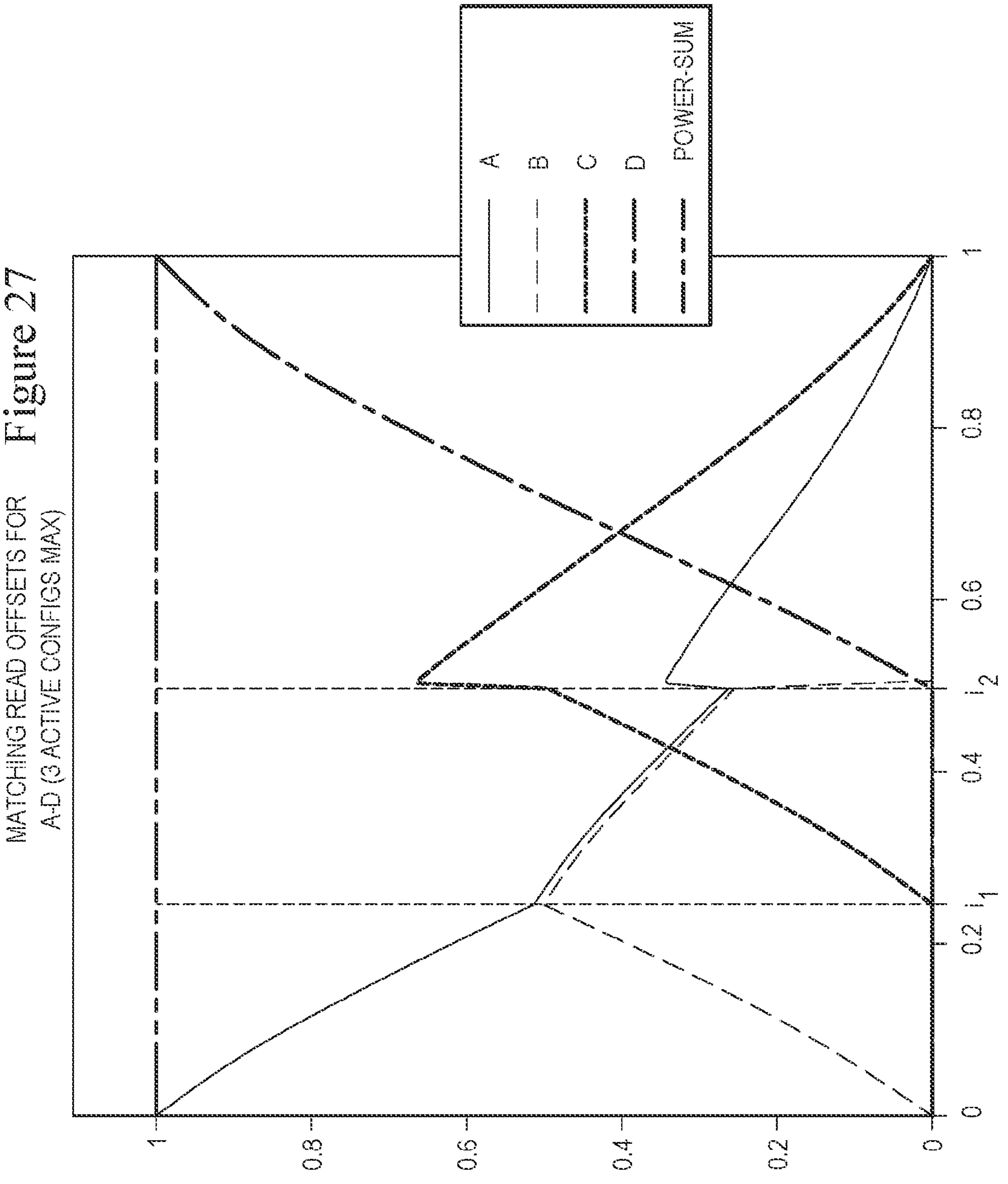
Figure 28:
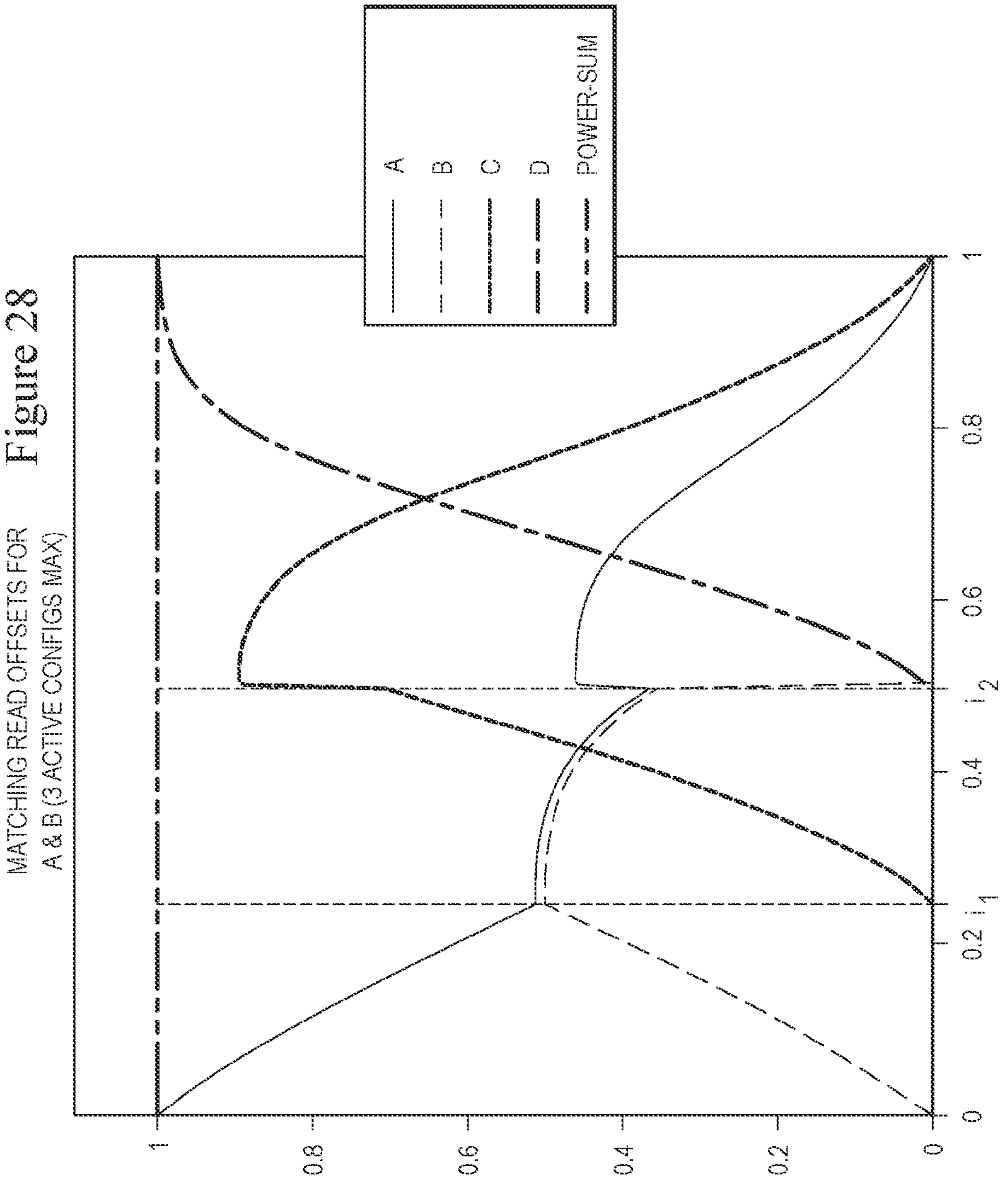
Figure 29:
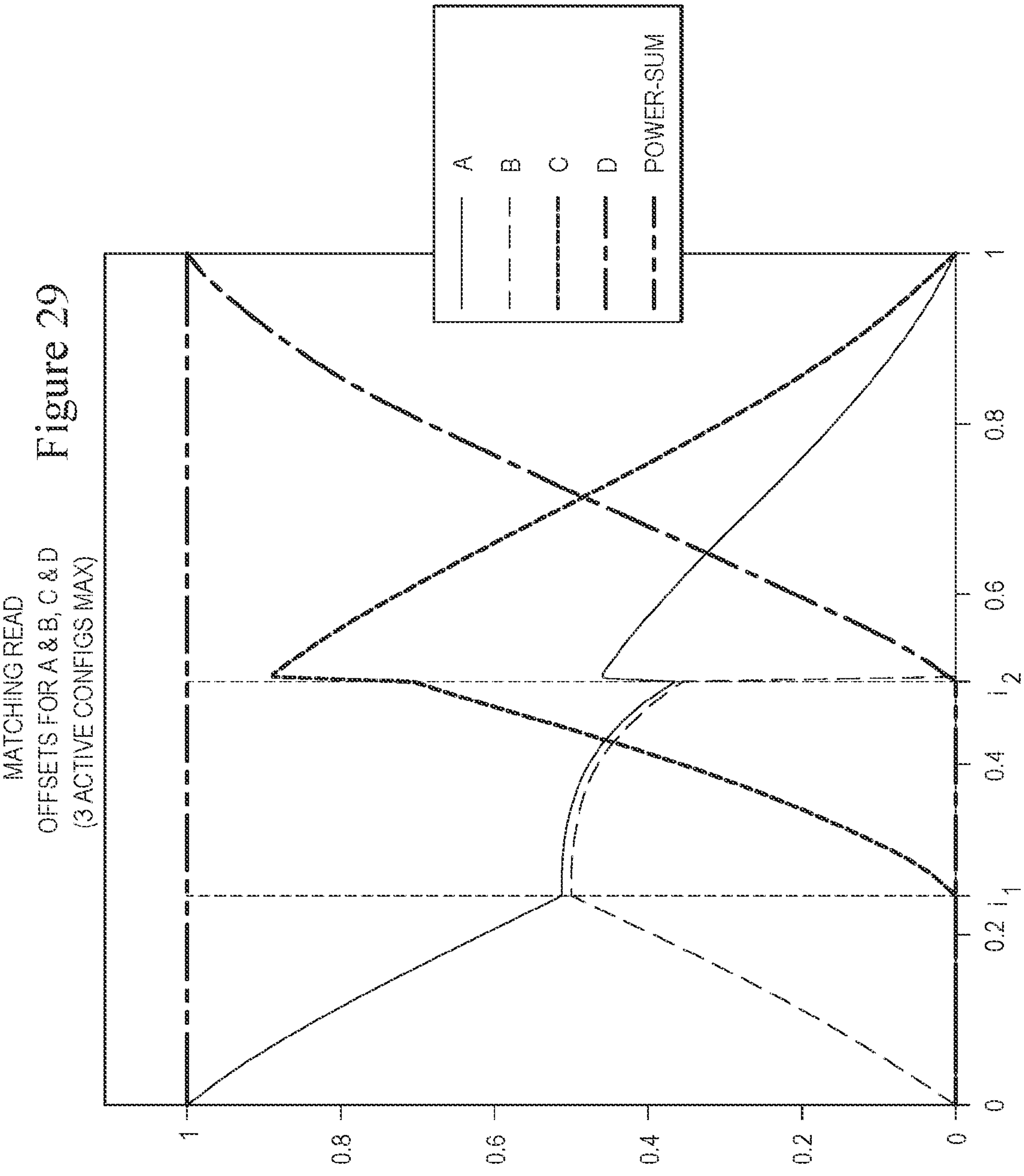
Figure 30:
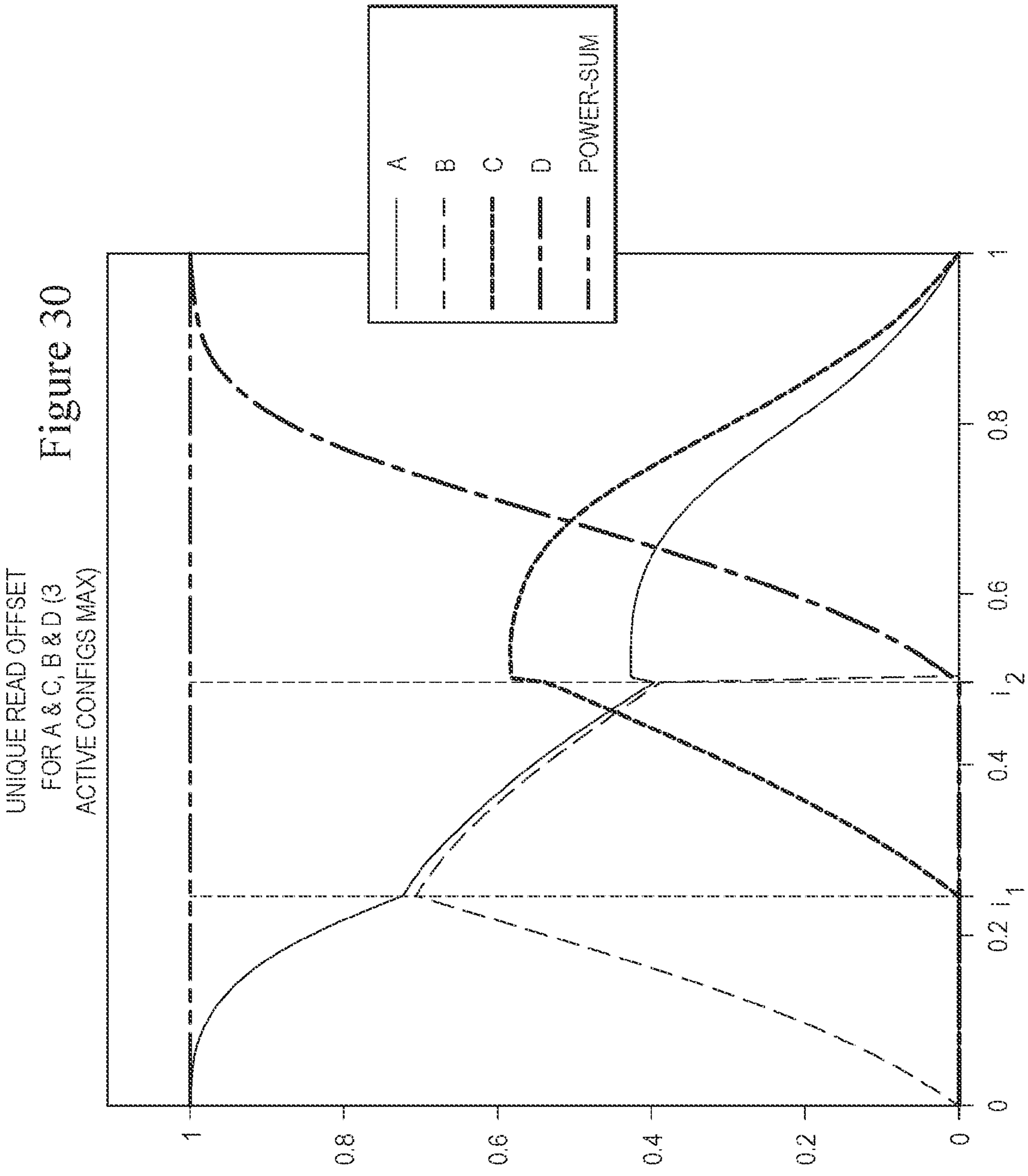

In the example presented in FIG. 25, the read offsets for rendering configurations A and C match and the read offsets for rendering configurations B and D match. However, the read offsets for rendering configurations A and B do not match and the read offsets for rendering configurations C and D do not match. Therefore, in this example the crossfade window pair for the first rendering configuration transition (from rendering configuration A to rendering configuration B) has been selected to have a unity power sum. The subsequent transition to rendering configuration C is then selected to have a unity power sum between the window applied to rendering configuration B and the sum of the windows applied to rendering configurations A and C. Finally, for the transition to rendering configuration D, the crossfade windows are designed to have a unity power sum between the summed windows applied to configurations A and C and the summed windows applied to configurations B and D.

Allowing an arbitrary number of interrupts with a frequency domain renderer as shown in FIG. 19 is possible, but may not scale well in some instances. Therefore, in some implementations the number of active rendering configurations that require delay line reads and crossfading may be limited in order to keep the complexity bounded. FIGS. 26, 27, 28, 29 and 30 illustrate the same cases as FIGS. 21-25, but with a limit of 3 active rendering configurations. In these examples, the number of active rendering configurations is limited to three by eliminating the contribution of the rendering configuration B at the time corresponding to $i_2$. In some alternative implementations, the number of active rendering configurations may be limited to three by eliminating the contribution of the rendering configuration A at the time corresponding to $i_2$. This case may, in some instances, be generalized by limiting the number of active rendering configurations to three, where the newest rendering configuration is always included, in addition to two other rendering configurations that have associated crossfade windows with the largest magnitudes at the time corresponding to $i_2$ (B, C and D in this example). Note that in these examples the power sum remains unity in all cases because the contributions of the remaining rendering configurations are normalized.

Figure 31:
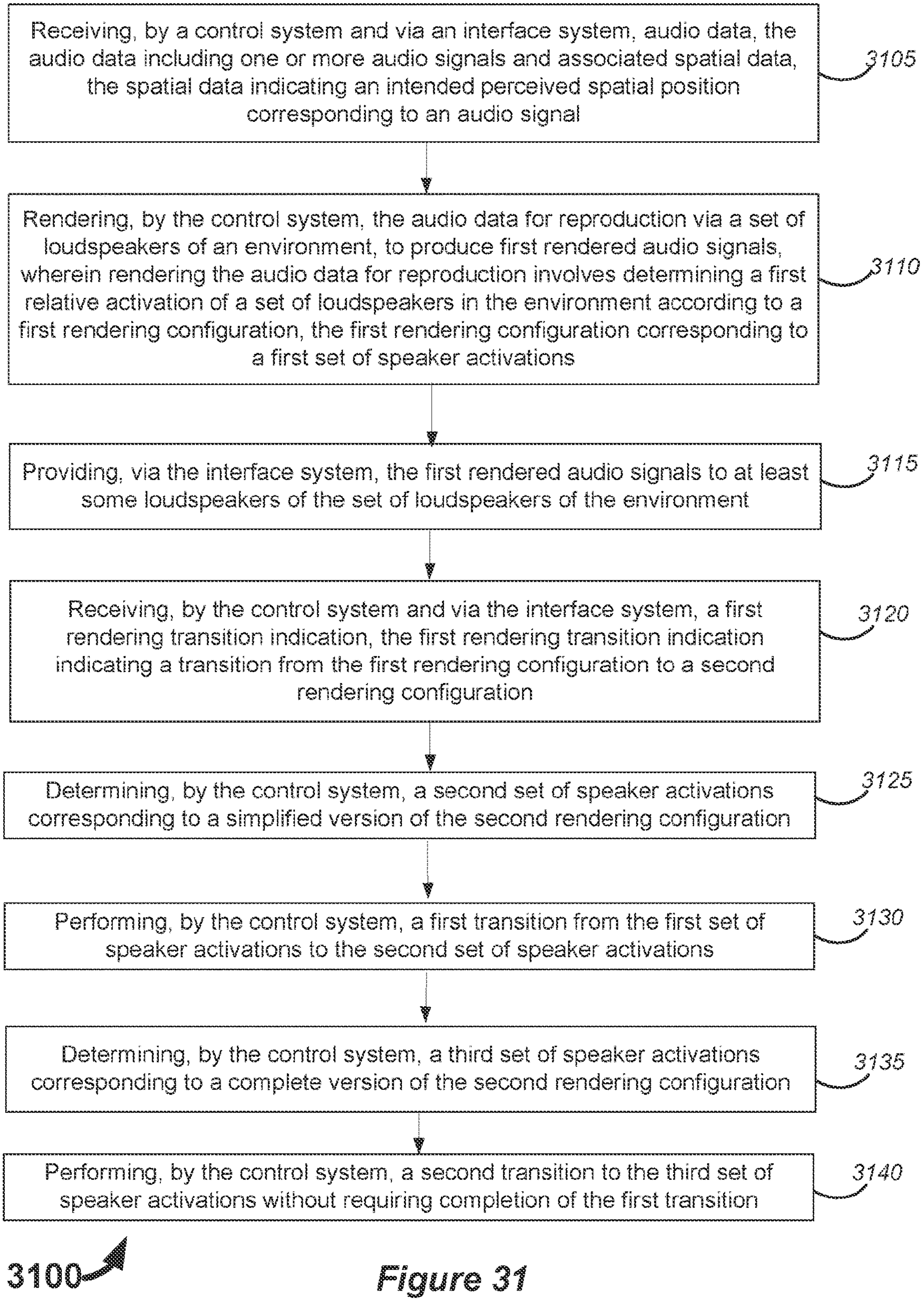
FIG. 31 is a flow diagram that outlines an example of a method.

FIG. 31 is a flow diagram that outlines an example of a method. The blocks of method 3100, like other methods described herein, are not necessarily performed in the order indicated. Moreover, such methods may include more or fewer blocks than shown and/or described. In some examples, one or more blocks of such methods may be performed concurrently. The blocks of method 3100 may be performed by one or more devices, which may be (or may include) a control system such as the control system 110, the control system 110*a* or the control system 110*b* that are shown in FIGS. 1A, 1B and 2A, and described above, or by one of the other disclosed control system examples.

In this implementation, block 3105 involves receiving, by a control system and via an interface system, audio data. Here, the audio data includes one or more audio signals and associated spatial data. In this instance, the spatial data indicates an intended perceived spatial position corresponding to an audio signal. According to some examples (e.g., for audio object implementations such as Dolby Atmos™), the spatial data may be, or may include, positional metadata. However, in some instances the first set of speaker activations may correspond to a channel-based audio format. In some such instances, the intended perceived spatial position may correspond to a channel of the channel-based audio format (e.g., may correspond to a left channel, a right channel, a center channel, etc.).

In this example, block 3110 involves rendering, by the control system, the audio data for reproduction via a set of loudspeakers of an environment, to produce first rendered audio signals. In this implementation, rendering the audio data for reproduction involves determining a first relative activation of a set of loudspeakers in the environment according to a first rendering configuration. In this example, the first rendering configuration corresponds to a first set of speaker activations. According to some examples, the first set of speaker activations may be for each of a corresponding plurality of positions in a three-dimensional space. In this implementation, block 3115 involves providing, via the interface system, the first rendered audio signals to at least some loudspeakers of the set of loudspeakers of the environment.

In this example, block 3120 involves receiving, by the control system and via the interface system, a first rendering transition indication. In this implementation, the first rendering transition indication indicates a transition from the first rendering configuration to a second rendering configuration.

In this implementation, block 3125 involves determining, by the control system, a second set of speaker activations corresponding to a simplified version of the second rendering configuration. According to this example, block 3130 involves performing, by the control system, a first transition from the first set of speaker activations to the second set of speaker activations.

In this implementation, block 3135 involves determining, by the control system, a third set of speaker activations corresponding to a complete version of the second rendering configuration. In some instances, block 3135 may be performed concurrently with block 3125 and/or block 3130. In this example, block 3140 involves performing, by the control system, a second transition to the third set of speaker activations without requiring completion of the first transition.

According to some examples, method 3100 may involve receiving, by the control system and via the interface system, a second rendering transition indication. In some such examples, the second rendering transition indication indicating a transition to a third rendering configuration. In some examples, method 3100 may involve determining, by the control system, a fourth set of speaker activations corresponding to a simplified version of the third rendering configuration. In some examples, method 3100 may involve performing, by the control system, a third transition from the third set of speaker activations to the fourth set of speaker activations. In some examples, method 3100 may involve determining, by the control system, a fifth set of speaker activations corresponding to a complete version of the third rendering configuration and performing, by the control system, a fourth transition to the fifth set of speaker activations without requiring completion of the first transition, the second transition or the third transition.

In some examples, method 3100 may involve receiving, by the control system and via the interface system and sequentially, second through $(N)^{th}$ rendering transition indications. Some such methods may involve determining, by the control system, a first set of speaker activations and a second set of speaker activations for each of the second through $(N)^{th}$ rendering transition indications. The first set of speaker activations may correspond to a simplified version of a rendering configuration and the second set of speaker activations may correspond to a complete version of a rendering configuration for each of the second through $(N)^{th}$ rendering transition indications. In some examples, method 3100 may involve performing, by the control system and sequentially, third through $(2N-1)^{th}$ transitions from a fourth set of speaker activations to a $(2N)^{th}$ set of speaker activations. In some examples, method 3100 may involve performing, by the control system, a $(2N)^{th}$ transition to a $(2N+1)^{th}$ set of speaker activations without requiring completion of any of the first through $(2N)^{th}$ transitions. In some implementations, a single renderer instance may render the audio data for reproduction.

However, it is not necessarily the case that all rendering transition indications will involve a simplified-to-complete transition responsive to a received rendering transition indication. If, as in the example above, there will be a simplified-to-complete rendering transition responsive to a received rendering transition indication, two sets of speaker activations may be determined for the rendering transition indication and there may be two transitions corresponding to the rendering transition indication. However, if there will be no simplified-to-complete transition responsive to a rendering transition indication, one set of speaker activations may be determined for the rendering transition indication and there may be only one transition corresponding to the rendering transition indication.

In some examples, method 3100 may involve receiving, by the control system and via the interface system, a second rendering transition indication. The second rendering transition indication may indicate a transition to a third rendering configuration. In some such examples, method 3100 may involve determining, by the control system, a fourth set of speaker activations corresponding to the third rendering configuration and performing, by the control system, a third transition to the fourth set of speaker activations without requiring completion of the first transition or the second transition.

According to some examples, method 3100 may involve receiving, by the control system and via the interface system, a third rendering transition indication. The third rendering transition indication may indicate a transition to a fourth rendering configuration. In some instance, method 3100 may involve determining, by the control system, a fifth set of speaker activations corresponding to the fourth rendering configuration and performing, by the control system, a fourth transition to the fifth set of speaker activations without requiring completion of the first transition, the second transition or the third transition.

In some examples, method 3100 may involve receiving, by the control system and via the interface system and sequentially, second through $(N)^{th}$ rendering transition indications and determining, by the control system, fourth through $(N+2)^{th}$ sets of speaker activations corresponding to the second through $(N)^{th}$ rendering transition indications. According to some examples, method 3100 may involve performing, by the control system and sequentially, third through $(N)^{th}$ transitions from the fourth set of speaker activations to a $(N+1)^{th}$ set of speaker activations and performing, by the control system, an $(N+1)^{th}$ transition to the $(N+2)^{th}$ set of speaker activations without requiring completion of any of the first through $(N)^{th}$ transitions.

According to some implementations, the first set of speaker activations, the second set of speaker activations and the third set of speaker activations are frequency-dependent speaker activations. In some such examples, applying the frequency-dependent speaker activations may involve applying, in a first frequency band, a model of perceived spatial position that produces a binaural response corresponding to an audio object position at the left and right ears of a listener. Alternatively, or additionally, applying the frequency-dependent speaker activations may involve applying, in at least a second frequency band, a model of perceived spatial position that places a perceived spatial position of an audio signal playing from a set of loudspeakers at a center of mass of the set of loudspeakers' positions weighted by the loudspeaker's associated activating gains.

In some examples, at least one of the first set of speaker activations, the second set of speaker activations or the third set of speaker activations may be a result of optimizing a cost that is a function of a model of perceived spatial position of the audio signal played when played back over the set of loudspeakers in the environment. In some instances, the cost may be a function of a measure of a proximity of the intended perceived spatial position of the audio signal to a position of each loudspeaker of the set of loudspeakers. Alternatively, or additionally, the cost may be a function of a measure of one or more additional dynamically configurable functions based on one or more of: proximity of loudspeakers to one or more listeners; proximity of loudspeakers to an attracting force position, wherein an attracting force is a factor that favors relatively higher activation of loudspeakers in closer proximity to the attracting force position; proximity of loudspeakers to a repelling force position, wherein a repelling force is a factor that favors relatively lower activation of loudspeakers in closer proximity to the repelling force position; capabilities of each loudspeaker relative to other loudspeakers in the environment; synchronization of the loudspeakers with respect to other loudspeakers; wakeword performance; and/or echo canceller performance.

According to some implementations, rendering the audio data for reproduction may involve determining a single set of interpolated activations from the rendering configurations and applying the single set of interpolated activations to produce a single set of rendered audio signals. In some such examples, the single set of rendered audio signals may be fed into a set of loudspeaker delay lines. The set of loudspeaker delay lines may include one loudspeaker delay line for each loudspeaker of a plurality of loudspeakers.

In some examples, rendering of the audio data for reproduction may be performed in the frequency domain. Accordingly, in some instances rendering the audio data for reproduction may involve determining and implementing loudspeaker delays in the frequency domain. According to some such examples, determining and implementing speaker delays in the frequency domain may involve determining and implementing a combination of transform block delays and sub-block delays applied by frequency domain filter coefficients.

In some examples, the sub-block delays may be residual phase terms that allow for delays that are not exact multiples of a frequency domain transform block size. Accordingly, in some examples, rendering the audio data for reproduction may involve implementing sub-block delay filtering. In some implementations, rendering the audio data for reproduction may involve implementing a set of block delay lines with separate read offsets.

In some examples, rendering the audio data for reproduction may involve determining and applying interpolated speaker activations and crossfade windows for each rendering configuration. According to some such examples, rendering the audio data for reproduction may involve implementing a set of block delay lines with separate delay line read offsets. In some such examples, crossfade window selection may be based, at least in part, on the delay line read offsets. In some instances, wherein the crossfade windows may be designed to have a unity power sum if the delay line read offsets differ by more than a threshold amount. According to some examples, the crossfade windows may be designed to have a unity sum if the delay line read offsets are identical or differ by less than a threshold amount.

As noted above, in some implementations a single renderer instance may render the audio data for reproduction.

Figure 32:
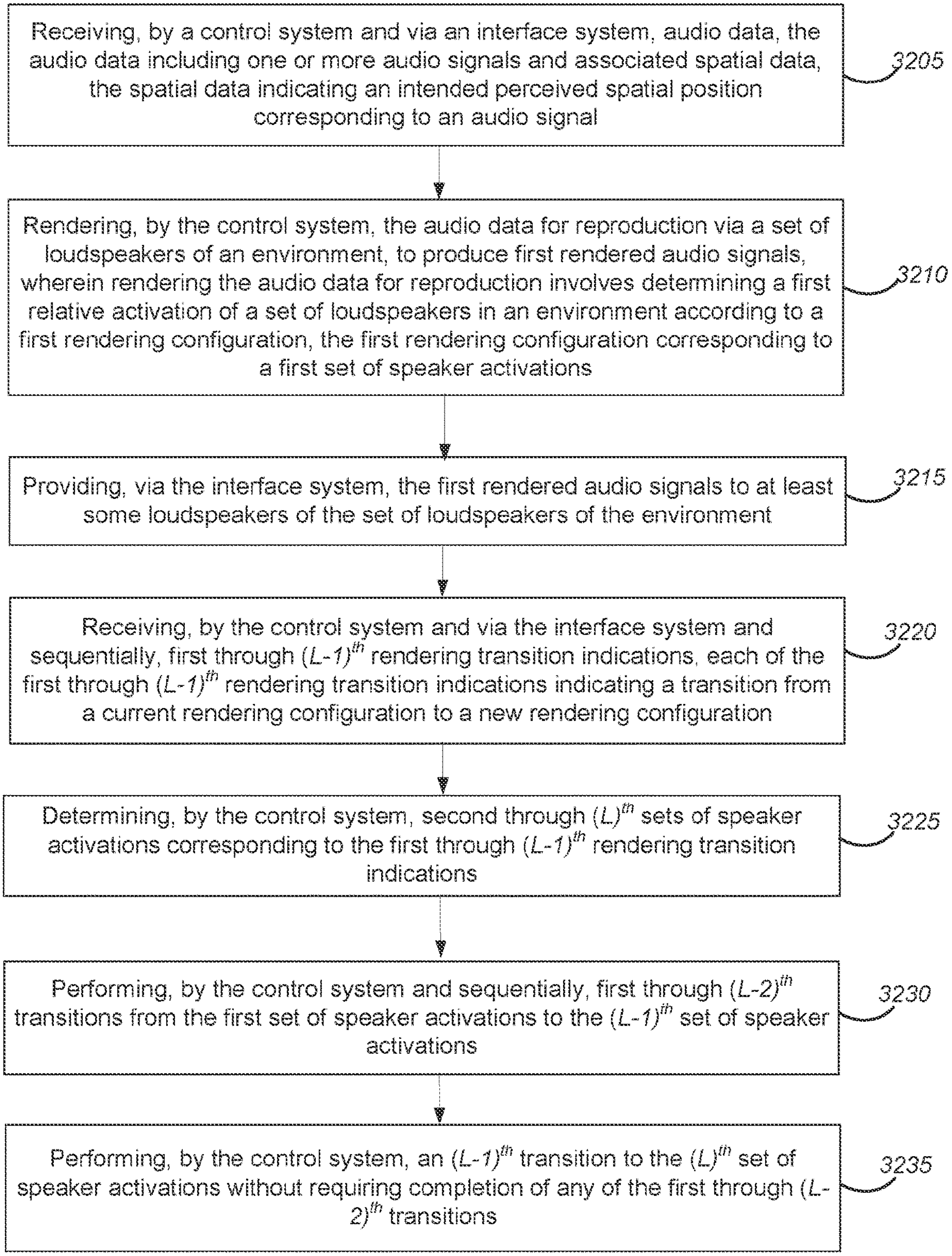
FIG. 32 is a flow diagram that outlines an example of another method.

FIG. 32 is a flow diagram that outlines an example of another method. The blocks of method 3200, like other methods described herein, are not necessarily performed in the order indicated. Moreover, such methods may include more or fewer blocks than shown and/or described. In some examples, one or more blocks of such methods may be performed concurrently. The blocks of method 3200 may be performed by one or more devices, which may be (or may include) a control system such as the control system 110, the control system 110*a* or the control system 110*b* that are shown in FIGS. 1A, 1B and 2A, and described above, or by one of the other disclosed control system examples.

In this implementation, block 3205 involves receiving, by a control system and via an interface system, audio data. In this example, the audio data includes one or more audio signals and associated spatial data. Here, the spatial data indicates an intended perceived spatial position corresponding to an audio signal.

In this example, block 3210 involves rendering, by the control system, the audio data for reproduction via a set of loudspeakers of an environment, to produce first rendered audio signals. According to this example, rendering the audio data for reproduction involves determining a first relative activation of a set of loudspeakers in an environment according to a first rendering configuration.

In this implementation, the first rendering configuration corresponds to a first set of speaker activations. In some instances, the first set of speaker activations may be for each of a corresponding plurality of positions in a three-dimensional space. In some examples, the spatial data may be, or may include, positional metadata. However, in some examples the first set of speaker activations may correspond to a channel-based audio format. In some such examples, the intended perceived spatial position comprises a channel of the channel-based audio format. In the implementation shown in FIG. 32, block 3215 involves providing, via the interface system, the first rendered audio signals to at least some loudspeakers of the set of loudspeakers of the environment.

According to this example, block 3220 involves receiving, by the control system and via the interface system and sequentially, first through $(L-1)^{th}$ rendering transition indications. In this instance, each of the first through $(L-1)^{th}$ rendering transition indications indicates a transition from a current rendering configuration to a new rendering configuration.

In this implementation, block 3225 involves determining, by the control system, second through $(L)^{th}$ sets of speaker activations corresponding to the first through $(L-1)^{th}$ rendering transition indications. According to this example, block 3230 involves performing, by the control system and sequentially, first through $(L-2)^{th}$ transitions from the first set of speaker activations to the $(L-1)^{th}$ set of speaker activations. In this implementation, block 3225 involves performing, by the control system, an $(L-1)^{th}$ transition to the $(L)^{th}$ set of speaker activations without requiring completion of any of the first through $(L-2)^{th}$ transitions.

In some implementations, a single renderer instance may render the audio data for reproduction. In some instances, rendering of the audio data for reproduction may be performed in the frequency domain. According to some examples, rendering the audio data for reproduction may involve determining a single set of interpolated activations from the rendering configurations and applying the single set of interpolated activations to produce a single set of rendered audio signals.

In some such examples, the single set of rendered audio signals may be fed into a set of loudspeaker delay lines. The set of loudspeaker delay lines may, for example, include one loudspeaker delay line for each loudspeaker of a plurality of loudspeakers.

Figure 33:
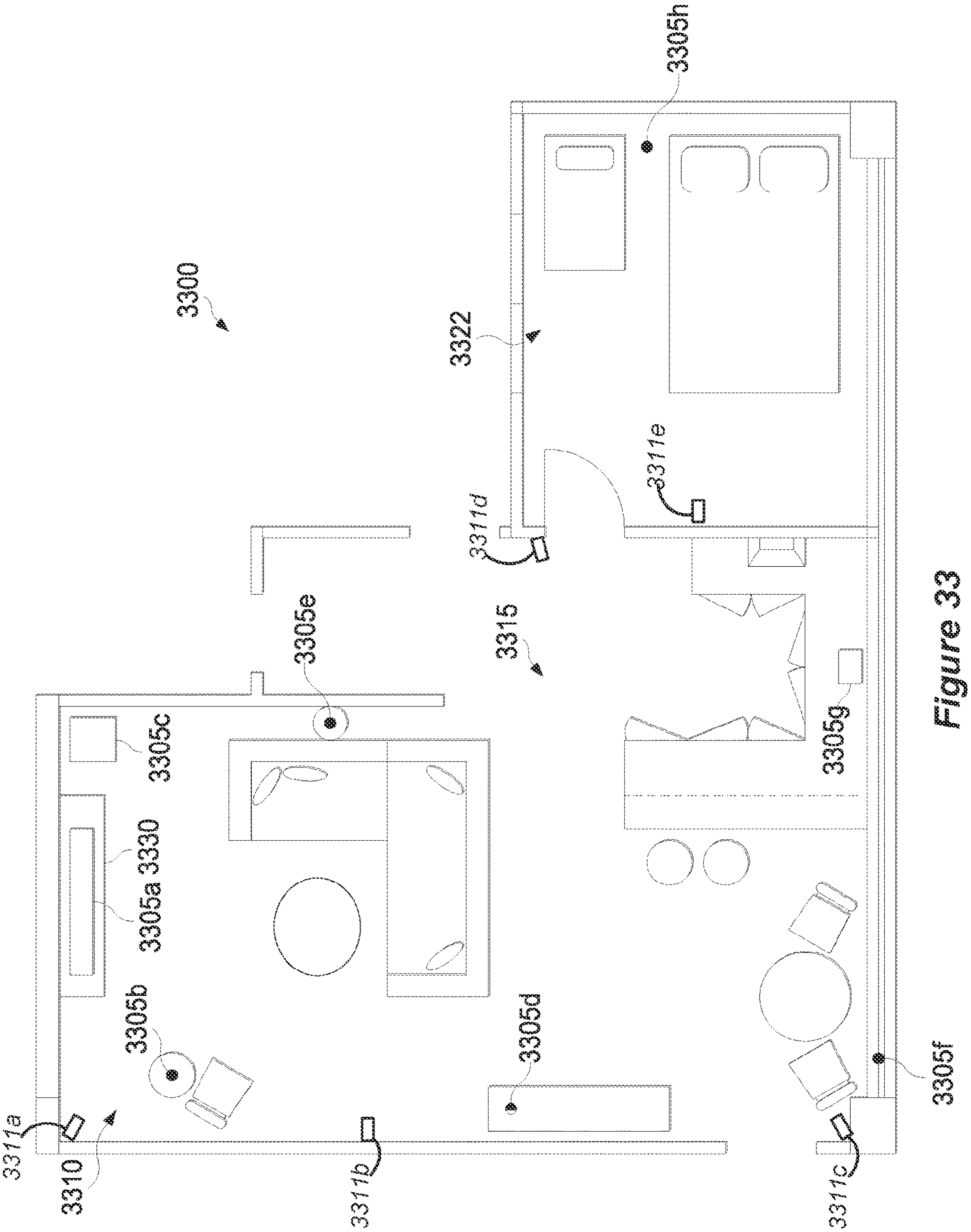
FIG. 33 depicts a floor plan of a listening environment, which is a living space in this example.

With reference to FIG. 33, we describe an example embodiment. As with other figures provided herein, the types and numbers of elements shown in FIG. 33 are merely provided by way of example. Other implementations may include more, fewer and/or different types and numbers of elements. FIG. 33 depicts a floor plan of a listening environment, which is a living space in this example. According to this example, the environment 3300 includes a living room 3310 at the upper left, a kitchen 3315 at the lower center, and a bedroom 3322 at the lower right. Boxes and circles distributed across the living space represent a set of loudspeakers 3305*a*-3305*h*, at least some of which may be smart speakers in some implementations, placed in locations convenient to the space, but not adhering to any standard prescribed layout (arbitrarily placed). In some examples, the loudspeakers 3305*a*-3305*h* may be coordinated to implement one or more disclosed embodiments. In this example, the environment 3300 includes cameras 3311*a*-3311*e*, which are distributed throughout the environment. In some implementations, one or more smart audio devices in the environment 3300 also may include one or more cameras. The one or more smart audio devices may be single purpose audio devices or virtual assistants. In some such examples, one or more cameras of the optional sensor system 130 may reside in or on the television 3330, in a mobile phone or in a smart speaker, such as one or more of the loudspeakers 3305*b*, 3305*d*, 3305*e* or 3305*h*. Although cameras 3311*a*-3311*e* are not shown in every depiction of the environment 3300 presented in this disclosure, each of the environments 3300 may nonetheless include one or more cameras in some implementations.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for controlling one or more devices to perform one or more examples of the disclosed methods or steps thereof.

Various features and aspects will be appreciated from the following enumerated example embodiments ("EEEs"):

EEE1. An audio processing method, comprising:

receiving, by a control system and via an interface system, audio data, the audio data including one or more audio signals and associated spatial data, the spatial data indicating an intended perceived spatial position corresponding to an audio signal;

rendering, by the control system, the audio data for reproduction via a set of loudspeakers of an environment, to produce first rendered audio signals, wherein rendering the audio data for reproduction involves determining a first relative activation of a set of loudspeakers in an environment according to a first rendering configuration, the first rendering configuration corresponding to a first set of speaker activations;

providing, via the interface system, the first rendered audio signals to at least some loudspeakers of the set of loudspeakers of the environment;

receiving, by the control system and via the interface system and sequentially, first through $(L-1)^{th}$ rendering transition indications, each of the first through $(L-1)^{th}$ rendering transition indications indicating a transition from a current rendering configuration to a new rendering configuration;

determining, by the control system, second through $(L)^{th}$ sets of speaker activations corresponding to the first through $(L-1)^{th}$ rendering transition indications;

performing, by the control system and sequentially, first through $(L-_2)^{th}$ transitions from the first set of speaker activations to the $(L-1)^{th}$ set of speaker activations; and performing, by the control system, an $(L-1)^{th}$ transition to the $(L)^{th}$ set of speaker activations without requiring completion of any of the first through $(L-_2)^{th}$ transitions.

EEE2. The method of claim EEE1, wherein a single renderer instance renders the audio data for reproduction.

EEE3. The method of claim EEE1 or claim EEE2, wherein rendering the audio data for reproduction comprises determining a single set of interpolated activations from the rendering configurations and applying the single set of interpolated activations to produce a single set of rendered audio signals.

EEE4. The method of claim EEE3, wherein the single set of rendered audio signals is fed into a set of loudspeaker delay lines, the set of loudspeaker delay lines including one loudspeaker delay line for each loudspeaker of a plurality of loudspeakers.

EEE5. The method of any one of claims EEE1-EEE4, wherein the rendering of the audio data for reproduction is performed in a frequency domain.

EEE6. The method of any one of claims EEE1-EEE5, wherein the first set of speaker activations are for each of a corresponding plurality of positions in a three-dimensional space.

EEE7. The method of any one of claims EEE1-EEE6, wherein the spatial data comprises positional metadata.

EEE8. The method of any one of claims EEE1-EEE5, wherein the first set of speaker activations correspond to a channel-based audio format.

EEE9. The method of claim EEE8, wherein the intended perceived spatial position comprises a channel of the channel-based audio format.

EEE10. An apparatus configured to perform the method of any one of claims EEE1-EEE9.

EEE11. A system configured to perform the method of any one of claims EEE1-EEE9.

EEE12. One or more non-transitory media having software stored thereon, the software including instructions for controlling one or more devices to perform the method of any one of claims EEE1-EEE9.

While specific embodiments and applications have been described herein, it will be apparent to those of ordinary skill in the art that many variations on the embodiments and applications described herein are possible without departing from the scope described and claimed herein. It should be understood that while certain forms have been shown and described, the scope of the present disclosure is not to be limited to the specific embodiments described and shown or the specific methods described.

The invention claimed is:

1. An audio processing method, comprising:

receiving, by a control system and via an interface system, audio data, the audio data including one or more audio signals and associated spatial data, the spatial data indicating an intended perceived spatial position corresponding to an audio signal;

rendering, by the control system, the audio data for reproduction via a set of loudspeakers of an environment, to produce first rendered audio signals, wherein rendering the audio data for reproduction involves determining a first relative activation of a set of loudspeakers in the environment according to a first rendering configuration, the first rendering configuration corresponding to a first set of speaker activations, wherein rendering the audio data for reproduction also involves determining and implementing loudspeaker delays in a frequency domain and implementing sub-block delay filtering;

providing, via the interface system, the first rendered audio signals to at least some loudspeakers of the set of loudspeakers of the environment;

receiving, by the control system and via the interface system, a first rendering transition indication, the first rendering transition indication indicating a transition from the first rendering configuration to a second rendering configuration;

determining, by the control system, a second set of speaker activations corresponding to a simplified version of the second rendering configuration;

performing, by the control system, a first transition from the first set of speaker activations to the second set of speaker activations;

determining, by the control system, a third set of speaker activations corresponding to a complete version of the second rendering configuration; and performing, by the control system, a second transition to the third set of speaker activations without requiring completion of the first transition.

2. The method of claim 1, wherein the first set of speaker activations, the second set of speaker activations and the third set of speaker activations are frequency-dependent speaker activations.

3. The method of claim 2, wherein the frequency-dependent speaker activations involve applying, in at least a first frequency band, a model of perceived spatial position that produces a binaural response corresponding to an audio object position at the left and right ears of a listener.

4. The method of claim 3, wherein the frequency-dependent speaker activations involve applying, in at least a second frequency band, a model of perceived spatial position that places a perceived spatial position of an audio signal playing from a set of loudspeakers at a center of mass of the set of loudspeakers' positions weighted by the loudspeaker's associated activating gains.

5. The method of claim 1, wherein at least one of the first set of speaker activations, the second set of speaker activations or the third set of speaker activations is a result of optimizing a cost that is a function of:

a model of perceived spatial position of the audio signal played when played back over the set of loudspeakers in the environment;

a measure of proximity of the intended perceived spatial position of the audio signal to a position of each loudspeaker of the set of loudspeakers; and one or more additional dynamically configurable functions, wherein the one or more additional dynamically configurable functions are based on one or more of: proximity of loudspeakers to one or more listeners; proximity of loudspeakers to an attracting force position, wherein an attracting force is a factor that favors relatively higher activation of loudspeakers in closer proximity to the attracting force position; proximity of loudspeakers to a repelling force position, wherein a repelling force is a factor that favors relatively lower activation of loudspeakers in closer proximity to the repelling force position; capabilities of each loudspeaker relative to other loudspeakers in the environment; synchronization of the loudspeakers with respect to other loudspeakers; wakeword performance; or echo canceller performance.

6. The method of claim 1, further comprising:

receiving, by the control system and via the interface system, a second rendering transition indication, the second rendering transition indication indicating a transition to a third rendering configuration;

determining, by the control system, a fourth set of speaker activations corresponding to the third rendering configuration; and performing, by the control system, a third transition to the fourth set of speaker activations without requiring completion of the first transition or the second transition.

7. The method of claim 6, further comprising:

receiving, by the control system and via the interface system, a third rendering transition indication, the third rendering transition indication indicating a transition to a fourth rendering configuration;

determining, by the control system, a fifth set of speaker activations corresponding to the fourth rendering configuration; and performing, by the control system, a fourth transition to the fifth set of speaker activations without requiring completion of the first transition, the second transition or the third transition.

8. The method of claim 1, further comprising:

receiving, by the control system and via the interface system and sequentially, second through (N)th rendering transition indications, where N is an integer;

determining, by the control system, fourth through $(N+2)^{th}$ sets of speaker activations corresponding to the second through $(N)^{th}$ rendering transition indications;

performing, by the control system and sequentially, third through $(N)^{th}$ transitions from the fourth set of speaker activations to a $(N+1)^{th}$ set of speaker activations; and performing, by the control system, an $(N+1)^{th}$ transition to the $(N+2)^{th}$ set of speaker activations without requiring completion of any of the first through $(N)^{th}$ transitions.

9. The method of claim 1, further comprising:

receiving, by the control system and via the interface system, a second rendering transition indication, the second rendering transition indication indicating a transition to a third rendering configuration;

determining, by the control system, a fourth set of speaker activations corresponding to a simplified version of the third rendering configuration;

performing, by the control system, a third transition from the third set of speaker activations to the fourth set of speaker activations;

determining, by the control system, a fifth set of speaker activations corresponding to a complete version of the third rendering configuration; and performing, by the control system, a fourth transition to the fifth set of speaker activations without requiring completion of the first transition, the second transition or the third transition.

10. The method of claim 1, further comprising:

receiving, by the control system and via the interface system and sequentially, second through $(N)^{th}$ rendering transition indications, where N is an integer;

determining, by the control system, a first set of speaker activations and a second set of speaker activations for each of the second through $(N)^{th}$ rendering transition indications, the first set of speaker activations corresponding to a simplified version of a rendering configuration and the second set of speaker activations corresponding to a complete version of a rendering configuration for each of the second through $(N)^{th}$ rendering transition indications;

performing, by the control system and sequentially, third through $(2N-1)^{th}$ transitions from a fourth set of speaker activations to a $(2N)^{th}$ set of speaker activations; and performing, by the control system, a $(2N)^{th}$ transition to a $(2N+1)^{th}$ set of speaker activations without requiring completion of any of the first through $(2N)^{th}$ transitions.

11. The method of claim 1, wherein a single renderer instance renders the audio data for reproduction.

12. The method of claim 1, wherein rendering the audio data for reproduction comprises determining a single set of interpolated activations from the first and second rendering configurations and applying the single set of interpolated activations to produce a single set of rendered audio signals.

13. The method of claim 12, wherein the single set of rendered audio signals is fed into a set of loudspeaker delay lines, the set of loudspeaker delay lines including one loudspeaker delay line for each loudspeaker of a plurality of loudspeakers.

14. The method of claim 1, wherein determining and implementing speaker delays in the frequency domain involves determining and implementing a combination of transform block delays and sub-block delays applied by frequency domain filter coefficients, the sub-block delays being residual phase terms which allow for delays which are not exact multiples of a frequency domain transform block size.

15. The method of claim 1, wherein rendering the audio data for reproduction also involves implementing a set of transform block delay lines with separate read offsets.

16. The method of claim 1, wherein implementing the sub-block delay filtering involves implementing multi-tap filters across blocks of the frequency domain transform.

17. The method of claim 16, wherein the rendering of the audio data for reproduction comprises determining and applying interpolated speaker activations and crossfade windows for each rendering configuration.

18. The method of claim 17, wherein rendering the audio data for reproduction also involves implementing a set of transform block delay lines with separate delay line read offsets, wherein crossfade window selection is based, at least in part, on the delay line read offsets and wherein the crossfade windows are designed to have a unity power sum if the delay line read offsets are not identical.

19. The method of claim 1, wherein the rendering of the audio data for reproduction is performed in a frequency domain.

20. The method of claim 1, wherein the first set of speaker activations are for each of a corresponding plurality of positions in a three-dimensional space.

21. The method of claim 1, wherein the spatial data comprises positional metadata.

22. The method of claim 1, wherein the first set of speaker activations correspond to a channel-based audio format.

23. The method of claim 22, wherein the intended perceived spatial position comprises a channel of the channel-based audio format.

24. An apparatus, comprising:

an interface system and a control system configured to:

receive, via the interface system, audio data, the audio data including one or more audio signals and associated spatial data, the spatial data indicating an intended perceived spatial position corresponding to an audio signal;

render the audio data for reproduction via a set of loudspeakers of an environment, to produce first rendered audio signals, wherein rendering the audio data for reproduction involves determining a first relative activation of a set of loudspeakers in the environment according to a first rendering configuration, the first rendering configuration corresponding to a first set of speaker activations, wherein rendering the audio data for reproduction also involves determining and implementing loudspeaker delays in a frequency domain and implementing a set of transform block delay lines with separate read offsets;

provide, via the interface system, the first rendered audio signals to at least some loudspeakers of the set of loudspeakers of the environment;

receive, via the interface system, a first rendering transition indication, the first rendering transition indication indicating a transition from the first rendering configuration to a second rendering configuration;

determine a second set of speaker activations corresponding to a simplified version of the second rendering configuration;

perform a first transition from the first set of speaker activations to the second set of speaker activations;

determine a third set of speaker activations corresponding to a complete version of the second rendering configuration; and perform a second transition to the third set of speaker activations without requiring completion of the first transition.

25. One or more non-transitory media having software stored thereon, the software including instructions for controlling one or more devices to perform a method, the method comprising:

receiving, by a control system and via an interface system, audio data, the audio data including one or more audio signals and associated spatial data, the spatial data indicating an intended perceived spatial position corresponding to an audio signal;

rendering, by the control system, the audio data for reproduction via a set of loudspeakers of an environment, to produce first rendered audio signals, wherein rendering the audio data for reproduction involves determining a first relative activation of a set of loudspeakers in the environment according to a first rendering configuration, the first rendering configuration corresponding to a first set of speaker activations, wherein rendering the audio data for reproduction also involves determining and implementing loudspeaker delays in a frequency domain and wherein determining and implementing speaker delays in the frequency domain involves determining and implementing a combination of transform block delays and sub-block delays applied by frequency domain filter coefficients, the sub-block delays being residual phase terms which allow for delays which are not exact multiples of a frequency domain transform block size;

providing, via the interface system, the first rendered audio signals to at least some loudspeakers of the set of loudspeakers of the environment;

receiving, by the control system and via the interface system, a first rendering transition indication, the first rendering transition indication indicating a transition from the first rendering configuration to a second rendering configuration;

determining, by the control system, a second set of speaker activations corresponding to a simplified version of the second rendering configuration;

performing, by the control system, a first transition from the first set of speaker activations to the second set of speaker activations;

determining, by the control system, a third set of speaker activations corresponding to a complete version of the second rendering configuration; and performing, by the control system, a second transition to the third set of speaker activations without requiring completion of the first transition.

* * * * *